US012574324B2

(12) United States Patent
Ge et al.

(10) Patent No.: US 12,574,324 B2
(45) Date of Patent: Mar. 10, 2026

(54) ROUTE ADVERTISEMENT METHOD, PACKET FORWARDING METHOD, DEVICE, AND SYSTEM

(71) Applicant: Huawei Technologies Co., Ltd., Shenzhen (CN)

(72) Inventors: Jun Ge, Beijing (CN); Haibo Wang, Beijing (CN); Lili Wang, Beijing (CN); Futai Xu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 18/619,600

(22) Filed: Mar. 28, 2024

(65) Prior Publication Data
US 2024/0244002 A1     Jul. 18, 2024

Related U.S. Application Data

(63) Continuation of application No. PCT/CN2022/101380, filed on Jun. 27, 2022.

(30) Foreign Application Priority Data

Sep. 30, 2021    (CN) ........................... 202111162731.2
Jan. 7, 2022    (CN) ........................... 202210018493.6

(51) Int. Cl.
H04L 45/76 (2022.01)
H04L 12/46 (2006.01)
H04L 45/00 (2022.01)
H04L 45/50 (2022.01)

(52) U.S. Cl.
CPC .......... *H04L 45/76* (2022.05); *H04L 12/4641* (2013.01); *H04L 45/34* (2013.01); *H04L 45/50* (2013.01)

(58) Field of Classification Search
CPC ..... H04L 12/4641; H04L 45/34; H04L 45/50; H04L 45/76
See application file for complete search history.

(56) References Cited

U.S. PATENT DOCUMENTS

2016/0134591 A1* 5/2016 Liao ........................ H04L 45/04
                                                                726/15
2018/0262365 A1* 9/2018 Lee ..................... H04L 63/0272
2021/0328906 A1* 10/2021 Peng ....................... H04L 45/74
2023/0078123 A1* 3/2023 Zhang ................... H04L 45/566
                                                                709/238

FOREIGN PATENT DOCUMENTS

WO     WO-2018109536 A1 * 6/2018    ............. H04L 43/00

* cited by examiner

*Primary Examiner* — G. C. Neurauter, Jr.
(74) *Attorney, Agent, or Firm* — Slater Matsil, LLP

(57) ABSTRACT

This application discloses a route advertisement method, a packet forwarding method, a device, and a system. A first network device obtains a first VPN route and a second VPN route that have a same route prefix and a same route distinguisher but different VPN identifiers and different next hops. The first network device allocates a third VPN identifier to the first VPN route and the second VPN route, and stores, on a forwarding plane, a first correspondence between the third VPN identifier and a first VPN identifier that is included in the first VPN route and a second correspondence between the third VPN identifier and a second VPN identifier that is included in the second VPN route. The first VPN route and the second VPN route that belong to a same VPN can form fast reroute or load balancing.

20 Claims, 26 Drawing Sheets

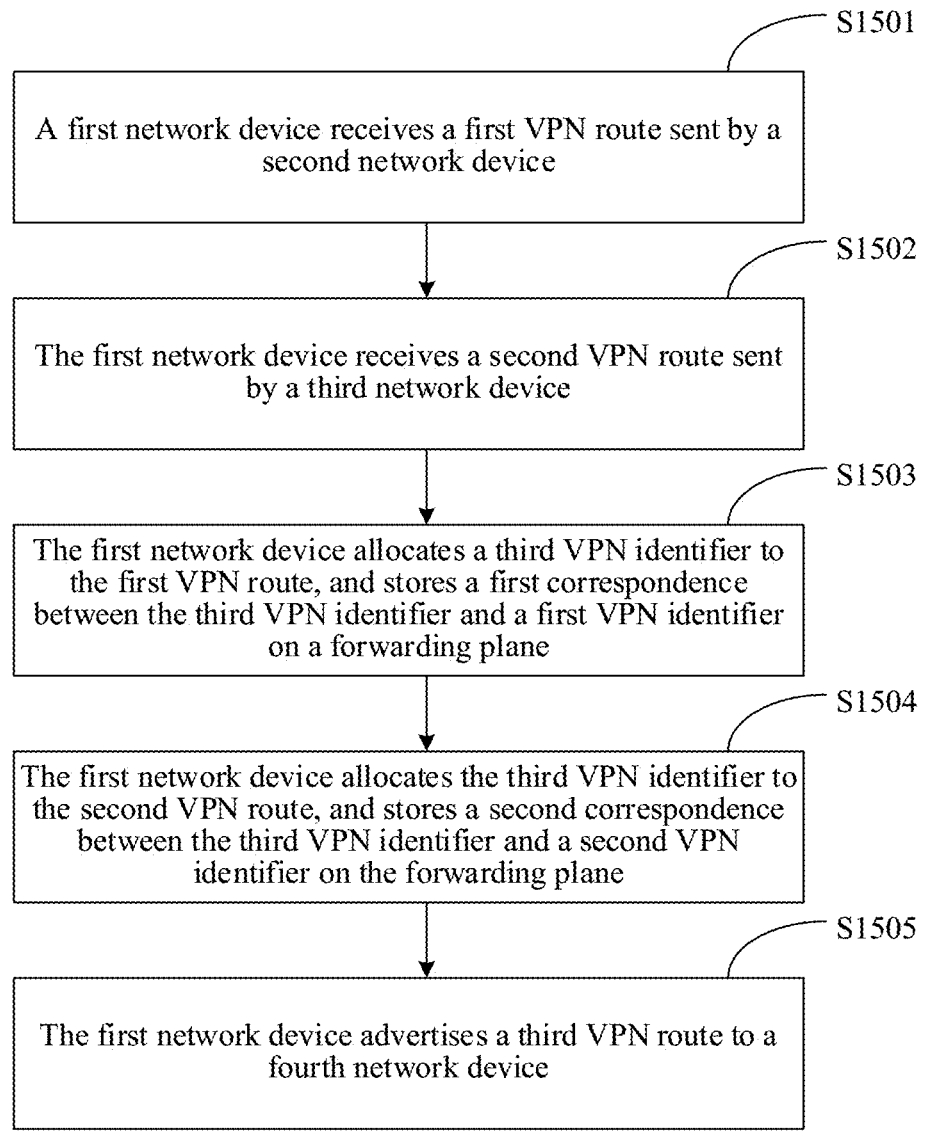

A first network device receives a first VPN route sent by a second network device ⌐ S1501

The first network device receives a second VPN route sent by a third network device ⌐ S1502

The first network device allocates a third VPN identifier to the first VPN route, and stores a first correspondence between the third VPN identifier and a first VPN identifier on a forwarding plane ⌐ S1503

The first network device allocates the third VPN identifier to the second VPN route, and stores a second correspondence between the third VPN identifier and a second VPN identifier on the forwarding plane ⌐ S1504

The first network device advertises a third VPN route to a fourth network device ⌐ S1505

FIG. 15

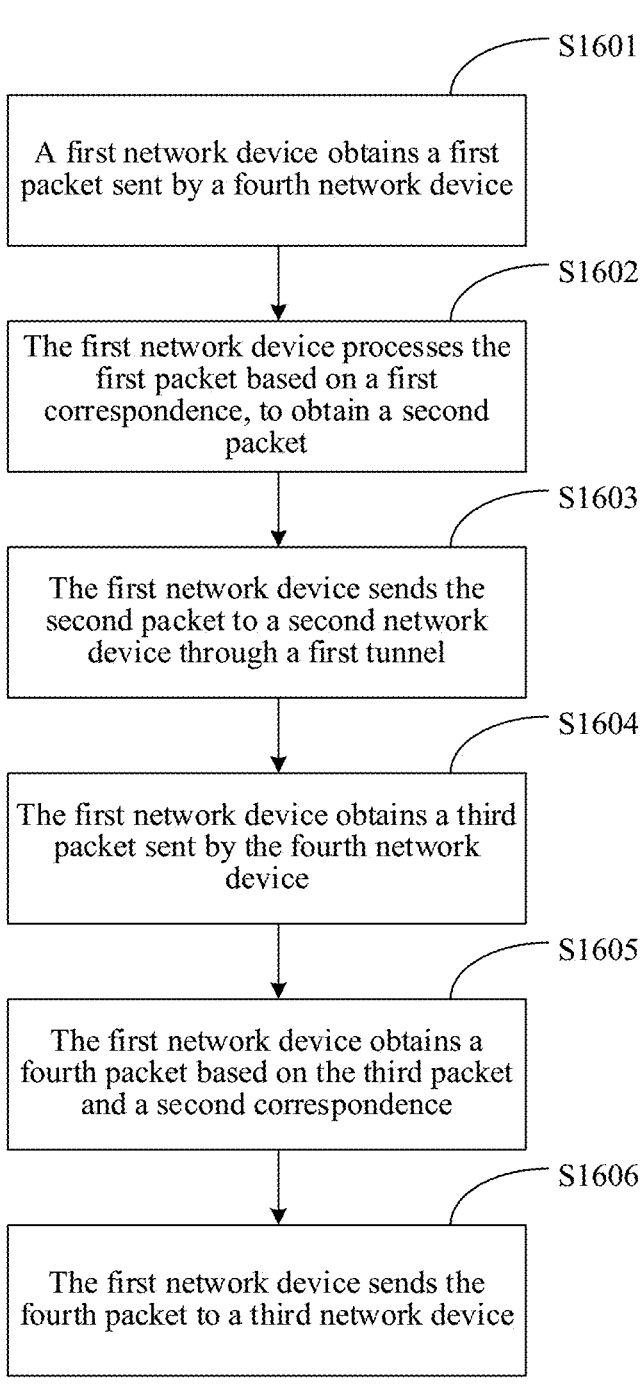

S1601

A first network device obtains a first packet sent by a fourth network device

S1602

The first network device processes the first packet based on a first correspondence, to obtain a second packet

S1603

The first network device sends the second packet to a second network device through a first tunnel

S1604

The first network device obtains a third packet sent by the fourth network device

S1605

The first network device obtains a fourth packet based on the third packet and a second correspondence

S1606

The first network device sends the fourth packet to a third network device

FIG. 16b

ROUTE ADVERTISEMENT METHOD, PACKET FORWARDING METHOD, DEVICE, AND SYSTEM

CROSS-REFERENCE TO RELATED APPLICATIONS

This application is a continuation of International Application No. PCT/CN2022/101380, filed on Jun. 27, 2022, which claims priorities to Chinese Patent Application No. 202111162731.2, filed on Sep. 30, 2021 and Chinese Patent Application No. 202210018493.6, filed on Jan. 7, 2022. All of the aforementioned patent applications are hereby incorporated by reference in their entireties.

TECHNICAL FIELD

This application relates to the communications field, and in particular, to a route advertisement method, a packet forwarding method, a device, and a system.

BACKGROUND

With expansion of virtual private network (virtual private network, VPN) application scenarios, a VPN needs to be deployed across different autonomous system (autonomous system, AS) borders in a network. There are three common inter-AS methods: an option (option) A, an option B, and an option C. When the option B is used, an autonomous system border router (autonomous system border router, ASBR) can obtain a route advertised by a provider edge (provider edge, PE) device in an AS to which the autonomous system border router belongs, or obtain a route advertised by an ASBR that is in another AS and that is connected to the autonomous system border router; and allocate a label to the obtained route. The ASBR advertises, to the ASBR in the another AS, the route obtained from the PE device, or the ASBR advertises, to the PE device, the route obtained from the ASBR in the another AS. Inter-AS data transmission can be implemented based on a route advertised by the ASBR across the ASs.

In the option B, the ASBR may allocate the label to the obtained route based on a one-label-per-next-hop manner. The ASBR can allocate a same label to routes having a same next hop, so that label resources are saved. However, in the one-label-per-next-hop label distribution manner, when a network device is faulty, the network needs to perform route convergence again, and a speed of resuming normal network transmission is low. Consequently, network transmission quality is affected. Alternatively, when a quantity of transmitted packets is large, it is difficult to quickly complete packet transmission. Consequently, network transmission quality is affected.

SUMMARY

Embodiments of this application provide a route advertisement method, a packet forwarding method, a device, and a system, so that fast reroute or load balancing formed based on a plurality of VPN routes that have a same route prefix and a same RD but different next hops can be supported, and transmission performance of a network can be improved.

According to a first aspect, this application provides a route advertisement method. The method is applied to a first network device. The first network device is a tunnel endpoint of a first tunnel, a tunnel endpoint of a second tunnel, and a tunnel endpoint of a third tunnel. The first network device communicates with a second network device through the first tunnel, communicates with a third network device through the second tunnel, and communicates with a fourth network device through the third tunnel. The method specifically includes the following steps: The first network device receives a first VPN route sent by the second network device and a second VPN route sent by the third network device. The first VPN route includes a first VPN identifier, a route prefix, an RD, and a first next hop. The first next hop is the second network device. The first VPN identifier is associated with a first VPN instance. The second VPN route includes a second VPN identifier, the route prefix, the RD, and a second next hop. The second next hop is the third network device. The second VPN identifier is associated with a second VPN instance. The first VPN instance and the second VPN instance are associated with a same VPN. The first VPN route and the second VPN route include the same route prefix and the same RD. The first VPN route and the second VPN route are routes that belong to the same VPN. In this way, fast reroute or load balancing can be formed based on the VPN routes that belong to the same VPN.

The first network device allocates, based on a one-VPN-identifier-per-next-hop manner, a same VPN identifier to received VPN routes that have a same next hop and a same RD. The first network device allocates a third VPN identifier to the first VPN route and the second VPN route. The first network device stores a first correspondence between the third VPN identifier and the first VPN identifier and a second correspondence between the third VPN identifier and the second VPN identifier on a forwarding plane. When forwarding a packet, the first network device can guide packet forwarding based on the first correspondence and the second correspondence. In a scenario in which the first VPN route and the second VPN route form the fast reroute, the first network device can quickly switch to use the first correspondence or the second correspondence to guide the packet forwarding. In a scenario in which the first VPN route and the second VPN route form the load balancing, the first network device can use the first correspondence and the second correspondence to guide the packet forwarding.

The first network device advertises a third VPN route to the fourth network device. The third VPN route includes the third VPN identifier, the route prefix, the RD, and a third next hop. The third next hop is the first network device. The fourth network device can continue to advertise a route based on the obtained third VPN route, and can forward a packet to the first network device based on the third VPN route.

In a possible implementation, the first correspondence may be stored in a first forwarding entry. The second correspondence may be stored in a second forwarding entry. The first forwarding entry and the second forwarding entry are entries for guiding the packet forwarding. The first forwarding entry and the second forwarding entry may belong to a forwarding table. It should be noted that the forwarding table in this application is a table that is stored on the forwarding plane and that is for guiding the packet forwarding in a broad sense. A specific type of the forwarding table is not limited in this application.

In another possible implementation, the first VPN identifier and the third VPN identifier may be stored in a plurality of forwarding tables. The first correspondence is formed based on a correspondence between the plurality of forwarding tables. Similarly, the second VPN identifier and the third VPN identifier may be stored in a plurality of forwarding tables. The second correspondence is formed based on a correspondence between the plurality of forwarding tables.

In some possible implementations, the first correspondence includes a correspondence between the third VPN identifier, the first VPN identifier, and first outbound interface information. The second correspondence includes a correspondence between the third VPN identifier, the second VPN identifier, and second outbound interface information. The first outbound interface information is associated with an outbound interface for forwarding a packet including the first VPN identifier, namely, an outbound interface connected to the first tunnel. The second outbound interface information is associated with an outbound interface for forwarding a packet including the second VPN identifier, namely, an outbound interface connected to the second tunnel. The first network device can determine, based on the first correspondence and the second correspondence, the tunnels for sending the packets.

In an example, the first outbound interface information may be a first tunnel identifier ID. The first tunnel ID identifies the first tunnel. The second outbound interface information may be a second tunnel identifier ID. The second tunnel ID identifies the second tunnel.

In another example, the first outbound interface information may be a first outbound interface identifier ID. The first outbound interface ID identifies an outbound interface that is of the first network device and that is connected to the first tunnel. The second outbound interface information may be a second outbound interface ID. The second outbound interface ID identifies an outbound interface that is of the first network device and that is connected to the second tunnel.

In some possible implementations, the first VPN route, the second VPN route, and the third VPN route are Ethernet virtual private network EVPN routes, virtual private network version 4 VPNv4 routes, or virtual private network version 6 VPNv6 routes.

In some possible implementations, a VPN identifier may be specifically an MPLS label or an SRv6 SID. The MPLS label may be an MPLS label defined in an MPLS technology, or may be an SID defined in a segment routing-multiprotocol label switching SR-MPLS technology. The SID defined in the SR-MPLS technology is in a format of the MPLS label.

In an example, the first VPN identifier is a first MPLS label, the second VPN identifier is a second MPLS label, and the third VPN identifier is a third MPLS label.

In another example, the first VPN identifier is a first MPLS label, the second VPN identifier is a second MPLS label, and the third VPN identifier is a segment routing over internet protocol version 6 segment identifier SRv6 SID.

In still another example, the first VPN identifier is a first SRv6 SID, the second VPN identifier is a second SRv6 SID, and the third VPN identifier is an MPLS label.

In yet another example, the first VPN identifier is a first SRv6 SID, the second VPN identifier is a second SRv6 SID, and the third VPN identifier is a third SRv6 SID.

In some possible implementations, the first network device receives, through the third tunnel, a first packet sent by the fourth network device. The first packet includes the third VPN identifier. The first network device can process the first packet based on the first correspondence, to obtain a second packet including the first VPN identifier. The first network device sends the second packet to the second network device through the first tunnel.

In some possible implementations, the first VPN route and the second VPN route form the fast reroute.

In an example, the first VPN route is an active route, and the second VPN route is a standby route. The first network device forwards the packet based on the active route.

In another example, the first VPN route and the second VPN route form the fast reroute. The first VPN route is a standby route, and the second VPN route is an active route. After receiving the first packet and before processing the first packet based on the first correspondence, the first network device determines that the active route is unreachable. The first network device forwards the first packet based on the standby route.

In some possible implementations, the first VPN route and the second VPN route form the load balancing. The first network device further receives, through the third tunnel, a third packet sent by the fourth network device. The third packet includes the third VPN identifier. The first network device processes the third packet based on the second correspondence, to obtain a fourth packet. The fourth packet includes the second VPN identifier. The first network device sends the fourth packet to the third network device through the second tunnel.

In some possible implementations, the first tunnel and the third tunnel form a stitching tunnel. The second tunnel and the third tunnel also form a stitching tunnel.

In some possible implementations, the first tunnel and the third tunnel form an inter-AS stitching tunnel. The second tunnel and the third tunnel form an inter-AS stitching tunnel.

In some possible implementations, the first network device is a first autonomous system border router ASBR, the fourth network device is a second ASBR, and an external border gateway protocol EBGP peer is established between the first ASBR and the second ASBR.

In some possible implementations, the first network device is a third ASBR, the fourth network device is a first provider edge PE device, and an interior border gateway protocol IBGP peer is established between the third ASBR and the first PE device.

In some possible implementations, the first network device is an extensible gateway xGW, the fourth network device is a second PE device, and an interior border gateway protocol IBGP peer is established between the xGW and the second PE device.

According to a second aspect, this application provides a packet forwarding method. The method is applied to a first network device. The first network device is a tunnel endpoint of a first tunnel, a tunnel endpoint of a second tunnel, and a tunnel endpoint of a third tunnel. The first network device communicates with a second network device through the first tunnel, communicates with a third network device through the second tunnel, and communicates with a fourth network device through the third tunnel. A first correspondence between a first VPN identifier and a third VPN identifier and a second correspondence between a second VPN identifier and the third VPN identifier are stored on a forwarding plane of the first network device. In a fast-reroute scenario, the first network device can quickly switch to use the first correspondence or the second correspondence to guide packet forwarding. In a load balancing scenario, the first network device can use the first correspondence and the second correspondence to guide the packet forwarding.

The first network device obtains a first packet that is sent by the fourth network device and that includes the third VPN identifier. The first network device processes the first packet based on the first correspondence, to obtain a second packet including the first VPN identifier. The first network device sends the second packet to the second network device through the first tunnel.

In some possible implementations, fast reroute can be formed based on the first tunnel and the second tunnel.

In an example, the first tunnel is an active tunnel, and the second network device is an active next hop. The second tunnel is a standby tunnel, and the third network device is a standby next hop.

In another example, the second tunnel is an active tunnel, and the third network device is an active next hop. The first tunnel is a standby tunnel, and the second network device is a standby next hop. When determining that the third network device is unreachable, the first network device forwards the packet by using the standby tunnel. Specifically, after the first network device obtains the first packet sent by the fourth network device, and before the first network device obtains the second packet based on the first packet and the first correspondence, the first network device determines that the third network device is unreachable.

In some possible implementations, the first tunnel and second tunnel form load balancing.

The first network device further obtains a third packet including the third VPN identifier. The first network device processes the third packet based on the second correspondence, to obtain a fourth packet including the second VPN identifier. The first network device sends the fourth packet to the third network device through the second tunnel.

In a possible implementation, the first correspondence may be stored in a first forwarding entry. The second correspondence may be stored in a second forwarding entry. The first forwarding entry and the second forwarding entry are entries for guiding the packet forwarding. The first forwarding entry and the second forwarding entry may belong to a forwarding table. It should be noted that the forwarding table in this application is a table that is stored on the forwarding plane and that is for guiding the packet forwarding in a broad sense. A specific type of the forwarding table is not limited in this application.

In another possible implementation, the first VPN identifier and the third VPN identifier may be stored in a plurality of forwarding tables. The first correspondence is formed based on a correspondence between the plurality of forwarding tables. Similarly, the second VPN identifier and the third VPN identifier may be stored in a plurality of forwarding tables. The second correspondence is formed based on a correspondence between the plurality of forwarding tables.

In some possible implementations, the first correspondence includes a correspondence between the third VPN identifier, the first VPN identifier, and first outbound interface information. The second correspondence includes a correspondence between the third VPN identifier, the second VPN identifier, and second outbound interface information. The first outbound interface information is associated with an outbound interface for forwarding a packet including the first VPN identifier, namely, an outbound interface connected to the first tunnel. The second outbound interface information is associated with an outbound interface for forwarding a packet including the second VPN identifier, namely, an outbound interface connected to the second tunnel. The first network device can determine, based on the first correspondence and the second correspondence, the tunnels for sending the packets.

In an example, the first outbound interface information may be a first tunnel identifier ID. The first tunnel ID identifies the first tunnel. The second outbound interface information may be a second tunnel identifier ID. The second tunnel ID identifies the second tunnel.

In another example, the first outbound interface information may be a first outbound interface identifier ID. The first outbound interface ID identifies an outbound interface that is of the first network device and that is connected to the first tunnel. The second outbound interface information may be a second outbound interface ID. The second outbound interface ID identifies an outbound interface that is of the first network device and that is connected to the second tunnel.

In some possible implementations, a first VPN route, a second VPN route, and a third VPN route are Ethernet virtual private network EVPN routes, virtual private network version 4 VPNv4 routes, or virtual private network version 6 VPNv6 routes.

In some possible implementations, a VPN identifier may be specifically an MPLS label or an SRv6 SID. The MPLS label may be an MPLS label defined in an MPLS technology, or may be an SID defined in a segment routing-multiprotocol label switching SR-MPLS technology. The SID defined in the SR-MPLS technology is in a format of the MPLS label.

In an example, the first VPN identifier is a first MPLS label, the second VPN identifier is a second MPLS label, and the third VPN identifier is a third MPLS label.

In another example, the first VPN identifier is a first MPLS label, the second VPN identifier is a second MPLS label, and the third VPN identifier is a segment routing over internet protocol version 6 segment identifier SRv6 SID.

In still another example, the first VPN identifier is a first SRv6 SID, the second VPN identifier is a second SRv6 SID, and the third VPN identifier is an MPLS label.

In yet another example, the first VPN identifier is a first SRv6 SID, the second VPN identifier is a second SRv6 SID, and the third VPN identifier is a third SRv6 SID.

In some possible implementations, the first packet and the second packet may be MPLS packets.

Specifically, the first network device deletes, based on the first correspondence, the third VPN identifier included in the first packet. The first network device encapsulates the first VPN identifier into a packet obtained by deleting the third VPN identifier, to obtain the second packet including the first VPN identifier. The first VPN identifier is an MPLS label.

In some possible implementations, the first packet and the second packet may be SRv6 packets.

Specifically, the third VPN identifier is a destination address of the first packet. The first network device replaces the destination address of the first packet with the first VPN identifier based on the first correspondence, to obtain the second packet including the first VPN identifier. The first VPN identifier is an SRv6 SID.

In some possible implementations, the first packet may be an MPLS packet, and the second packet may be an SRv6 packet.

Specifically, the first network device decapsulates the first packet, removes an MPLS packet header, and performs segment routing over internet protocol version 6 SRv6 encapsulation on a decapsulated packet, to obtain the second packet. The second packet is an SRv6 packet. The second packet includes the first VPN identifier. The first VPN identifier is an SRv6 segment identifier SID.

In some possible implementations, the first packet may be an SRv6 packet, and the second packet may be an MPLS packet.

Specifically, the first network device decapsulates the first packet, removes an IPv6 packet header, and performs MPLS encapsulation on a decapsulated packet, to obtain the second packet. The second packet may be an MPLS packet. The second packet includes the first VPN identifier. The first VPN identifier is an MPLS label.

Similarly, in some possible implementations, the third packet and the fourth packet may be MPLS packets.

Specifically, the first network device deletes, based on the second correspondence, the third VPN identifier included in the third packet. The first network device encapsulates the second VPN identifier into a packet obtained by deleting the third VPN identifier, to obtain the fourth packet including the second VPN identifier. The second VPN identifier is an MPLS label.

In some possible implementations, the third packet and the fourth packet may be SRv6 packets.

Specifically, the third VPN identifier is a destination address of the third packet. The first network device replaces the destination address of the third packet with the second VPN identifier based on the second correspondence, to obtain the fourth packet including the second VPN identifier. The second VPN identifier is an SRv6 SID.

In some possible implementations, the third packet may be an MPLS packet, and the fourth packet may be an SRv6 packet.

Specifically, the first network device decapsulates the third packet, removes an MPLS packet header, and performs segment routing over internet protocol version 6 SRv6 encapsulation on a decapsulated packet, to obtain the fourth packet. The fourth packet is an SRv6 packet. The fourth packet includes the second VPN identifier. The second VPN identifier is an SRv6 segment identifier SID.

In some possible implementations, the third packet may be an SRv6 packet, and the fourth packet may be an MPLS packet.

Specifically, the first network device decapsulates the third packet, removes an IPv6 packet header, and performs MPLS encapsulation on a decapsulated packet, to obtain the fourth packet. The fourth packet may be an MPLS packet. The fourth packet includes the second VPN identifier. The second VPN identifier is an MPLS label.

In some possible implementations, the first correspondence includes the correspondence between the third VPN identifier, the first VPN identifier, and the first outbound interface information. The second correspondence includes the correspondence between the third VPN identifier, the second VPN identifier, and the second outbound interface information. The first outbound interface information is associated with the outbound interface for forwarding the packet including the first VPN identifier. The second outbound interface information is associated with the outbound interface for forwarding the packet including the second VPN identifier. The first network device can determine, based on the first correspondence and the second correspondence, the tunnels and/or the outbound interfaces for sending the packets.

In an example, the first outbound interface information may be the first tunnel identifier ID. The first tunnel ID identifies the first tunnel. The second outbound interface information may be the second tunnel identifier ID. The second tunnel ID identifies the second tunnel.

In another example, the first outbound interface information may be the first outbound interface identifier ID. The first outbound interface ID identifies the outbound interface that is of the first network device and that is connected to the first tunnel. The second outbound interface information may be the second outbound interface ID. The second outbound interface ID identifies the outbound interface that is of the first network device and that is connected to the second tunnel.

In some possible implementations, the first tunnel and the third tunnel form a stitching tunnel. The second tunnel and the third tunnel form a stitching tunnel.

In some possible implementations, the first tunnel and the third tunnel form an inter-AS stitching tunnel. The second tunnel and the third tunnel form an inter-AS stitching tunnel.

In some possible implementations, the first network device is a first autonomous system border router ASBR, the fourth network device is a second ASBR, and an external border gateway protocol EBGP peer is established between the first ASBR and the second ASBR.

In some possible implementations, the first network device is a third ASBR, the fourth network device is a first provider edge PE device, and an interior border gateway protocol IBGP peer is established between the third ASBR and the first PE device.

In some possible implementations, the first network device is an extensible gateway xGW, the fourth network device is a second PE device, and an interior border gateway protocol IBGP peer is established between the xGW and the second PE device.

According to a third aspect, this application provides a network device for route advertisement. The network device is applied to a first network device, and the network device includes a transceiver module and a processing module.

The transceiver module is configured to receive a first virtual private network VPN route sent by a second network device, and receive a second VPN route sent by a third network device, where the first VPN route includes a first VPN identifier, a route prefix, a route distinguisher RD, and a first next hop, the first next hop is the second network device, the first network device communicates with the second network device through a first tunnel, the first network device is a tunnel endpoint of the first tunnel, the first VPN identifier is associated with a first VPN instance, the second VPN route includes a second VPN identifier, the route prefix, the RD, and a second next hop, the second next hop is the third network device, the first network device communicates with the third network device through a second tunnel, the first network device is a tunnel endpoint of the second tunnel, the second VPN identifier is associated with a second VPN instance, and the first VPN instance and the second VPN instance are associated with a same VPN.

The processing module is configured to: allocate a third VPN identifier to the first VPN route, store a first correspondence between the third VPN identifier and the first VPN identifier on a forwarding plane, allocate the third VPN identifier to the second VPN route, and store a second correspondence between the third VPN identifier and the second VPN identifier on the forwarding plane, where the first network device allocates, based on a one-VPN-identifier-per-next-hop manner, a same VPN identifier to received VPN routes that have a same next hop and a same RD The transceiver module is further configured to advertise a third VPN route to a fourth network device, where the third VPN route includes the third VPN identifier, the route prefix, the RD, and a third next hop, the third next hop is the first network device, the first network device communicates with the fourth network device through a third tunnel, and the first network device is a tunnel endpoint of the third tunnel.

In some possible implementations, the first correspondence includes a correspondence between the third VPN identifier, the first VPN identifier, and first outbound interface information. The second correspondence includes a correspondence between the third VPN identifier, the second VPN identifier, and second outbound interface information. The first outbound interface information is associated with an outbound interface for forwarding a packet including the first VPN identifier. The second outbound interface information is associated with an outbound interface for forwarding a packet including the second VPN identifier. The first network device can determine, based on the first correspondence and the second correspondence, the tunnels for sending the packets.

In an example, the first outbound interface information may be a first tunnel identifier ID. The first tunnel ID identifies the first tunnel. The second outbound interface information may be a second tunnel identifier ID. The second tunnel ID identifies the second tunnel.

In another example, the first outbound interface information may be a first outbound interface identifier ID. The first outbound interface ID identifies an outbound interface that is of the first network device and that is connected to the first tunnel. The second outbound interface information may be a second outbound interface ID. The second outbound interface ID identifies an outbound interface that is of the first network device and that is connected to the second tunnel.

In some possible implementations, the first VPN route, the second VPN route, and the third VPN route are Ethernet virtual private network EVPN routes, virtual private network version 4 VPNv4 routes, or virtual private network version 6 VPNv6 routes.

In some possible implementations, the first VPN identifier is a first MPLS label, the second VPN identifier is a second MPLS label, and the third VPN identifier is a third MPLS label.

In some possible implementations, the first VPN identifier is a first MPLS label, the second VPN identifier is a second MPLS label, and the third VPN identifier is a segment routing over internet protocol version 6 segment identifier SRv6 SID.

In some possible implementations, the first VPN identifier is a first SRv6 SID, the second VPN identifier is a second SRv6 SID, and the third VPN identifier is an MPLS label.

In some possible implementations, the first VPN identifier is a first SRv6 SID, the second VPN identifier is a second SRv6 SID, and the third VPN identifier is a third SRv6 SID.

In some possible implementations, the transceiver module is further configured to receive, through the third tunnel, a first packet sent by the fourth network device, where the first packet includes the third VPN identifier.

The processing module is further configured to process the first packet based on the first correspondence, to obtain a second packet, where the second packet includes the first VPN identifier.

The transceiver module is further configured to send the second packet to the second network device through the first tunnel.

In some possible implementations, the first VPN route and the second VPN route form fast reroute.

In some possible implementations, the first VPN route is an active route, and the second VPN route is a standby route.

In some possible implementations, the first VPN route and the second VPN route form fast reroute, the first VPN route is a standby route, the second VPN route is an active route, and the processing module is further configured to: after a receiving module receives the first packet and before the processing module processes the first packet based on the first correspondence, determine that the active route is unreachable.

In some possible implementations, the first VPN route and the second VPN route form load balancing.

In some possible implementations, the first VPN route and the second VPN route form load balancing, and the transceiver module is further configured to receive, through the third tunnel, a third packet sent by the fourth network device, where the third packet includes the third VPN identifier.

The processing module is further configured to process the third packet based on the second correspondence, to obtain a fourth packet, where the fourth packet includes the second VPN identifier.

The transceiver module is further configured to send the fourth packet to the third network device through the second tunnel.

In some possible implementations, the first tunnel and the third tunnel form a stitching tunnel.

In some possible implementations, the first tunnel and the third tunnel form an inter-AS stitching tunnel.

In some possible implementations, the first network device is a first autonomous system border router ASBR, the fourth network device is a second ASBR, and an external border gateway protocol EBGP peer is established between the first ASBR and the second ASBR.

In some possible implementations, the first network device is a third ASBR, the fourth network device is a first provider edge PE device, and an interior border gateway protocol IBGP peer is established between the third ASBR and the first PE device.

In some possible implementations, the first network device is an extensible gateway xGW, the fourth network device is a second PE device, and an interior border gateway protocol IBGP peer is established between the xGW and the second PE device.

According to a fourth aspect, this application provides a network device for packet forwarding. The network device is applied to a first network device, and the network device includes a transceiver module and a processing module.

The transceiver module is configured to obtain a first packet sent by a fourth network device, where the first packet includes a third VPN identifier, the first network device communicates with the fourth network device through a third tunnel, the first network device is a tunnel endpoint of the third tunnel, the first network device communicates with a second network device through a first tunnel, the first network device is a tunnel endpoint of the first tunnel, the first network device communicates with a third network device through a second tunnel, the first network device is a tunnel endpoint of the second tunnel, and a first correspondence between a first VPN identifier and the third VPN identifier and a second correspondence between a second VPN identifier and the third VPN identifier are stored on a forwarding plane of the first network device.

The processing module is configured to process the first packet based on the first correspondence, to obtain a second packet, where the second packet includes the first VPN identifier.

The transceiver module is further configured to send the second packet to the second network device through the first tunnel.

In some possible implementations, the first tunnel and the second tunnel form fast reroute.

In an example, the first tunnel is an active tunnel, and the second tunnel is a standby tunnel.

In another example, the first tunnel is a standby tunnel, and the second tunnel is an active tunnel.

In some possible implementations, the first tunnel is a standby tunnel, and the second tunnel is an active tunnel. The processing module is further configured to: after a receiving module obtains the first packet sent by the fourth network device, and before obtaining the second packet based on the first packet and the first correspondence, determine that the third network device is unreachable.

In some possible implementations, the first tunnel and the second tunnel form load balancing.

The transceiver module is further configured to obtain a third packet, where the third packet includes the third VPN identifier.

The processing module is further configured to process the third packet based on the second correspondence, to obtain a fourth packet, where the fourth packet includes the second VPN identifier.

The transceiver module is further configured to send the fourth packet to the third network device through the second tunnel, where the first network device communicates with the third network device through the second tunnel, and the first network device is the tunnel endpoint of the second tunnel.

In some possible implementations, the first packet is a multiprotocol label switching MPLS packet, and that the processing module is configured to process the first packet based on the first correspondence, to obtain a second packet includes:

The processing module is configured to decapsulate the MPLS packet, remove an MPLS packet header, and perform segment routing over internet protocol version 6 SRv6 encapsulation on a decapsulated packet, to obtain the second packet, where the second packet includes the first VPN identifier, and the first VPN identifier is an SRv6 segment identifier SID.

In some possible implementations, the first packet is an SRv6 packet, and that the processing module is configured to process the first packet based on the first correspondence, to obtain a second packet includes:

The processing module is configured to decapsulate the SRv6 packet, remove an IPv6 packet header, and perform MPLS encapsulation on a decapsulated packet, to obtain the second packet, where the second packet includes the first VPN identifier, and the first VPN identifier is an MPLS label.

In some possible implementations, that the processing module is configured to process the first packet based on the first correspondence, to obtain a second packet includes:

The processing module is configured to replace the third VPN identifier in the first packet with the first VPN identifier based on the first correspondence, to obtain the second packet.

In some possible implementations, the first packet is an MPLS packet, and that the processing module is configured to replace the third VPN identifier in the first packet with the first VPN identifier based on the first correspondence, to obtain the second packet includes:

The processing module is configured to delete, based on the first correspondence, the third VPN identifier included in the first packet, and encapsulate the first VPN identifier into a packet obtained by deleting the third VPN identifier, to obtain the second packet, where the first VPN identifier is an MPLS label.

In some possible implementations, the first packet is an SRv6 packet, the third VPN identifier is a destination address of the SRv6 packet, and that the processing module is configured to replace the third VPN identifier in the first packet with the first VPN identifier based on the first correspondence, to obtain the second packet includes:

The first network device replaces the destination address of the SRv6 packet with the first VPN identifier based on the first correspondence, to obtain the second packet, where the first VPN identifier is an SRv6 SID.

In some possible implementations, the first correspondence includes a correspondence between the third VPN identifier, the first VPN identifier, and first outbound interface information. The second correspondence includes a correspondence between the third VPN identifier, the second VPN identifier, and second outbound interface information. The first outbound interface information is associated with an outbound interface for forwarding a packet including the first VPN identifier. The second outbound interface information is associated with an outbound interface for forwarding a packet including the second VPN identifier. The first network device can determine, based on the first correspondence and the second correspondence, the tunnels for sending the packets.

In an example, the first outbound interface information may be a first tunnel identifier ID. The first tunnel ID identifies the first tunnel. The second outbound interface information may be a second tunnel identifier ID. The second tunnel ID identifies the second tunnel.

In another example, the first outbound interface information may be a first outbound interface identifier ID. The first outbound interface ID identifies an outbound interface that is of the first network device and that is connected to the first tunnel. The second outbound interface information may be a second outbound interface ID. The second outbound interface ID identifies an outbound interface that is of the first network device and that is connected to the second tunnel.

According to a fifth aspect, this application provides a network system. The network system includes a first network device, a second network device, a third network device, and a fourth network device. The first network device is a tunnel endpoint of a first tunnel, a tunnel endpoint of a second tunnel, and a tunnel endpoint of a third tunnel. The first network device communicates with the second network device through the first tunnel, communicates with the third network device through the second tunnel, and communicates with the fourth network device through the third tunnel.

The second network device is configured to send a first VPN route to the first network device, where the first VPN route includes a first VPN identifier, a route prefix, a route distinguisher RD, and a first next hop, the first next hop is the second network device, and the first VPN identifier is associated with a first VPN instance.

The first network device is configured to receive a first virtual private network VPN route sent by the second network device.

The third network device is configured to send a second VPN route to the first network device, where the second VPN route includes a second VPN identifier, the route prefix, the RD, and a second next hop, the second next hop is the third network device, the second VPN identifier is associated with a second VPN instance, and the first VPN instance and the second VPN instance are associated with a same VPN.

The first network device is further configured to receive the second VPN route sent by the third network device.

The first network device is further configured to: allocate a third VPN identifier to the first VPN route, store a first correspondence between the third VPN identifier and the first VPN identifier on a forwarding plane, allocate the third VPN identifier to the second VPN route, and store a second correspondence between the third VPN identifier and the second VPN identifier on the forwarding plane, where the first network device allocates, based on a one-VPN-identifier-per-next-hop manner, a same VPN identifier to received VPN routes that have a same next hop and a same RD.

The first network device is further configured to advertise a third VPN route to the fourth network device, where the third VPN route includes the third VPN identifier, the route prefix, the RD, and a third next hop, and the third next hop is the first network device.

The fourth network device is configured to obtain the third VPN route sent by the first network device.

In some possible implementations, the first correspondence includes a correspondence between the third VPN identifier, the first VPN identifier, and first outbound interface information. The second correspondence includes a correspondence between the third VPN identifier, the second VPN identifier, and second outbound interface information. The first outbound interface information is associated with an outbound interface for forwarding a packet including the first VPN identifier. The second outbound interface information is associated with an outbound interface for forwarding a packet including the second VPN identifier. The first network device can determine, based on the first correspondence and the second correspondence, the tunnels for sending the packets.

In an example, the first outbound interface information may be a first tunnel identifier ID. The first tunnel ID identifies the first tunnel. The second outbound interface information may be a second tunnel identifier ID. The second tunnel ID identifies the second tunnel.

In another example, the first outbound interface information may be a first outbound interface identifier ID. The first outbound interface ID identifies an outbound interface that is of the first network device and that is connected to the first tunnel. The second outbound interface information may be a second outbound interface ID. The second outbound interface ID identifies an outbound interface that is of the first network device and that is connected to the second tunnel.

In some possible implementations, the first VPN route, the second VPN route, and the third VPN route are Ethernet virtual private network EVPN routes, virtual private network version 4 VPNv4 routes, or virtual private network version 6 VPNv6 routes.

In some possible implementations, the first VPN identifier is a first MPLS label, the second VPN identifier is a second MPLS label, and the third VPN identifier is a third MPLS label.

In some possible implementations, the first VPN identifier is a first MPLS label, the second VPN identifier is a second MPLS label, and the third VPN identifier is a segment routing over internet protocol version 6 segment identifier SRv6 SID.

In some possible implementations, the first VPN identifier is a first SRv6 SID, the second VPN identifier is a second SRv6 SID, and the third VPN identifier is an MPLS label.

In some possible implementations, the first VPN identifier is a first SRv6 SID, the second VPN identifier is a second SRv6 SID, and the third VPN identifier is a third SRv6 SID.

In some possible implementations, the fourth network device is further configured to send a first packet to the first network device through the third tunnel, where the first packet includes the third VPN identifier.

The first network device is further configured to: receive, through the third tunnel, the first packet sent by the fourth network device, process the first packet based on the first correspondence, to obtain a second packet including the first VPN identifier, and send the second packet to the second network device through the first tunnel.

The second network device is further configured to obtain, through the first tunnel, the second packet sent by the first network device.

In some possible implementations, the first VPN route and the second VPN route form fast reroute.

In some possible implementations, the first VPN route is an active route, and the second VPN route is a standby route.

In some possible implementations, the first VPN route and the second VPN route form fast reroute, the first VPN route is a standby route, and the second VPN route is an active route.

After the first network device receives the first packet and before the first network device processes the first packet based on the first correspondence, the first network device is further configured to determine that the active route is unreachable.

In some possible implementations, the first VPN route and the second VPN route form load balancing.

In some possible implementations, the first VPN route and the second VPN route form load balancing.

The fourth network device is further configured to send a third packet to the first network device through the third tunnel, where the third packet includes the third VPN identifier.

The first network device is further configured to receive, through the third tunnel, the third packet sent by the fourth network device, process the third packet based on the second correspondence, to obtain a fourth packet including the second VPN identifier, and send the fourth packet to the third network device through the second tunnel.

The third network device is further configured to receive, through the second tunnel, the fourth packet sent by the first network device.

In some possible implementations, the first tunnel and the third tunnel form a stitching tunnel.

In some possible implementations, the first tunnel and the third tunnel form an inter-AS stitching tunnel.

In some possible implementations, the first network device is a first autonomous system border router ASBR, the fourth network device is a second ASBR, and an external border gateway protocol EBGP peer is established between the first ASBR and the second ASBR.

In some possible implementations, the first network device is a third ASBR, the fourth network device is a first provider edge PE device, and an interior border gateway protocol IBGP peer is established between the third ASBR and the first PE device.

In some possible implementations, the first network device is an extensible gateway xGW, the fourth network device is a second PE device, and an interior border gateway protocol IBGP peer is established between the xGW and the second PE device.

According to a sixth aspect, this application provides a network system. The network system includes a first network device, a second network device, a third network device, and a fourth network device. The first network device is a tunnel endpoint of a first tunnel, a tunnel endpoint of a second tunnel, and a tunnel endpoint of a third tunnel. The first network device communicates with the second network device through the first tunnel, communicates with the third network device through the second tunnel, and communicates with the fourth network device through the third tunnel.

The fourth network device is configured to send a first packet to the first network device, where the first packet includes a third VPN identifier.

The first network device is configured to process the first packet based on a first correspondence, to obtain a second packet including a first VPN identifier, and send the second packet to the second network device through the first tunnel.

In some possible implementations, the first tunnel and the second tunnel form fast reroute.

In some possible implementations, the first tunnel is an active tunnel, and the second tunnel is a standby tunnel.

In some possible implementations, the first tunnel is a standby tunnel, and the second tunnel is an active tunnel.

In some possible implementations, after the first network device obtains the first packet sent by the fourth network device, and before the first network device obtains the second packet based on the first packet and the first correspondence, the first network device is further configured to determine that the third network device is unreachable.

In some possible implementations, the first tunnel and the second tunnel form load balancing.

The fourth network device is further configured to send, to the first network device, a third packet including the third VPN identifier.

The first network device is further configured to: obtain the third packet including the third VPN identifier, process the third packet based on a second correspondence, to obtain a fourth packet including a second VPN identifier, and send the fourth packet to the third network device through the second tunnel.

The third network device is further configured to receive the fourth packet through the second tunnel.

In some possible implementations, the first packet is a multiprotocol label switching MPLS packet, and that the first network device is configured to process the first packet based on a first correspondence, to obtain a second packet includes:

The first network device is configured to decapsulate the MPLS packet, remove an MPLS packet header, and perform segment routing over internet protocol version 6 SRv6 encapsulation on a decapsulated packet, to obtain the second packet, where the second packet includes the first VPN identifier, and the first VPN identifier is an SRv6 segment identifier SID.

In some possible implementations, the first packet is an SRv6 packet, and that the first network device is configured to process the first packet based on a first correspondence, to obtain a second packet includes:

The first network device is configured to decapsulate the SRv6 packet, remove an IPv6 packet header, and perform MPLS encapsulation on a decapsulated packet, to obtain the second packet, where the second packet includes the first VPN identifier, and the first VPN identifier is an MPLS label.

In some possible implementations, that the first network device is configured to process the first packet based on a first correspondence, to obtain a second packet includes:

The first network device is configured to replace the third VPN identifier in the first packet with the first VPN identifier based on the first correspondence, to obtain the second packet.

In some possible implementations, the first packet is an MPLS packet, and that the first network device is configured to replace the third VPN identifier in the first packet with the first VPN identifier based on the first correspondence, to obtain the second packet includes:

The first network device is configured to delete, based on the first correspondence, the third VPN identifier included in the first packet, and encapsulate the first VPN identifier into a packet obtained by deleting the third VPN identifier, to obtain the second packet, where the second packet includes the first VPN identifier, and the first VPN identifier is an MPLS label.

In some possible implementations, the first packet is an SRv6 packet, the third VPN identifier is a destination address of the first packet, and that the first network device is configured to replace the third VPN identifier in the first packet with the first VPN identifier based on the first correspondence, to obtain the second packet includes:

The first network device is configured to replace the destination address of the first packet with the first VPN identifier based on the first correspondence, to obtain the second packet, where the first VPN identifier is an SRv6 SID.

In some possible implementations, the first correspondence includes a correspondence between the third VPN identifier, the first VPN identifier, and a first tunnel identifier ID, and the first tunnel ID identifies the first tunnel. The second correspondence includes a correspondence between the third VPN identifier, the second VPN identifier, and a second tunnel identifier, and the second tunnel ID identifies the second tunnel.

According to a seventh aspect, this application provides a network device. The network device includes a processor and a memory. The memory is configured to store instructions or program code. The processor is configured to invoke the instructions or the program code from the memory, run the instructions or the program code, and perform the method according to any one of the first aspect or the possible implementations of the first aspect or the method according to any one of the second aspect or the possible implementations of the second aspect.

According to an eighth aspect, this application provides a network system. The network system includes the network device according to the third aspect or the fourth aspect.

According to a ninth aspect, this application provides a computer-readable storage medium, including instructions, a program, or code. When the instructions, the program, or the code is executed on a computer, the computer is enabled to perform the route advertisement method according to any one of the first aspect or the possible implementations of the first aspect or the packet forwarding method according to any one of the second aspect or the possible implementations of the second aspect.

BRIEF DESCRIPTION OF THE DRAWINGS

FIG. 15 is a schematic flowchart of a route advertisement method according to an embodiment of this application;

FIG. 16b is a schematic flowchart of another packet forwarding method according to an embodiment of this application;

DETAILED DESCRIPTION OF ILLUSTRATIVE EMBODIMENTS

To satisfy a requirement of inter-AS VPN deployment, in a conventional multiprotocol label switching (multiprotocol label switching, MPLS) VPN scenario, there are mainly three inter-AS manners for a VPN: an option A, an option B, and an option C. In a solution of the option B, ASBRs may transfer all VPN routes through one link, and no interface or VPN instance needs to be allocated to each VPN route. A configuration is simple.

Figure 1:
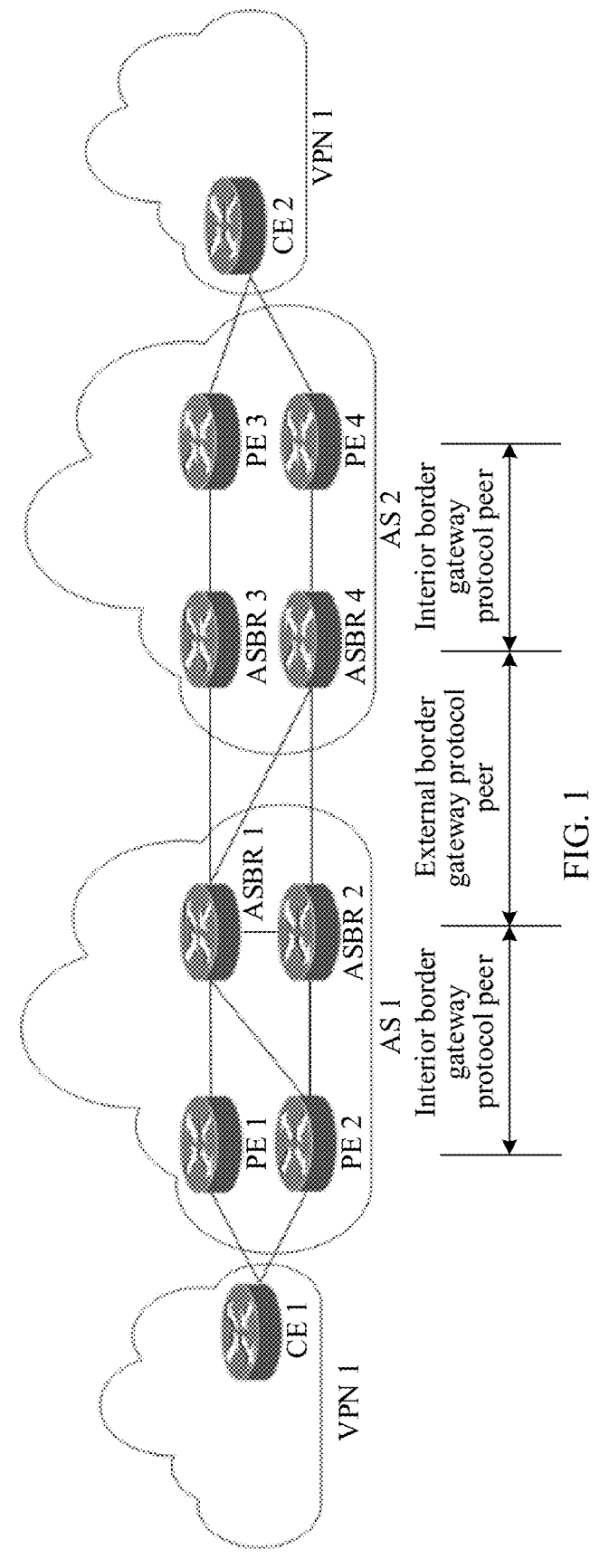
FIG. 1 is a schematic diagram of a network architecture according to an embodiment of this application.

FIG. 1 is a schematic diagram of a network architecture according to an embodiment of this application.

A network in FIG. 1 includes an AS 1 and an AS 2. The AS 1 includes a PE 1, a PE 2, an ASBR 1, and an ASBR 2.

The PE 1 and the PE 2 are connected to a customer edge (customer edge, CE) 1 in a VPN 1. An interior border gateway protocol (interior border gateway protocol, IBGP) peer is established between the PE 1 and the ASBR 1. The IBGP peer is established between the PE 2 and each of the ASBR 1 and the ASBR 2. The IBGP peer is established between the ASBR 1 and the ASBR 2.

The AS 2 includes a PE 3, a PE 4, an ASBR 3, and an ASBR 4. The PE 3 and the PE 4 each are connected to a CE 2 in the VPN 1. The IBGP peer is established between the ASBR 3 and the PE 3. The IBGP peer is established between the ASBR 4 and the PE 4. An external border gateway protocol (external border gateway protocol, EBGP) peer is established between the ASBR 1 and each of the ASBR 3 and the ASBR 4. The EBGP peer is established between the ASBR 2 and the ASBR 4.

The following first describes a VPN route advertisement process in the solution of the option B based on the network architecture shown in FIG. 1.

Figure 2:
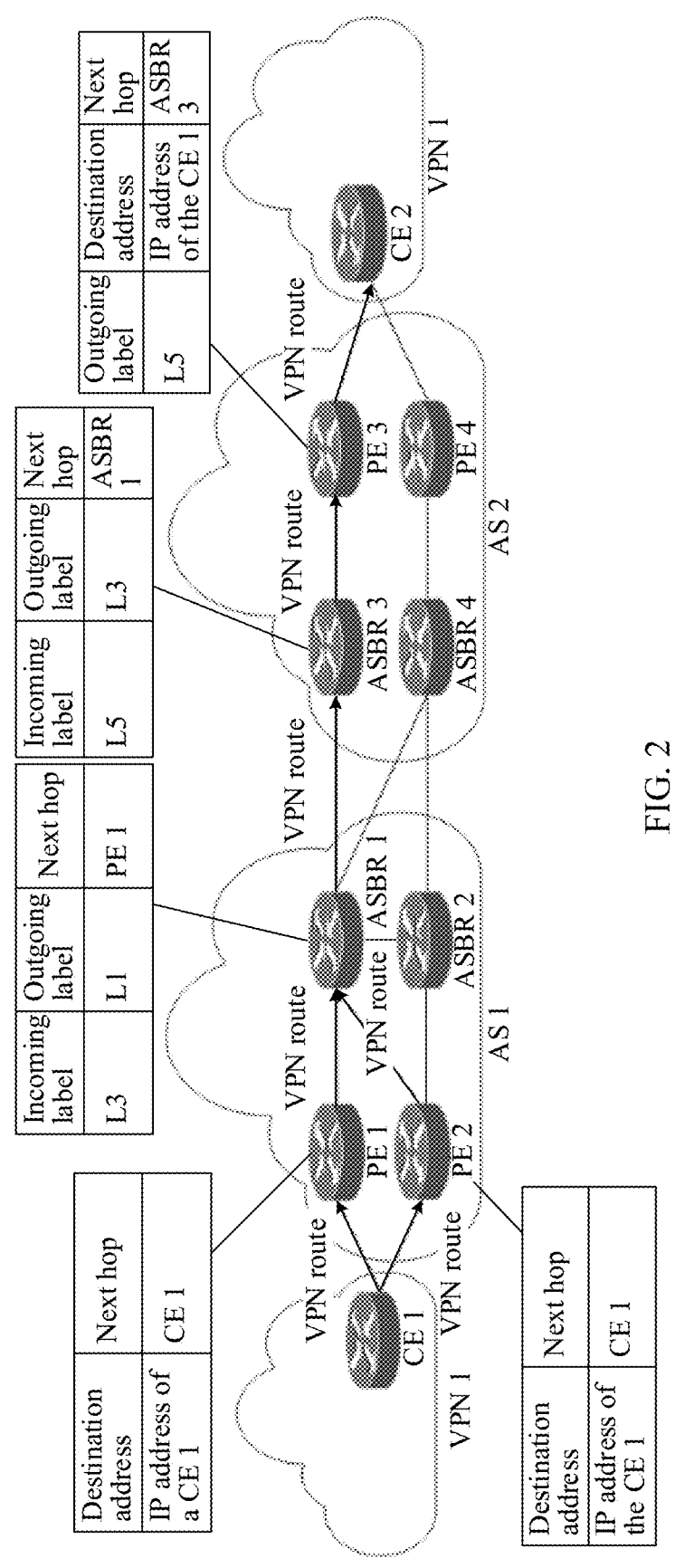
FIG. 2 is a schematic diagram of a network architecture according to an embodiment of this application.

FIG. 2 is a schematic diagram of a network architecture according to an embodiment of this application.

An AS 1 and an AS 2 are both MPLS domains.

A CE 1 separately advertises, to a PE 1 and a PE 2, a VPN route whose destination address is an internet protocol (internet protocol, IP) address of the CE 1.

The PE 1 obtains the VPN route from the CE 1, and stores the route in a VPN instance 1 related to the CE 1. The PE 1 uses a one-VPN-identifier-per-instance allocation manner. The PE 1 allocates a VPN identifier to VPN routes that belong to a same VPN instance. The PE 1 belongs to the MPLS domain, and the VPN identifier allocated to the VPN route is an MPLS label. In an MPLS domain scenario, the one-VPN-identifier-per-instance allocation manner is also referred to as a one-label-per-instance allocation manner. The PE 1 allocates a same MPLS label L1 to VPN routes that belong to the VPN instance 1. Similarly, the PE 2 obtains the VPN route from the CE 1, and stores the VPN route in a VPN instance 2 related to the CE 1. The PE 2 uses the one-VPN-identifier-per-instance allocation manner. The PE 2 allocates a VPN identifier to VPN routes that belong to a same VPN instance. The PE 2 belongs to the MPLS domain, and the VPN identifier allocated to the VPN route is an MPLS label. The PE 2 allocates a same MPLS label L2 to VPN routes that belong to the VPN instance 2. The PE 1 advertises a VPN route to an ASBR 1. The VPN route advertised by the PE 1 includes the MPLS label L1, a route prefix, and the next hop PE 1. The PE 2 advertises a VPN route to the ASBR 1. The VPN route advertised by the PE 2 includes the MPLS label L2, the route prefix, and the next hop PE 2. The PE 1 stores a correspondence between the destination address, namely, the IP address of the CE 1, and the next hop CE 1. The PE 2 stores the correspondence between the destination address, namely, the IP address of the CE 1, and the next hop CE 1.

The ASBR 1 uses a one-VPN-identifier-per-next-hop allocation manner. The ASBR 1 belongs to the MPLS domain, and allocates a same MPLS label to VPN routes that have a same next hop. In the MPLS domain scenario, the one-VPN-identifier-per-next-hop allocation manner is also referred to as a one-label-per-next-hop allocation manner. The VPN route advertised by the PE 1 and the VPN route advertised by the PE 2 that are obtained by the ASBR 1 have the same route prefix. The ASBR 1 uses, as a preferred VPN route, the VPN route advertised by the PE 1. The ASBR 1 allocates an MPLS label L3 to the VPN route whose next hop is the PE 1. The MPLS label L3 is an incoming label of the ASBR 1. The ASBR 1 stores a correspondence between the incoming label L3, the outgoing label L1, and the next hop PE 1 on a forwarding plane, and uses the correspondence between L3, L1, and the PE 1 to guide forwarding.

The ASBR 1 advertises, to an ASBR 3 based on the VPN route obtained from the PE 1, a VPN route including the MPLS label L3, the route prefix, and the next hop ASBR 1. The ASBR 3 uses the one-VPN-identifier-per-next-hop allocation manner. The ASBR 3 belongs to the MPLS domain, and allocates a same MPLS label to VPN routes that have a same MPLS label and a same next hop. The ASBR 3 allocates an MPLS label L5 to the VPN route whose MPLS label is L3 and whose next hop is the ASBR 1. The ASBR 3 stores a correspondence between the outgoing label L3, the incoming label L5, and the next hop ASBR 1 on a forwarding plane, and uses the correspondence between L3, L5, and the ASBR 1 to guide forwarding.

The ASBR 3 modifies the next hop of the obtained VPN to the ASBR 3. The ASBR 3 advertises, to a PE 3, a VPN route including the MPLS label L5, the route prefix, and next hop ASBR 3.

The PE 3 stores a correspondence between L5, the IP address of the CE 1, and the ASBR 3 on a forwarding plane based on the obtained VPN route. The PE 3 continues to advertise the VPN route to a CE 2.

The CE 2 can obtain the IP address of the CE 1 based on the obtained VPN route.

Based on the foregoing route allocation process, the following describes a process in which the CE 2 sends a packet to the CE 1.

The CE 2 sends a packet whose destination address is the IP address of the CE 1 to the PE 3. The PE 3 performs encapsulation based on the correspondence between L5, the IP address of the CE 1, and the ASBR 3, to obtain an MPLS packet including L5, and sends the MPLS packet to the ASBR 3.

The ASBR 3 replaces L5 included in the MPLS packet with L3 based on the correspondence between L3, L5, and the ASBR 1, and sends, to the ASBR 1, an MPLS packet including L3 and obtained through the label replacement.

The ASBR 1 replaces L3 included in the MPLS packet with L1 based on the correspondence between L3, L1, and the PE 1, and sends, to the PE 1, an MPLS packet including L1 and obtained through the label replacement.

The PE 1 removes an MPLS header of the MPLS packet to obtain an IP packet. The PE 1 sends the IP packet to the CE 1 based on the correspondence between the IP address of the CE 1 and the CE 1 and the IP address that is of the CE 1 and that is included in the IP packet. The CE 1 can obtain the IP packet for processing.

In some cases, the PE 1 may be unreachable. For example, the PE 1 may be faulty, or a link between the PE 1 and the ASBR 1 may be faulty. After perceiving that the PE 1 is unreachable, the ASBR 1 triggers local VPN-route convergence. The ASBR 1 re-selects a VPN route, and uses, as a route for transmitting the packet, the VPN route advertised by the PE 2. The ASBR 1 allocates an MPLS label L4 to the VPN route whose next hop is the PE 2. The MPLS label L4 is an incoming label of the ASBR 1. The ASBR 1 performs updating and stores a correspondence between the incoming label L4, the outgoing label L2, and the next hop PE 2 on the forwarding plane, and uses the correspondence between L4, L2, and the PE 2 to guide forwarding. The ASBR 1 advertises, to the ASBR 3, a VPN route including the MPLS label L4, the route prefix, and the next hop ASBR 1. The ASBR 3 allocates an MPLS label L6 to the VPN route whose MPLS label is L4 and next hop is the ASBR 1. The ASBR 3 updates the correspondence stored on the forwarding plane to a correspondence between L4, L6, and the ASBR 3. The ASBR 3 advertises, to the PE 3, a VPN route including the MPLS label L6 and the next hop ASBR 3. The PE 3 stores a correspondence between L6, the IP address of the CE 1, and the ASBR 3 on the forwarding plane, and advertises the VPN route to the CE 2.

The PE 3 encapsulates an IP packet sent by the CE 2 into an MPLS packet including L6, and sends the MPLS packet to the ASBR 3. The ASBR 3 replaces L6 included in the MPLS packet with L4 based on a correspondence between L4, L6, and the ASBR 1, and sends, to the ASBR 1, an MPLS packet including L4. The ASBR 1 replaces L4 included in the MPLS packet with L2 based on the correspondence between L2, L4, and the PE 2, and sends, to the PE 2, an MPLS packet including L2. The PE 2 removes an MPLS packet header of the obtained MPLS packet to obtain an IP packet. Then, the PE 2 sends the IP packet to the CE 1 based on the correspondence between the IP address of the CE 1 and the CE 1 and the IP address that is of the CE 1 and that is included in the IP packet.

Based on the foregoing content, it can be learned that, when the PE 1 is unreachable, a network needs to perform route convergence. In a convergence process, the CE 2 cannot send the packet to the CE 1. However, the convergence needs long time. Consequently, network transmission quality is affected.

In another possible scenario, the CE 2 sends a large quantity of packets to the CE 1, and it is difficult to quickly complete packet transmission through only one transmission path. Consequently, network transmission quality is affected.

Based on the foregoing problem, embodiments of this application provide a route advertisement method and a packet forwarding method. In the route advertisement method provided in embodiments of this application, a first network device obtains, through a first tunnel, a first VPN route advertised by a second network device, and obtains, through a second tunnel, a second VPN route advertised by a third network device. The first VPN route and the second VPN route have a same route prefix and a same route distinguisher (route distinguisher, RD) but different next hops and different VPN identifiers. The first network device allocates a same third VPN identifier to the first VPN route and the second VPN route. The first network device stores, on a forwarding plane, a first correspondence between the third VPN identifier and a first VPN identifier that is included in the first VPN route and a second correspondence between the third VPN identifier and a second VPN identifier that is included in the second VPN route. The first network device stores the first correspondence and the second correspondence, can forward a packet based on the first correspondence and the second correspondence, and supports fast reroute or load balancing. The first network device advertises, to a fourth network device through a third tunnel, a third VPN route including the third VPN identifier, the route prefix, the RD, and a third next hop. The third next hop is the first network device. The fourth network device can forward a packet to the first network device based on the third VPN route.

The first VPN route and the second VPN route can form the fast reroute. When an active route in the first VPN route and the second VPN route is unreachable, the first network device can quickly switch, based on the first correspondence and the second correspondence that are stored on the forwarding plane, to a standby route for packet forwarding, to improving transmission performance of a network. The first VPN route and the second VPN route may alternatively form the load balancing. The first network device can separately forward packets to the second network device and the third network device based om the first correspondence and the second correspondence that are stored on the forwarding plane, to implement the load balancing and improve transmission performance of a network.

In the packet forwarding method provided in embodiments of this application, a first correspondence and a second correspondence are stored on a forwarding plane of a first network device. The first correspondence includes a correspondence between a first VPN identifier and a third VPN identifier. The second correspondence includes a correspondence between a second VPN identifier and the third VPN identifier. The first network device can guide packet forwarding based on the first correspondence and the second correspondence that are stored on the forwarding plane. In a fast-reroute scenario, the first network device can switch to use the first correspondence or the second correspondence, to support fast switching on the forwarding plane, and improve transmission performance of a network. In a load balancing scenario, the first network device can separately send packets to a second network device and a third network device by using the first correspondence and the second correspondence, to improve packet transmission efficiency, and improve transmission performance of a network.

The following first describes application scenarios of the route advertisement method and the packet forwarding method provided in embodiments of this application.

In an example, the route advertisement method and the packet forwarding method provided in embodiments of this application are applicable to the network architecture shown in FIG. 1. For descriptions of the network architecture shown in FIG. 1, refer to the foregoing descriptions. Details are not described herein again.

In another example, an embodiment of this application further provides a possible applicable network architecture. Based on FIG. 3, the following describes another possible application scenario, provided in embodiments of this application, of the route advertisement method and the packet forwarding method.

Figure 3:
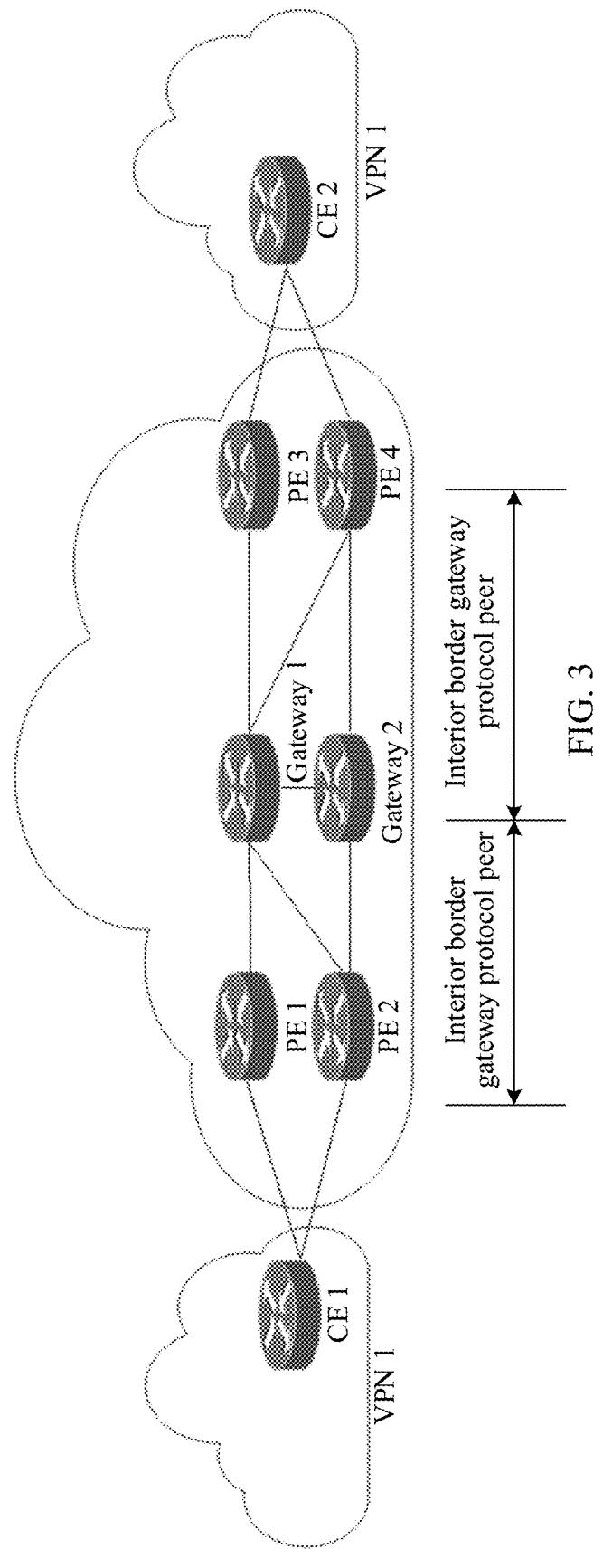
FIG. 3 is a schematic diagram of another network architecture according to an embodiment of this application.

FIG. 3 is a schematic diagram of another network architecture according to an embodiment of this application. A network shown in FIG. 3 includes a PE 1, a PE 2, a gateway 1, a gateway 2, a PE 3, and a PE 4. The PE 1 and the PE 2 are connected to a CE 1 in a VPN 1. An IBGP peer is established between the PE 1 and the gateway 1. The IBGP peer is established between the PE 2 and each of the gateway 1 and the gateway 2. The IBGP peer is established between the gateway 1 and the gateway 2. The IBGP peer is established between the PE 3 and the gateway 1. The IBGP peer is established between the PE 4 and each of the gateway 1 and the gateway 2. The PE 3 and the PE 4 are connected to a CE 2 in the VPN 1.

The gateway 1 and the gateway 2 may be extensible gateways (extensible gateways, xGWs). The PE 1, the PE 2, the PE 3, and the PE 4 may be aggregation site gateways (aggregation site gateways, ASGs).

It should be noted that the network architectures shown in FIG. 1 and FIG. 3 are merely possible implementations. The route advertisement method and the packet forwarding method provided in embodiments of this application can be applied to a network device connected to a tunnel and having a VPN identifier allocation function, a route advertisement function, and a packet forwarding function.

The following uses several application scenarios as examples to describe in detail the route advertisement method and the packet forwarding method provided in embodiments of this application.

Figure 4:
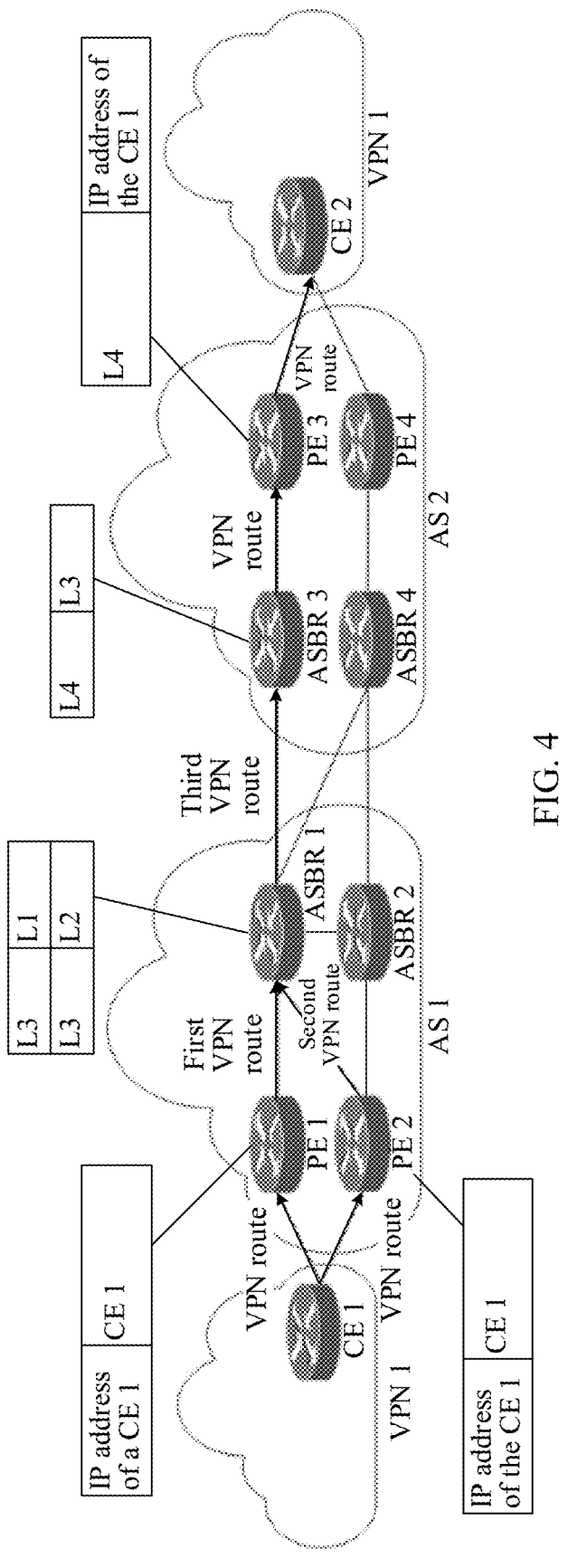
FIG. 4 is a schematic diagram of a network architecture in a scenario 1 according to an embodiment of this application.

Scenario 1: The network architecture shown in FIG. 1 is used as an example. FIG. 4 is a schematic diagram of a network architecture in a scenario 1 according to an embodiment of this application.

Figure 5:
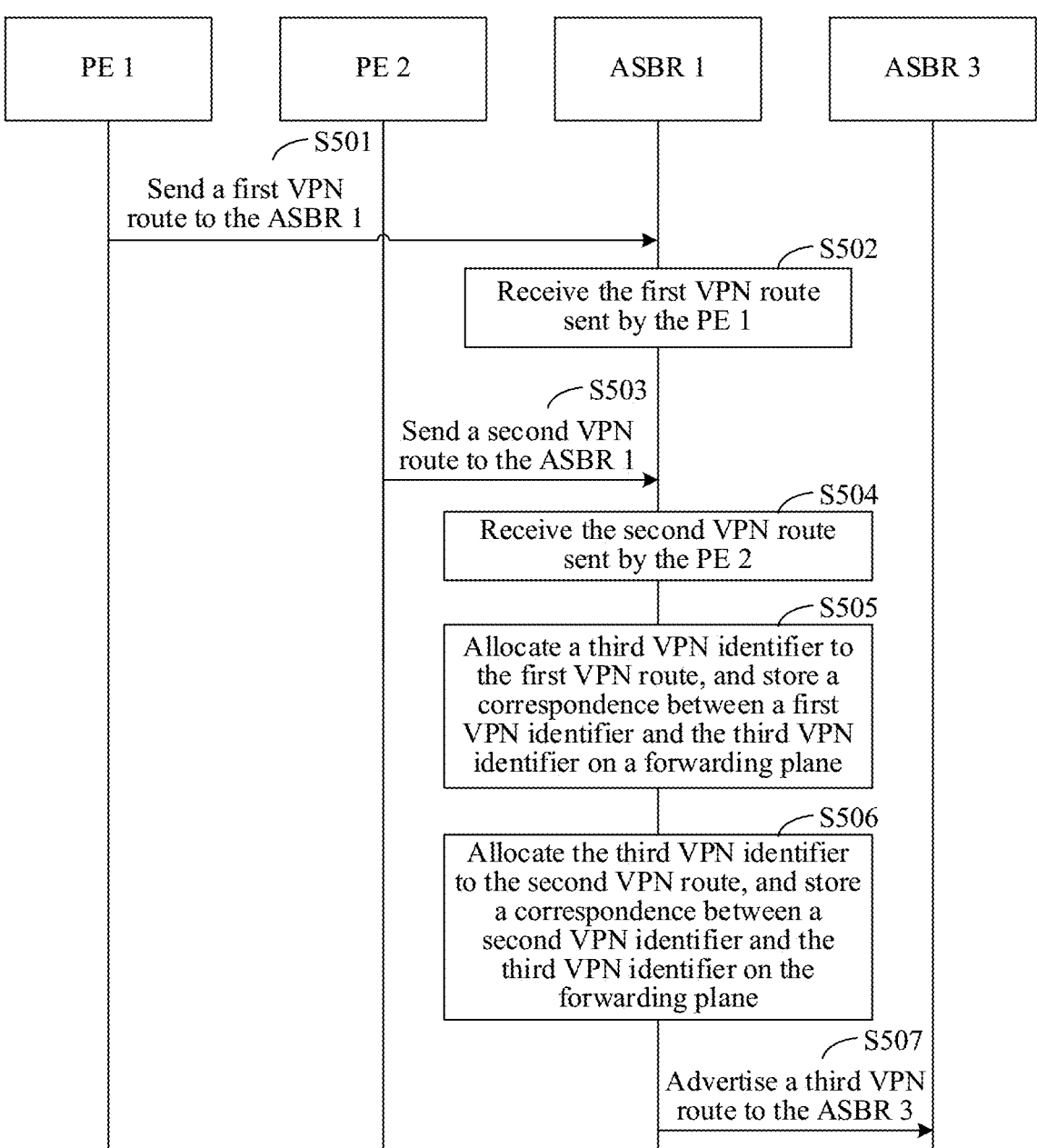
FIG. 5 is a schematic flowchart of a route advertisement method according to an embodiment of this application.

FIG. 5 is a schematic flowchart of a route advertisement method 500 according to an embodiment of this application. The method 500 may be applied to the network scenario shown in FIG. 4. The method 500 includes S501 to S507.

S501: A PE 1 sends a first VPN route to an ASBR 1.

The PE 1 can obtain a VPN route advertised by a CE 1. The VPN route advertised by the CE 1 belongs to a first VPN instance created by the PE 1. The PE 1 can generate a routing table of the first VPN instance based on the obtained VPN route advertised by the CE 1.

The PE 1 can allocate, in a one-VPN-identifier-per-instance manner, a same VPN identifier to VPN routes that belong to a same VPN instance. All VPN routes obtained by the PE 1 and advertised by the CE 1 belong to the first VPN instance. The PE 1 can allocate a first VPN identifier, namely, L1, to the VPN route advertised by the CE 1. The first VPN identifier is associated with the first VPN instance. In a packet forwarding process, the PE 1 can query the routing table of the first VPN instance based on the first VPN identifier included in a packet, to forward the packet.

A specific type of the first VPN identifier is related to a first tunnel for communication between the PE 1 and the ASBR 1.

In an example, the first tunnel is an MPLS tunnel, and the first VPN identifier is an MPLS label. It should be noted that the MPLS label may be an MPLS label defined in an MPLS technology, or may be an SID defined in a segment routing-multiprotocol label switching (segment routing-multiprotocol label switching, SR-MPLS) technology. The SID defined in the SR-MPLS technology is in a format of the MPLS label.

In another example, the first tunnel is a segment routing over internet protocol version 6 (segment routing over internet protocol version 6, SRv6) tunnel, and the first VPN identifier is an SRv6 segment identifier (segment identifier, SID).

The PE 1 generates the first VPN route, and sends the first VPN route to the ASBR 1 through the first tunnel.

The first VPN route includes the first VPN identifier, a route prefix, an RD, and a first next hop.

It should be noted that, in a possible implementation scenario, an AS 1 may be specifically an Ethernet virtual private network (Ethernet virtual private network, EVPN). The first VPN route may be specifically an EVPN route.

In addition, based on an address family to which an IP address included in a VPN belongs, the first VPN route may alternatively be a virtual private network version 4 (virtual private network version 4, VPNv4) route or a virtual private network version 6 (virtual private network version 6, VPNv6) route.

The route prefix included in the first VPN route may be a network segment to which an IP address included in a VPN 1 belongs. For example, the first VPN route is the VPNv4 route. The route prefix included in the first VPN route may be an internet protocol version 4 (internet protocol version 4, IPv4) address prefix.

The RD included in the first VPN route can identify that the first VPN route belongs to the VPN 1. A global configuration manner may be used for the RD, and VPN instances that are included in the PE 1 and a PE 2 and that correspond to the VPN 1 correspond to a same RD. In this way, VPN routes that are advertised by the PE 1 and the PE 2 and that belong to the VPN 1 include the same RD.

The first next hop included in the first VPN route advertised by the PE 1 is the PE 1.

S502: The ASBR 1 receives the first VPN route sent by the PE 1.

The ASBR 1 is a tunnel endpoint of the first tunnel. The ASBR 1 receives, through the first tunnel, the first VPN route sent by the PE 1.

S503: The PE 2 sends a second VPN route to the ASBR 1.

The PE 2 can also obtain a VPN route advertised by the CE 1. The VPN route advertised by the CE 1 belongs to a second VPN instance created by the PE 2. The PE 2 can generate a routing table of the second VPN instance based on the obtained VPN route advertised by the CE 1. Both the first VPN instance and the second VPN instance are associated with the VPN 1.

The PE 2 can allocate, in the one-VPN-identifier-per-instance manner, a same VPN identifier to VPN routes that belong to a same VPN instance. All VPN routes obtained by the PE 2 and advertised by the CE 1 belong to the second VPN instance. The PE 2 can allocate a second VPN identifier, namely, L2, to the VPN route advertised by the CE 1. The second VPN identifier is associated with the second VPN instance. In a packet forwarding process, the PE 2 can query the routing table of the second VPN instance based on the second VPN identifier included in a packet, to forward the packet.

A specific type of the second VPN identifier is related to a second tunnel for communication between the PE 2 and the ASBR 1.

In an example, the second tunnel is an MPLS tunnel, and the second VPN identifier is an MPLS label. In another example, the second tunnel is an SRv6 tunnel, and the second VPN identifier is an SRv6 SID.

It should be noted that a type of the second tunnel may be the same as a type of the first tunnel. Correspondingly, the type of the second VPN identifier is the same as the type of the first VPN identifier.

In an example, the first tunnel and the second tunnel are MPLS tunnels, and the first VPN identifier and the second VPN identifier are MPLS labels. In another example, the first tunnel and the second tunnel are SRv6 tunnels, and the first VPN identifier and the second VPN identifier are SRv6 SIDs.

The PE 2 generates the second VPN route, and sends the second VPN route to the ASBR 1 through the second tunnel.

The second VPN route includes the second VPN identifier, the route prefix, the RD, and a second next hop.

The second VPN route may alternatively be an EVPN route, a VPNv4 route, or a VPNv6 route. A route type of the second VPN route is the same as a route type of the first VPN route.

The second VPN route and the first VPN route each are generated based on the VPN route that is advertised by the CE 1 and that belongs to the VPN 1. The route prefix included in the second VPN route is the same as the route prefix included in the first VPN route. The RD included in the second VPN route is the same as the RD included in the first VPN route.

The second next hop included in the second VPN route advertised by the PE 2 is the PE 2.

S504: The ASBR 1 receives the second VPN route sent by the PE 2.

The ASBR 1 is a tunnel endpoint of the second tunnel. The ASBR 1 receives, through the second tunnel, the second VPN route sent by the PE 2.

S505: The ASBR 1 allocates a third VPN identifier to the first VPN route, and stores a correspondence between the first VPN identifier and the third VPN identifier on a forwarding plane.

The ASBR 1 allocates a VPN identifier to a received VPN route in a one-VPN-identifier-per-next-hop manner. In other words, the ASBR 1 allocates a same VPN identifier to VPN routes having a same next hop and a same RD.

All first next hops included in first VPN routes obtained by the ASBR 1 are the PE 1, and the first VPN routes include a same RD. The ASBR 1 allocates the third VPN identifier, namely, L3, to the first VPN route.

The ASBR 1 is also a tunnel endpoint of a third tunnel. The third tunnel is a tunnel between the ASBR 1 and an ASBR 3. In this embodiment of this application, the ASBR 1 and the ASBR 3 belong to different autonomous systems, and the third tunnel is an inter-AS tunnel. The ASBR 1 can connect the first tunnel and the third tunnel, to implement stitching of the first tunnel and the third tunnel. The ASBR 1 can also connect the second tunnel and the third tunnel, to implement stitching of the second tunnel and the third tunnel.

A type of the third VPN identifier allocated by the ASBR 1 is related to a tunnel type of the third tunnel. The third tunnel may be an MPLS tunnel. Correspondingly, the third VPN identifier is an MPLS label. The third tunnel may alternatively be an SRv6 tunnel. Correspondingly, the third VPN identifier is an SRv6 SID.

It should be noted that the type of the first tunnel is the same as the type of the second tunnel. The type of the third tunnel may be the same as or different from the type of the first tunnel. The type of the first tunnel, the type of the second tunnel, and the type of the third tunnel may specifically include the following four cases.

In a first case, the first tunnel and the second tunnel are MPLS tunnels, and the third tunnel is an MPLS tunnel. Correspondingly, the first VPN identifier and the second VPN identifier are MPLS labels, and the third VPN identifier is an MPLS label.

In a second case, the first tunnel and the second tunnel are MPLS tunnels, and the third tunnel is an SRv6 tunnel. Correspondingly, the first VPN identifier and the second VPN identifier are MPLS labels, and the third VPN identifier is an SRv6 SID.

In a third case, the first tunnel and the second tunnel are SRv6 tunnels, and the third tunnel is an MPLS tunnel. Correspondingly, the first VPN identifier and the second VPN identifier are SRv6 SIDs, and the third VPN identifier is an MPLS label.

In a fourth case, the first tunnel and the second tunnel are SRv6 tunnels, and the third tunnel is an SRv6 tunnel. Correspondingly, the first VPN identifier and the second VPN identifier are SRv6 SIDs, and the third VPN identifier is an SRv6 SID.

The ASBR 1 stores a first correspondence between the first VPN identifier and the third VPN identifier on the forwarding plane. The ASBR 1 can guide packet forwarding based on the first correspondence stored on the forwarding plane.

In a possible implementation, the ASBR 1 can store a first forwarding entry on the forwarding plane. The first forwarding entry includes the first correspondence. The first forwarding entry may be an entry that belongs to a forwarding table. The forwarding table in this embodiment of this application is a table that can guide the packet forwarding in a broad sense. A specific type of the forwarding table is not limited in this embodiment of this application. For example, both the first VPN identifier and the third VPN identifier are MPLS labels, and the forwarding table that stores the first forwarding entry is a label forwarding information base (label forwarding information base, LFIB).

In another possible implementation, the first VPN identifier and the third VPN identifier can be separately stored in different forwarding tables for guiding forwarding. The first correspondence between the first VPN identifier and the third VPN identifier is formed based on a correspondence between the plurality of forwarding tables for guiding the forwarding.

It should be noted that, the ASBR 1 may further store a correspondence between the first VPN identifier, the third VPN identifier, and first interface information. The first interface information identifies an outbound interface that is of the ASBR 1 and that is connected to the first tunnel. When forwarding a packet, the ASBR 1 can process the packet and forward the packet through the first tunnel based on the correspondence between the first VPN identifier, the third VPN identifier, and the first interface information.

Specifically, in a possible implementation, the ASBR 1 may further store a correspondence between the first VPN identifier, the third VPN identifier, and a first interface identifier (identifier, ID). The first interface ID may be specifically an interface identifier of the outbound interface that is of the ASBR 1 and that is connected to the first tunnel. In this way, when forwarding the packet, the ASBR 1 can process the packet and forward the packet through the first tunnel based on the correspondence between the first VPN identifier, the third VPN identifier, and the first interface ID.

In another possible implementation, the ASBR 1 may further store a correspondence between the first VPN identifier, the third VPN identifier, and a first tunnel ID. The first tunnel ID identifies the first tunnel. When forwarding the packet, the ASBR 1 can process the packet and forward the packet through the first tunnel based on the correspondence between the first VPN identifier, the third VPN identifier, and the first tunnel ID.

S506: The ASBR 1 allocates the third VPN identifier to the second VPN route, and stores a correspondence between the second VPN identifier and the third VPN identifier on the forwarding plane.

All second next hops included in second VPN routes obtained by the ASBR 1 are the PE 2, and the second VPN routes include a same RD. The ASBR 1 allocates the third VPN identifier, namely, L3, to the second VPN route.

The type of the third VPN identifier allocated by the ASBR 1 is related to the tunnel type of the third tunnel. The third tunnel may be the MPLS tunnel. Correspondingly, the third VPN identifier is the MPLS label. The third tunnel may alternatively be the SRv6 tunnel. Correspondingly, the third VPN identifier is the SRv6 SID.

The ASBR 1 stores a second correspondence between the second VPN identifier and the third VPN identifier on the forwarding plane. The ASBR 1 can guide packet forwarding based on the second correspondence stored on the forwarding plane.

In a possible implementation, the ASBR 1 can store a second forwarding entry on the forwarding plane. The second forwarding entry includes the second correspondence. The second forwarding entry may be an entry that belongs to a forwarding table. The forwarding table in this embodiment of this application is a table that can guide the packet forwarding in a broad sense. A specific type of the forwarding table is not limited in this embodiment of this application. For example, both the second VPN identifier and the third VPN identifier are MPLS labels, and the forwarding table that stores the second forwarding entry is an LFIB.

In another possible implementation, the second VPN identifier and the third VPN identifier can be separately stored in different forwarding tables for guiding forwarding. The second correspondence between the second VPN identifier and the third VPN identifier is formed based on a correspondence between the plurality of forwarding tables for guiding the forwarding.

It should be noted that, in a possible implementation, the ASBR 1 may further store a correspondence between the second VPN identifier, the third VPN identifier, and a second interface identifier ID. The second interface ID may be specifically an interface identifier of an outbound interface that is of the ASBR 1 and that is connected to the second tunnel. In this way, when forwarding a packet, the ASBR 1 can process the packet and forward the packet through the second tunnel based on the correspondence between the second VPN identifier, the third VPN identifier, and the second interface ID.

In another possible implementation, the ASBR 1 may further store a correspondence between the second VPN identifier, the third VPN identifier, and a second tunnel ID. The second tunnel ID identifies the second tunnel. When forwarding the packet, the ASBR 1 can process the packet and forward the packet through the second tunnel based on the correspondence between the second VPN identifier, the third VPN identifier, and the second tunnel ID.

S507: The ASBR 1 advertises a third VPN route to the ASBR 3.

The third VPN route includes the third VPN identifier, the route prefix, the RD, and a third next hop.

The route prefix included in the third VPN route is the route prefix included in the first VPN route, and is also the route prefix included in the second VPN route. The RD included in the third VPN route is the RD included in the first VPN route, and is also the RD included in the second VPN route.

The third next hop included in the third VPN route is the ASBR 1.

The third VPN route may be an EVPN route, a VPNv4 route, or a VPNv6 route.

It should be noted that a route type of the third VPN route may be the same as or different from the route type of the first VPN route and the route type of the second VPN route.

For example, in a possible implementation, the route type of the first VPN route and the route type of the second VPN route may be EVPN routes, and the route type of the third VPN route may be a VPNv4 route or a VPNv6 route.

For another example, in another possible implementation, the route type of the first VPN route and the route type of the second VPN route may be VPNv4 routes or VPNv6 routes, and the route type of the third VPN route may be an EVPN route.

The ASBR 1 sends the third VPN route to the ASBR 3 through the third tunnel.

The ASBR 3 can allocate a VPN identifier L4 to the third VPN route in the one-VPN-identifier-per-next-hop manner.

The ASBR 3 advertises a VPN route to a network device, for example, a PE 3, in an AS 2. The VPN route advertised by the ASBR 3 includes the VPN identifier L4, the route prefix, the RD, and a next hop. The next hop included in the VPN route advertised by the ASBE 3 is the ASBR 3. The ASBR 3 stores a correspondence between L4 and L3 to guide forwarding.

In an example, the ASBR 3 may further store a correspondence between L4, L3, and a third tunnel ID. The third tunnel ID identifies the third tunnel. Based on the correspondence including the third tunnel ID, the ASBR 3 can determine to forward, to a first network device through the third tunnel, a packet including L3.

After obtaining the VPN route advertised by the ASBE 3, the PE 3 can generate a correspondence between L4, the ASBR 3, and an IP address of the CE 1. The VPN route advertised by the ASBE 3 includes the IP address of the CE 1.

The PE 3 then advertises the learned VPN route to a CE 2. The CE 2 can send a packet to the CE 1 based on the learned VPN route.

With reference to the network architecture shown in FIG. 4, the following describes the packet forwarding method provided in embodiments of this application.

Figure 6A:
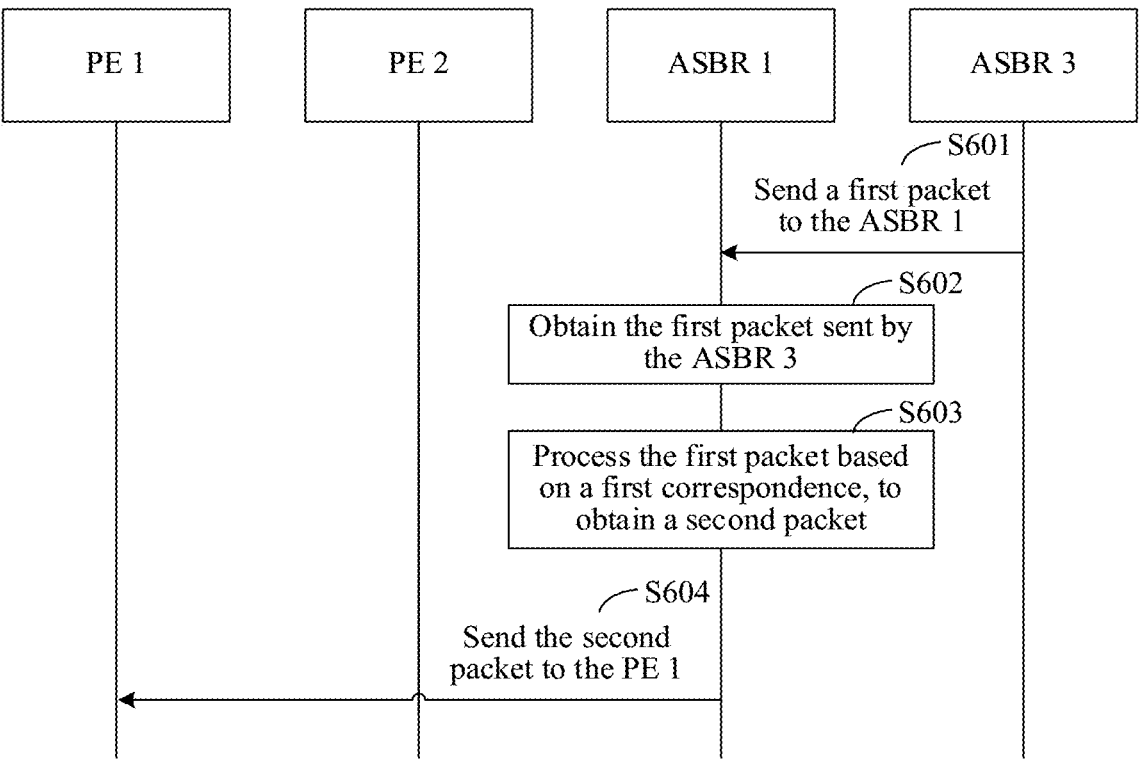
FIG. 6*a* is a schematic flowchart of a packet forwarding method according to an embodiment of this application.

FIG. 6*a* is a schematic flowchart of a packet forwarding method 600 according to an embodiment of this application. The method 600 may be applied to the network scenario shown in FIG. 4. The method 600 includes S601 to S604.

A forwarding plane of an ASBR 1 includes a first correspondence and a second correspondence. The first correspondence includes a correspondence between a first VPN identifier and a third VPN identifier. The second correspondence includes a correspondence between a second VPN identifier and the third VPN identifier.

S601: An ASBR 3 sends a first packet to the ASBR 1.

A CE 2 can obtain an IP address of a CE 1 based on a learned VPN route. The CE 2 can generate a packet whose destination address is the IP address of the CE 1, and send the packet to a PE 3. The PE 3 can encapsulate, based on a correspondence between L4 and the IP address of the CE 1, the packet obtained from the CE 2, to obtain a to-be-forwarded packet including L4. The PE 3 sends the to-be-forwarded packet to the ASBR 3 through a tunnel between the PE 3 and the ASBR 3.

After obtaining the to-be-forwarded packet sent by the PE 3, the ASBR 3 can replace, based on L4 included in the to-be-forwarded packet and a stored correspondence between L4 and L3, L4 included in the to-be-forwarded packet with L3, to obtain the first packet. The first packet includes the third VPN identifier, namely, L3.

In a possible implementation, the ASBR 3 can send the first packet to the ASBR 1 through a third tunnel based on a pre-stored correspondence between L4, L3, and a third tunnel ID.

S602: The ASBR 1 obtains the first packet sent by the ASBR 3.

The ASBR 1 obtains, through the third tunnel, the first packet sent by the ASBR 3. The first packet includes the third VPN identifier, namely, L3. The ASBR 1 can perform packet forwarding based on the third VPN identifier included in the first packet.

S603: The ASBR 1 processes the first packet based on the first correspondence, to obtain a second packet.

The ASBR 1 can process the first packet based on the first packet and the correspondence that is between the third VPN identifier and the first VPN identifier and that is included in the first correspondence, to generate the second packet. The second packet includes the first VPN identifier, namely, L1.

For different types of VPN identifiers, manners of processing the first packet to generate the second packet are different. This embodiment of this application provides four possible specific implementations in which the ASBR 1 obtains the second packet based on the first packet and the first correspondence.

In a first implementation, both the third VPN identifier and the first VPN identifier are MPLS labels.

In this case, both the first packet and the second packet are MPLS packets. The ASBR 1 replaces the third VPN identifier included in the first packet with the first VPN identifier.

Figure 7A:
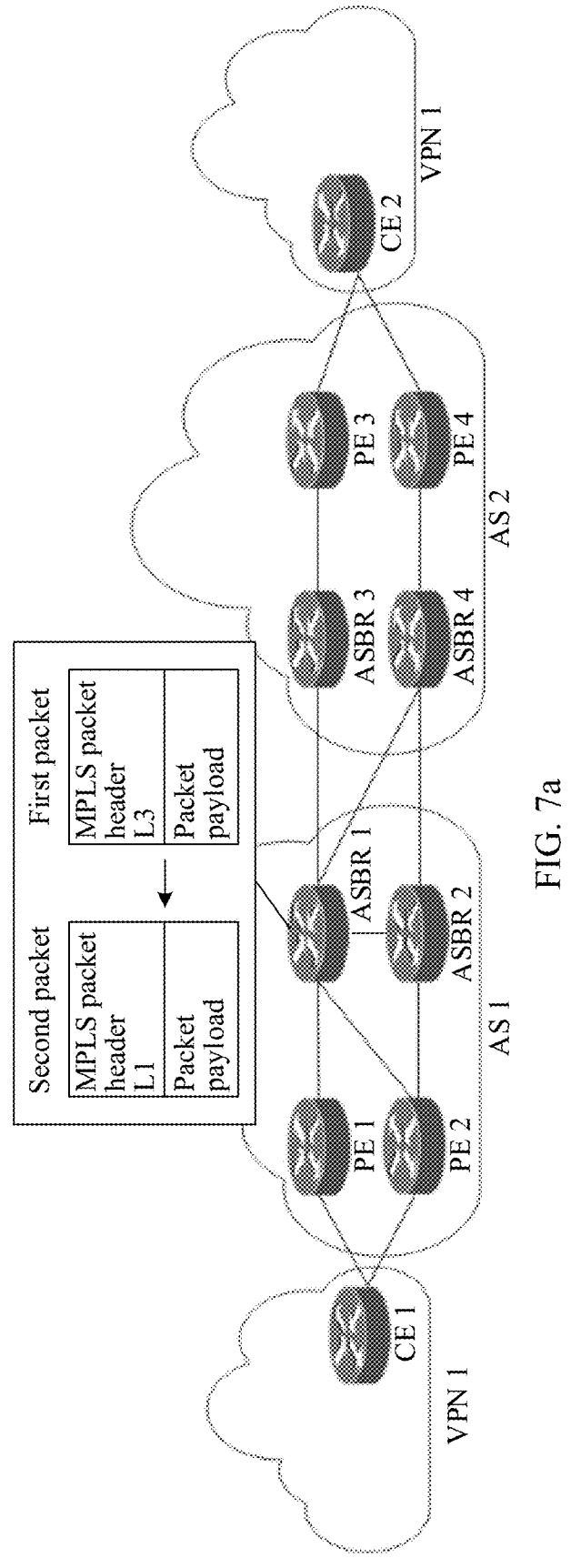
FIG. 7a is a schematic diagram of packet transmission according to an embodiment of this application.

FIG. 7*a* is a schematic diagram of packet transmission according to an embodiment of this application.

Specifically, an MPLS packet header of the first packet includes the third VPN identifier L3. The ASBR 1 deletes the third VPN identifier L3 included in the first packet, and encapsulates the first VPN identifier L1 into a packet obtained by deleting the third VPN identifier, to obtain the second packet, where the second packet includes the first VPN identifier L1.

In a second implementation, both the third VPN identifier and the first VPN identifier are SRv6 SIDs.

In this case, both the first packet and the second packet are SRv6 packets. The ASBR 1 replaces the third VPN identifier included in the first packet with the first VPN identifier.

Figure 7B:
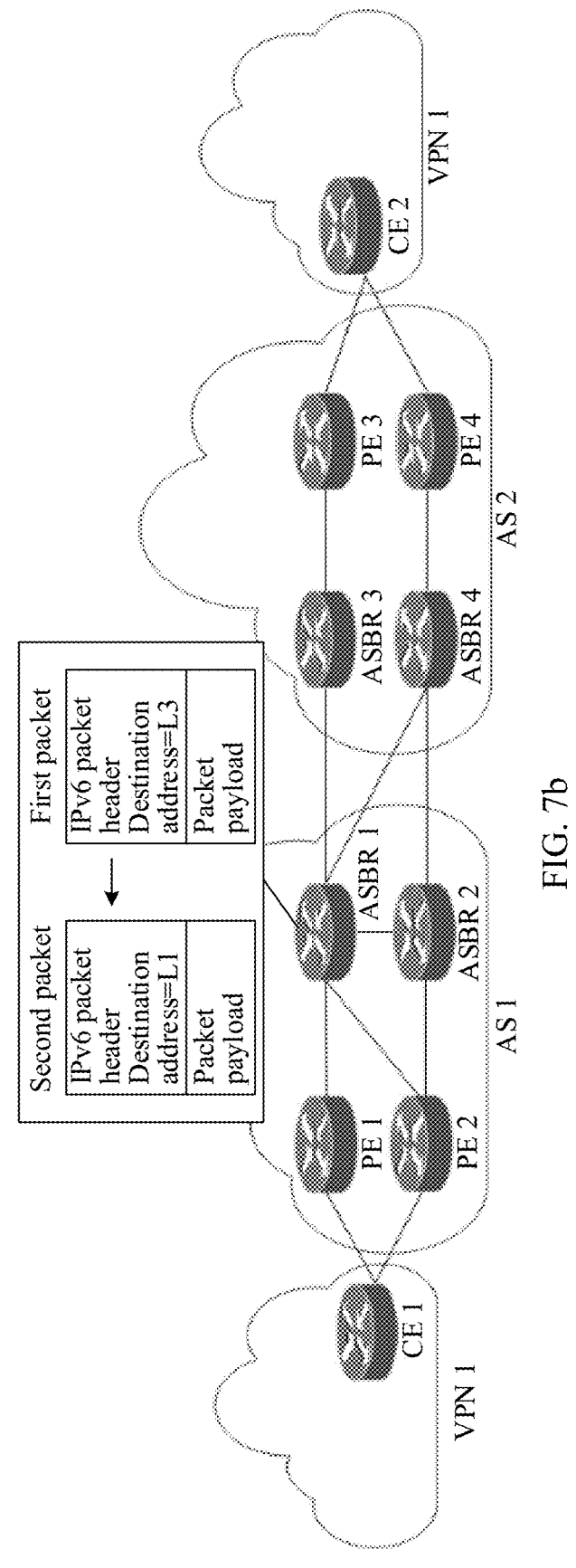
FIG. 7b is another schematic diagram of packet transmission according to an embodiment of this application.

FIG. 7*b* is another schematic diagram of packet transmission according to an embodiment of this application.

Specifically, a destination address of the first packet is the third VPN identifier. The ASBR 1 replaces the destination address L3 of the first packet with the first VPN identifier L1, to obtain the second packet.

In a third implementation, the third VPN identifier is an MPLS label, and the first VPN identifier is an SRv6 SID.

In this case, the first packet is an MPLS packet, and the second packet is an SRv6 packet.

Figure 7C:
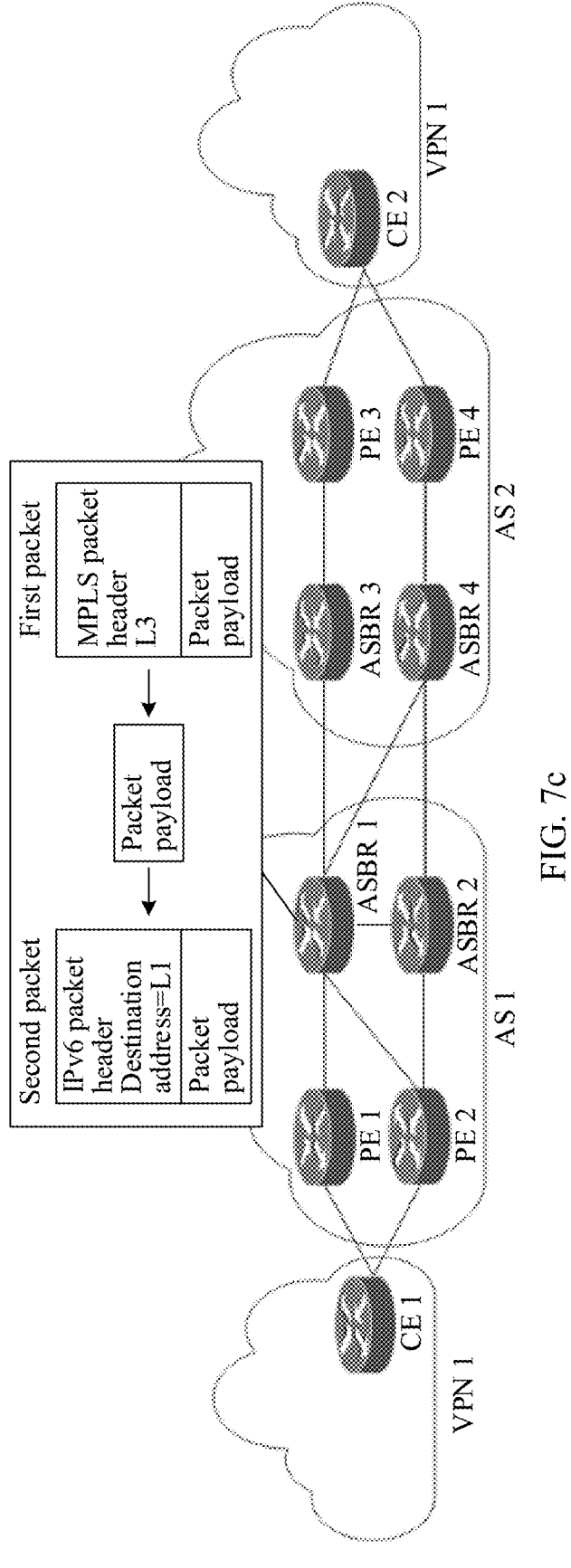
FIG. 7c is still another schematic diagram of packet transmission according to an embodiment of this application.

FIG. 7*c* is still another schematic diagram of packet transmission according to an embodiment of this application.

Specifically, the ASBR 1 decapsulates the first packet, and removes an MPLS packet header to obtain a packet payload. The ASBR 1 performs SRv6 encapsulation on the obtained packet payload to obtain the second packet. A destination address of the second packet is the first VPN identifier L1.

In a fourth implementation, the third VPN identifier is an SRv6 SID, and the first VPN identifier is an MPLS label.

In this case, the first packet is an SRv6 packet, and the second packet is an MPLS packet.

Figure 7D:
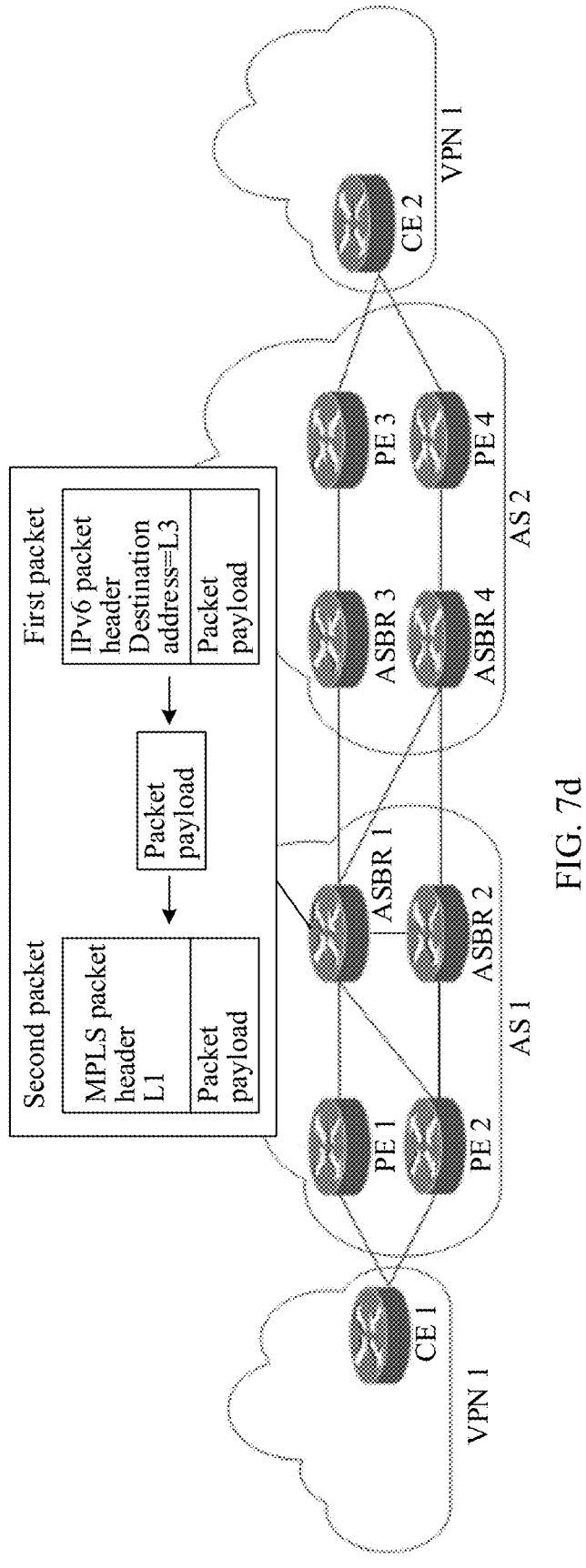
FIG. 7d is yet another schematic diagram of packet transmission according to an embodiment of this application.

FIG. 7*d* is yet another schematic diagram of packet transmission according to an embodiment of this application.

Specifically, the ASBR 1 decapsulates the first packet, and removes an IPv6 packet header to obtain a packet payload. The ASBR 1 performs MPLS encapsulation on the obtained packet payload to obtain the second packet. An MPLS packet header of the second packet includes the first VPN identifier L1.

In the fourth case, in an example, the third VPN identifier may be specifically END.BM. END.BM indicates that a tunnel endpoint is bound to an SR-MPLS policy. In this embodiment of this application, the ASBR 1 is used as an endpoint of the third tunnel, and decapsulates the first packet based on END.BM included in the first packet. The ASBR 1 re-encapsulates the packet payload based on the SR-MPLS policy that indicates a first tunnel, to obtain the second packet.

S604: The ASBR 1 sends the second packet to a PE 1.

The ASBR 1 sends the second packet to the PE 1 through the first tunnel.

In an example, the ASBR 1 can determine, based on a pre-stored correspondence, to send the second packet to the PE 1 through the first tunnel. The pre-stored correspondence that the ASBR 1 can be based on may be specifically a correspondence between the first VPN identifier, the third VPN identifier, and a first interface ID or a correspondence between the first VPN identifier, the third VPN identifier, and a first tunnel ID.

After obtaining the second packet, the PE 1 can process the second packet, and send, to the CE 1, a packet obtained through the processing, to complete packet forwarding.

Based on a first VPN route and a second VPN route, fast reroute can be formed in a network. One of the first VPN route and the second VPN route is an active route, and the other VPN route is a standby route.

In a possible implementation, the first VPN route is an active route, and the PE 1 is an active next hop. Before S603 is performed, the ASBR 1 can determine that the PE 1 is reachable. The ASBR 1 performs packet forwarding based on the first correspondence stored on the forwarding plane.

In another possible implementation, the second VPN route is an active route, and a PE 2 is an active next hop. The first VPN route is a standby route, and the PE 1 is a standby next hop. Before S603 is performed, the ASBR 1 can determine that the PE 2 is unreachable. The ASBR 1 performs packet forwarding based on the first correspondence stored on the forwarding plane, to implement fast switching on the forwarding plane, and shorten time in which packet transmission cannot be normally performed in the network because the PE 2 is faulty.

Based on the first VPN route and the second VPN route, load balancing can be formed in the network.

Figure 6B:
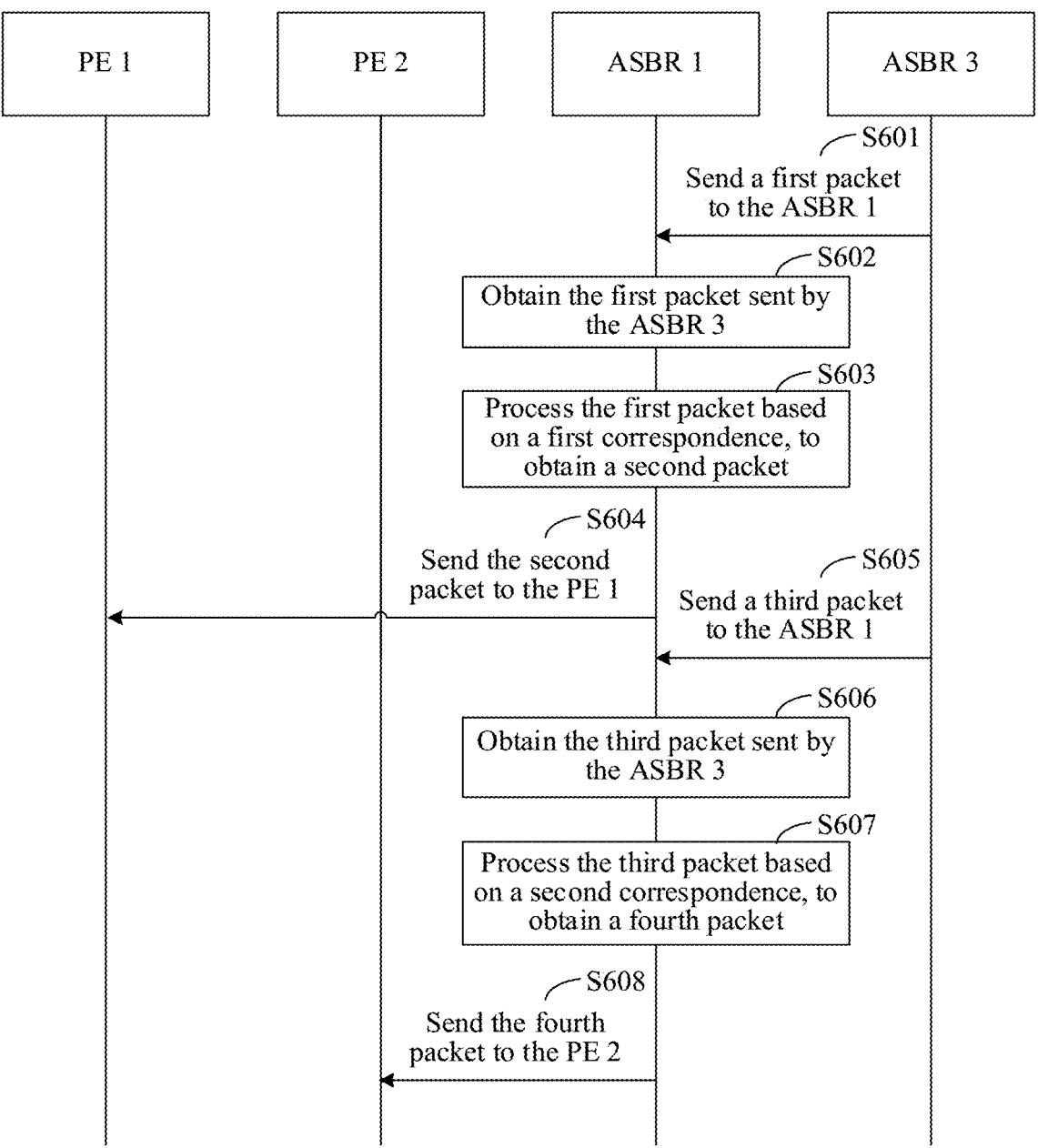
FIG. 6*b* is a schematic flowchart of another packet forwarding method according to an embodiment of this application.

Refer to FIG. 6*b*. In addition to S601 to S604, the packet forwarding method provided in this embodiment of this application may further include S605 to S608.

S605: The ASBR 3 sends a third packet to the ASBR 1.

A manner in which the ASBR 3 generates the third packet is the same as the manner in which the ASBR 3 generates the first packet in S601. Details are not described herein again.

S606: The ASBR 1 obtains the third packet sent by ASBR 3.

The ASBR 1 obtains, through the third tunnel, the third packet sent by the ASBR 3. The third packet includes the third VPN identifier, namely, L3. The ASBR 1 can perform packet forwarding based on the third VPN identifier included in the third packet.

S607: The ASBR 1 processes the third packet based on the second correspondence, to obtain a fourth packet.

The ASBR 1 can process, based on the correspondence that is between the third VPN identifier and the second VPN identifier and that is included in the second correspondence, the third packet including the third VPN identifier, to generate the fourth packet. The fourth packet includes the second VPN identifier, namely, L2.

For different types of VPN identifiers, manners of processing the third packet to generate the fourth packet are different. A manner in which the ASBR 1 generates the fourth packet is similar to the foregoing manner of generating the second packet. Refer to the foregoing descriptions.

S608: The ASBR 1 sends the fourth packet to the PE 2.

The ASBR 1 sends the fourth packet to the PE 2 through a second tunnel.

After obtaining the fourth packet, the PE 2 can process the fourth packet, and send, to the CE 1, a packet obtained through the processing, to complete packet forwarding.

Figure 8:
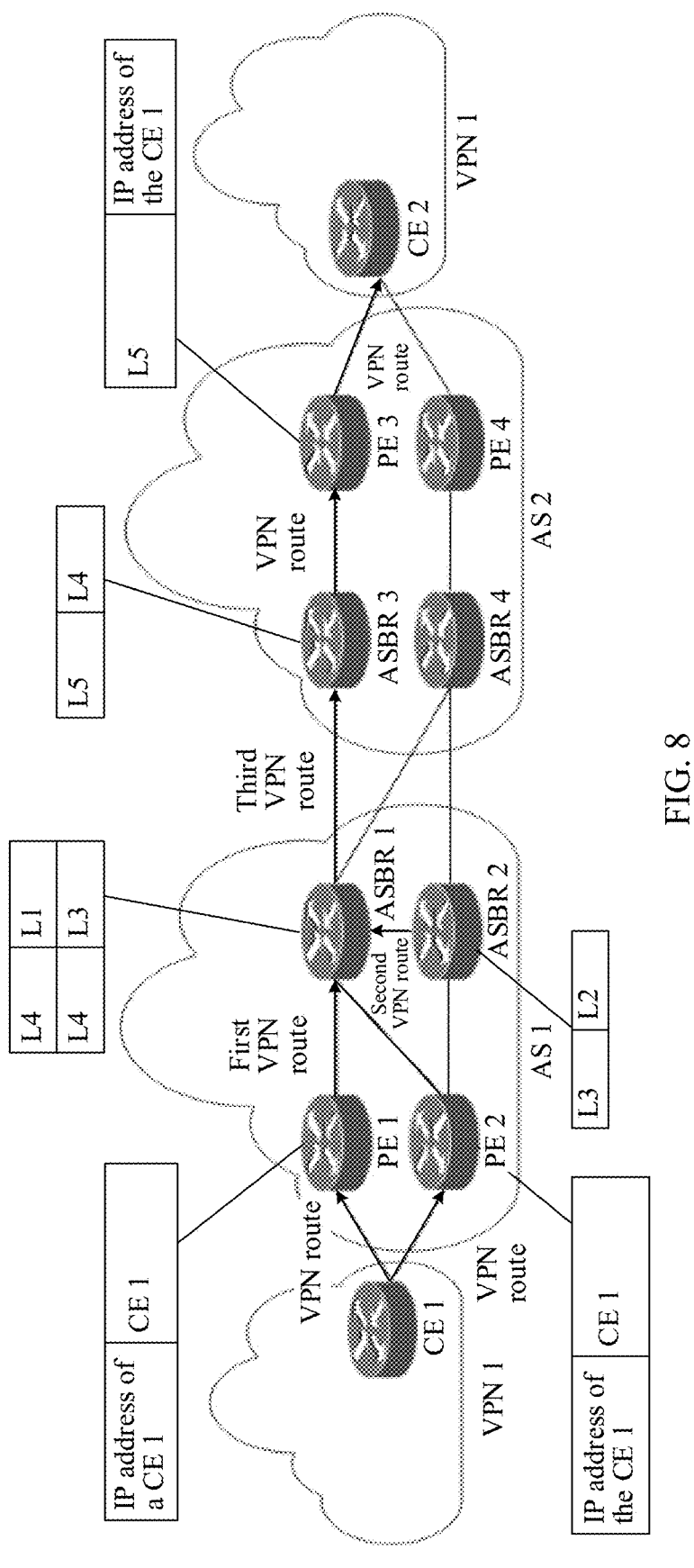
FIG. 8 is a schematic diagram of a network architecture in a scenario 2 according to an embodiment of this application.

Scenario 2: The network architecture shown in FIG. 1 is used as an example. FIG. 8 is a schematic diagram of a network architecture in a scenario 2 according to an embodiment of this application.

The foregoing method 500 describes a process in which the ASBR 1 learns the first VPN route advertised by the PE 1 in the AS 1 and the second VPN route advertised by the PE 2 in the AS 1, and advertises the third VPN route to the ASBR 3 in the AS 2. In another possible implementation, the ASBR 1 can learn a first VPN route advertised by the PE 1 in the AS 1 and a second VPN route advertised by the ASBR 2 in the AS 1, and advertise a third VPN route to the ASBR 3 in the AS 2.

Based on the network architecture shown in FIG. 1, an embodiment of this application provides another route advertisement method 800. The method 800 includes steps A1 to A7.

A1: The PE 1 sends a first VPN route to the ASBR 1.

A2: The ASBR 1 receives the first VPN route sent by the PE 1.

In the method 800, A1 and A2 are the same as S501 and S502. For details, refer to specific descriptions related to S501 and S502 in the method 500.

A3: The ASBR 2 sends a second VPN route to the ASBR 1.

The ASBR 2 can receive a VPN route advertised by the PE 2, and generate the second VPN route based on the received VPN route advertised by the PE 2.

The following first describes a process in which the PE 2 advertises the VPN route.

The PE 2 can obtain a VPN route advertised by the CE 1. The VPN route advertised by the CE 1 belongs to a second VPN instance created by the PE 2. The PE 2 can generate a routing table of the second VPN instance based on the obtained VPN route advertised by the CE 1. The second VPN instance and a first VPN instance are associated with the VPN 1.

The PE 2 can allocate, in a one-VPN-identifier-per-instance manner, a same VPN identifier to VPN routes that belong to a same VPN instance. All VPN routes obtained by the PE 2 and advertised by the CE 1 belong to the second VPN instance. The PE 2 can allocate a VPN identifier, namely, L2, to the VPN route advertised by the CE 1. L2 is associated with the second VPN instance. In a packet forwarding process, the PE 2 can query the routing table of the second VPN instance based on L2 included in a packet, to forward the packet.

A specific type of L2 is related to a tunnel between the PE 2 and the ASBR 2.

In an example, the tunnel between the PE 2 and the ASBR 2 is an MPLS tunnel, and L2 is an MPLS label. In another example, the tunnel between the PE 2 and the ASBR 2 is an SRv6 tunnel, and L2 is an SRv6 SID.

A type of the tunnel between the PE 2 and the ASBR 2 is the same as a type of a first tunnel. Correspondingly, the specific type of L2 is the same as a type of a first VPN identifier.

The VPN route advertised by the PE 2 includes the VPN identifier, a route prefix, an RD, and a next hop.

The VPN route advertised by the PE 2 and the first VPN route each are generated based on the VPN route that is from the VPN 1 and advertised by the CE 1. The route prefix included in the VPN route advertised by the PE 2 is the same as a route prefix included in the first VPN route. The RD included in the VPN route advertised by the PE 2 is the same as an RD included in the first VPN route.

The next hop included in the VPN route advertised by the PE 2 is the PE 2.

The ASBR 2 can obtain the VPN route advertised by the PE 2. The ASBR 2 allocates a VPN identifier to a received VPN route in a one-VPN-identifier-per-next-hop manner.

Specifically, the ASBR 2 allocates a second VPN identifier L3 to the obtained VPN route advertised by the PE 2. The second VPN identifier is related to a type of a tunnel for communication between the ASBR 2 and the ASBR 1. The tunnel for the communication between the ASBR 2 and the ASBR 1 may also be referred to as a second tunnel.

A type of the second tunnel is the same as the type of the first tunnel. Correspondingly, a type of the second VPN identifier is the same as the type of the first VPN identifier.

The ASBR 2 advertises the second VPN route to the ASBR 1 through the second tunnel. The second VPN route includes the second VPN identifier L3 allocated by the ASBR 2, the route prefix, the RD, and a second next hop. The second VPN route is generated based on the VPN route advertised by the PE 2. The route prefix of the second VPN route is the same as the route prefix of the first VPN route. The RD of the second VPN route is the same as the RD of the first VPN route.

A4: The ASBR 1 receives the second VPN route sent by the ASBR 2.

The ASBR 1 receives, through the second tunnel, the second VPN route sent by the ASBR 2.

A5: The ASBR 1 allocates a third VPN identifier to the first VPN route, and stores a correspondence between the first VPN identifier and the third VPN identifier on a forwarding plane.

A6: The ASBR 1 allocates the third VPN identifier to the second VPN route, and stores a correspondence between the second VPN identifier and the third VPN identifier on the forwarding plane.

A7: The ASBR 1 advertises a third VPN route to the ASBR 3.

In the method 800, A5 to A7 are respectively similar to S505 to S507 in the foregoing method 500. For details, refer to the descriptions related to S505 to S507 in the method 500. Details are not described herein again.

An embodiment of this application further provides a packet forwarding method 900 in the scenario 2. Compared with the foregoing method 600, the method 900 is different only in an implementation of load balancing. In the method 900, an ASBR 1 sends a generated fourth packet to the ASBR 2 through a second tunnel. Other steps are the same as those in the foregoing method 600. Details are not described herein again.

Figure 9:
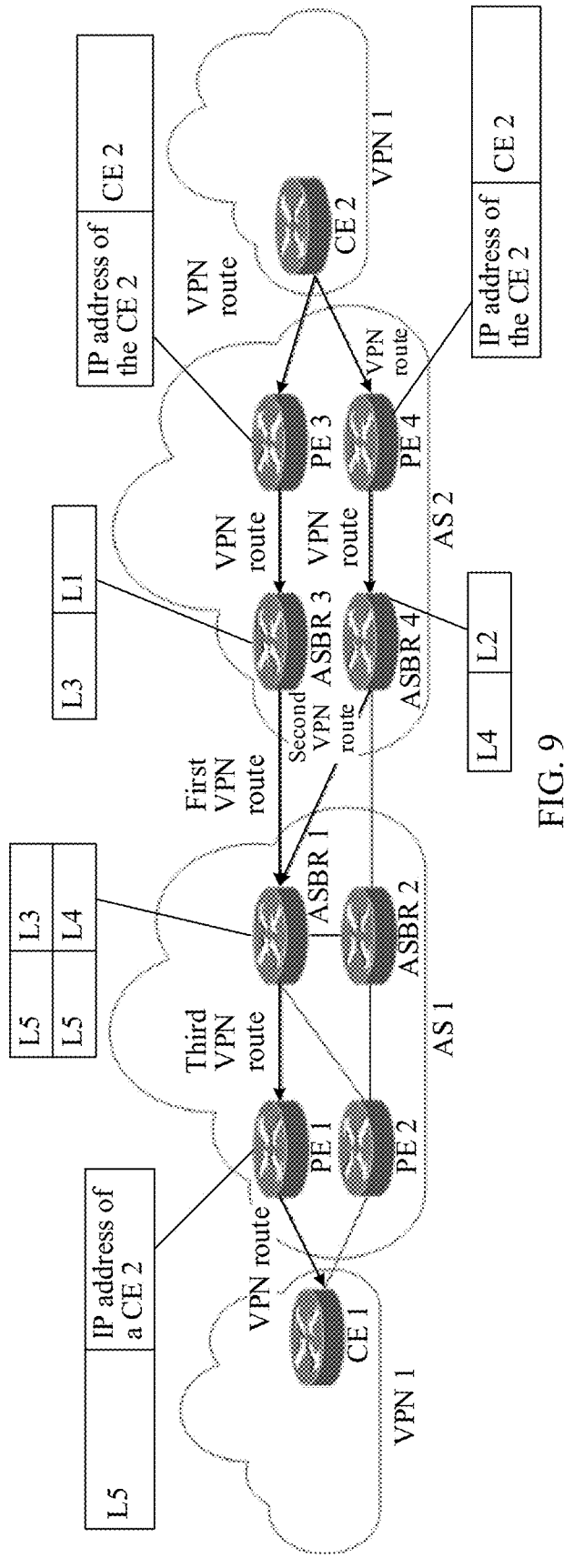
FIG. 9 is a schematic diagram of a network architecture in a scenario 3 according to an embodiment of this application.

Scenario 3: The network architecture shown in FIG. 1 is used as an example. FIG. 9 is a schematic diagram of a network architecture in a scenario 3 according to an embodiment of this application.

The foregoing method 500 and the foregoing method 800 describe a process in which the ASBR receives the first VPN route and the second VPN route that are advertised by a network device in the AS 1, and advertises the third VPN route to the network device in the AS 2. In still another possible implementation, the ASBR 1 can obtain a first VPN route and a second VPN route that are from the AS 2, and advertise a third VPN route to a network device in the AS 1.

Figure 10:
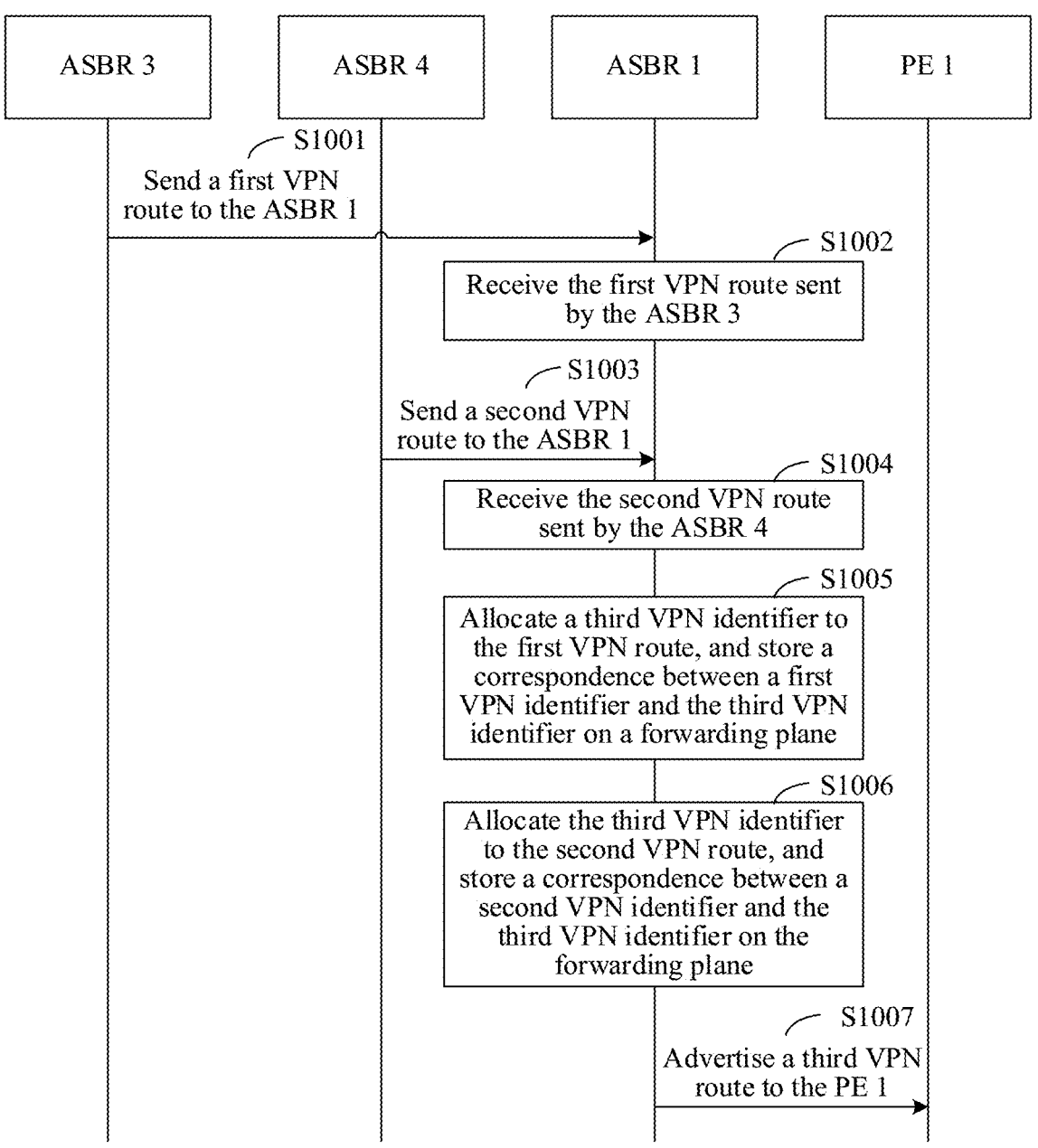
FIG. 10 is a schematic flowchart of another route advertisement method according to an embodiment of this application.

FIG. 10 is a schematic flowchart of still another route advertisement method 1000 according to an embodiment of this application. The method 1000 includes S1001 to S1007.

S1001: An ASBR 3 sends a first VPN route to an ASBR 1.

The ASBR 3 can obtain a VPN route advertised by a PE 3, and generate the first VPN route based on the received VPN route advertised by the PE 3.

The following first describes a process in which the PE 3 advertises the VPN route.

For a route type of the VPN route advertised by the PE 3, refer to the related descriptions of the route type of the first VPN route advertised by the PE 1 in S501. Details are not described herein again.

The VPN route advertised by the PE 3 includes a VPN identifier, a route prefix, an RD, and a next hop.

The VPN identifier included in the VPN route advertised by the PE 3 is allocated by the PE 3 based on a VPN instance. The PE 3 can create a first VPN instance related to a VPN 1. The first VPN instance is for storing a VPN route that belongs to the VPN 1.

The VPN identifier included in the VPN route advertised by the PE 3 is associated with the first VPN instance. The VPN identifier included in the VPN route advertised by the PE 3 is L1.

A specific type of the VPN identifier included in the VPN route advertised by the PE 3 is related to a type of a tunnel for communication between the PE 3 and the ASBR 3. The tunnel for the communication between the PE 3 and the ASBR 3 may be an MPLS tunnel or an SRv6 tunnel.

In an example, the tunnel for the communication between the PE 3 and the ASBR 3 is an MPLS tunnel, and the VPN identifier included in the VPN route advertised by the PE 3 is an MPLS label.

In another example, the tunnel for the communication between the PE 3 and the ASBR 3 is an SRv6 tunnel, and the VPN identifier included in the VPN route advertised by the PE 3 is an SRv6 SID.

The next hop included in the VPN route advertised by the PE 3 is the PE 3.

The ASBR 3 can obtain the VPN route advertised by the PE 3. The ASBR 3 allocates a VPN identifier to a received VPN route in a one-VPN-identifier-per-next-hop manner.

Specifically, the ASBR 3 allocates a first VPN identifier, namely, L3, to the obtained VPN route advertised by the PE 3. The first VPN identifier is related to a type of a tunnel for communication between the ASBR 3 and the ASBR 1. The tunnel for the communication between the ASBR 3 and the ASBR 1 may also be referred to as a first tunnel.

The first tunnel may be an MPLS tunnel or an SRv6 tunnel.

In an example, the first tunnel is an MPLS tunnel, and the first VPN identifier included in the first VPN route is an MPLS label.

In another example, the first tunnel is an SRv6 tunnel, and the first VPN identifier included in the first VPN route is an SRv6 SID.

The ASBR 3 advertises the first VPN route to the ASBR 1 through the first tunnel. The first VPN route includes the first VPN identifier allocated by the ASBR 3, the route prefix, the RD, and a first next hop. The route prefix included in the first VPN route is the same as the route prefix included in the VPN route advertised by the PE 3. The RD included in the first VPN route is the same as the RD included in the VPN route advertised by the PE 3. The first next hop included in the first VPN route is the ASBR 3.

S1002: The ASBR 1 receives the first VPN route sent by the ASBR 3.

The ASBR 1 receives, through the first tunnel, the first VPN route sent by the ASBR 3.

S1003: An ASBR 4 sends a second VPN route to the ASBR 1.

The ASBR 4 can obtain a VPN route advertised by a PE 4, and generate the second VPN route based on the received VPN route advertised by the PE 4.

The following describes a process in which the PE 4 advertises the VPN route.

For a route type of the VPN route advertised by the PE 4, refer to the related descriptions of the route type of the first VPN route advertised by the PE 1 in S501. Details are not described herein again.

It should be noted that the route type of the VPN route advertised by the PE 4 is the same as the route type of the VPN route advertised by the PE 3.

The VPN route advertised by the PE 4 includes a VPN identifier, the route prefix, the RD, and a next hop.

The VPN identifier included in the VPN route advertised by the PE 4 is allocated by the PE 4 based on a VPN instance. The PE 4 can create a second VPN instance related to the VPN 1. The second VPN instance is for storing a VPN route that belongs to the VPN 1.

The VPN identifier included in the VPN route advertised by the PE 4 is associated with the second VPN instance. The VPN identifier included in the VPN route advertised by the PE 4 is L2. The second VPN instance and the first VPN instance are associated with the VPN 1.

A specific type of the VPN identifier included in the VPN route advertised by the PE 4 is related to a type of a tunnel for communication between the PE 4 and the ASBR 4. The tunnel for the communication between the PE 4 and the ASBR 4 may be an MPLS tunnel or an SRv6 tunnel.

In an example, the tunnel for the communication between the PE 4 and the ASBR 4 is an MPLS tunnel, and the VPN identifier included in the VPN route advertised by the PE 4 is an MPLS label.

In another example, the tunnel for the communication between the PE 4 and the ASBR 4 is an SRv6 tunnel, and the VPN identifier included in the VPN route advertised by the PE 4 is an SRv6 SID.

A type of the tunnel between the PE 4 and the ASBR 4 is the same as the type of the tunnel between the PE 3 and the ASBR 3. Correspondingly, the type of L1 is the same as the type of L2.

The next hop included in the VPN route advertised by the PE 4 is the PE 4.

The ASBR 4 can obtain the VPN route advertised by the PE 4. The ASBR 4 allocates a VPN identifier to a received VPN route in the one-VPN-identifier-per-next-hop manner.

Specifically, the ASBR 4 allocates a second VPN identifier, namely, L4, to the obtained VPN route advertised by the PE 4. The second VPN identifier is related to a type of a tunnel for communication between the ASBR 4 and the ASBR 1. The tunnel for the communication between the ASBR 4 and the ASBR 1 may also be referred to as a second tunnel.

The second tunnel may be an MPLS tunnel or an SRv6 tunnel.

In an example, the second tunnel is an MPLS tunnel, and the second VPN identifier included in the second VPN route is an MPLS label.

In another example, the second tunnel is an SRv6 tunnel, and the second VPN identifier included in the second VPN route is an SRv6 SID.

It should be noted that a type of the tunnel for the communication between the ASBR 4 and the ASBR 1 may be the same as the type of the tunnel for the communication between the ASBR 3 and the ASBR 1. A type of the second VPN identifier included in the second VPN route may be the same as a type of the first VPN identifier included in the first VPN route.

The ASBR 4 advertises the second VPN route to the ASBR 1 through the second tunnel. The second VPN route includes the second VPN identifier allocated by the ASBR 4, the route prefix, the RD, and a second next hop. The route prefix included in the second VPN route is the same as the route prefix included in the VPN route advertised by the PE 4, and is also the same as the route prefix included in the first VPN route. The RD included in the second VPN route is the same as the RD included in the VPN route advertised by the PE 4, and is also the same as the RD included in the first VPN route. The second next hop included in the second VPN route is an ASBR 2.

S1004: The ASBR 1 receives the second VPN route sent by the ASBR 4.

The ASBR 1 receives, through the second tunnel, the second VPN route sent by the ASBR 4.

S1005: The ASBR 1 allocates a third VPN identifier to the first VPN route, and stores a correspondence between the first VPN identifier and the third VPN identifier on a forwarding plane.

S1006: The ASBR 1 allocates the third VPN identifier to the second VPN route, and stores a correspondence between the second VPN identifier and the third VPN identifier on the forwarding plane.

In the method 1000, S1005 and S1006 are respectively similar to S505 and S506 in the foregoing method 500. For details, refer to the descriptions related to S505 and S506 in the method 500.

In the method 1000, the third VPN identifier is L5.

S1007: The ASBR 1 advertises a third VPN route to the PE 1.

The third VPN route includes the third VPN identifier, the route prefix, the RD, and a third next hop.

The route prefix included in the third VPN route is the route prefix included in the first VPN route, and is also the route prefix included in the second VPN route. The RD included in the third VPN route is the RD included in the first VPN route, and is also the RD included in the second VPN route.

The third next hop included in the third VPN route is the ASBR 1.

For a route type of the third VPN route, refer to the related descriptions of the route type of the third VPN route in S507. Details are not described herein again.

The PE 1 advertises a VPN route to a CE 1 based on the obtained third VPN route. The PE 1 can store a correspondence between L5 and an IP address of a CE 2 to guide packet forwarding.

With reference to the network architecture shown in FIG. 9, the following describes the packet forwarding method provided in embodiments of this application.

Figure 11A:
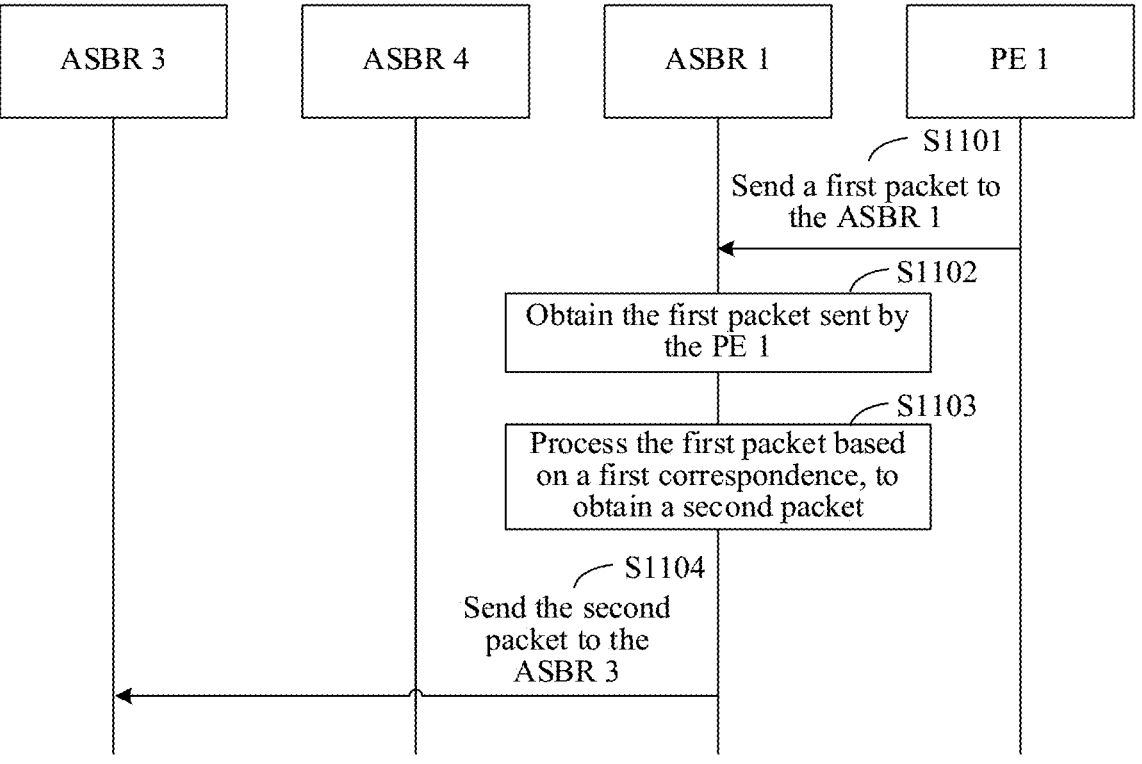
FIG. 11a is a schematic flowchart of a packet forwarding method according to an embodiment of this application.

FIG. 11*a* is a schematic flowchart of a packet forwarding method 1100 according to an embodiment of this application. The method 1100 may be applied to the network scenario shown in FIG. 9. The method 1100 includes S1101 to S1104.

A forwarding plane of an ASBR 1 includes a first correspondence and a second correspondence. The first correspondence includes a correspondence between a first VPN identifier and a third VPN identifier. The second correspondence includes a correspondence between a second VPN identifier and the third VPN identifier.

S1101: A PE 1 sends a first packet to the ASBR 1.

A CE 1 can obtain an IP address of a CE 2 based on a learned VPN route. The CE 1 can generate a packet whose destination address is the IP address of the CE 2, and send the packet to the PE 1. The PE 1 can process, based on a correspondence between L5 and the IP address of the CE 2, the packet obtained from the CE 1, to obtain a packet including the third VPN identifier, namely, L5. The PE 1 sends the first packet to the ASBR 1 through a tunnel between the PE 1 and the ASBR 1.

S1102: The ASBR 1 obtains the first packet sent by the PE 1.

The ASBR 1 obtains, through a third tunnel, the first packet sent by the PE 1. The first packet includes the third VPN identifier, namely, L5. The ASBR 1 can perform packet forwarding based on the third VPN identifier included in the first packet.

S1103: The ASBR 1 obtains a second packet based on the first packet and the first correspondence.

The ASBR 1 can generate the second packet based on the first packet and the correspondence that is between the third VPN identifier and the first VPN identifier and that is included in the first correspondence. The second packet includes the first VPN identifier, namely, L3.

For different types of VPN identifiers, manners of processing the first packet to generate the second packet are different. In the method 1100, a method for generating the second packet by the ASBR 1 is the same as the method for generating the second packet by the ASBR 1 in the foregoing method 600. For details, refer to the related descriptions in S603.

S1104: The ASBR 1 sends the second packet to an ASBR 3.

The ASBR 1 sends the second packet to the ASBR 3 through a first tunnel.

The ASBR 3 can process the second packet based on a correspondence between L3 and L1, to obtain a packet including L1. The ASBR 3 sends, to a PE 3, the packet including L1. The PE 3 can send the packet to the CE 2 based on the IP address that is of the CE 2 and that is included in the packet, to complete packet transmission.

In an example, the ASBR 1 can determine, based on a pre-stored correspondence, to send the second packet to the ASBR 3 through the first tunnel. The pre-stored correspondence that the ASBR 1 can be based on may be specifically a correspondence between the first VPN identifier, the third VPN identifier, and first interface information. The first interface information may be a first tunnel ID or a first interface ID.

Based on a first VPN route and a second VPN route, fast reroute can be formed in a network. One of the first VPN route and the second VPN route is an active route, and the other VPN route is a standby route.

In a possible implementation, the first VPN route is an active route, and the ASBR 3 is an active next hop. Before S1103 is performed, the ASBR 1 can determine that the ASBR 3 is reachable. The ASBR 1 performs packet forwarding based on the first correspondence stored on the forwarding plane.

In another possible implementation, the second VPN route is an active route, and an ASBR 4 is an active next hop. The first VPN route is a standby route, and the ASBR 3 is a standby next hop. Before S1103 is performed, the ASBR 1 can determine that the ASBR 4 is unreachable. The ASBR 1 switches a correspondence, and performs packet forwarding by using the first correspondence stored on the forwarding plane. In this way, fast switching on the forwarding plane can be implemented, and time in which packet transmission cannot be normally performed in the network because the ASBR 4 is faulty is shortened.

Based on the first VPN route and the second VPN route, load balancing can be formed in the network.

Figure 11B:
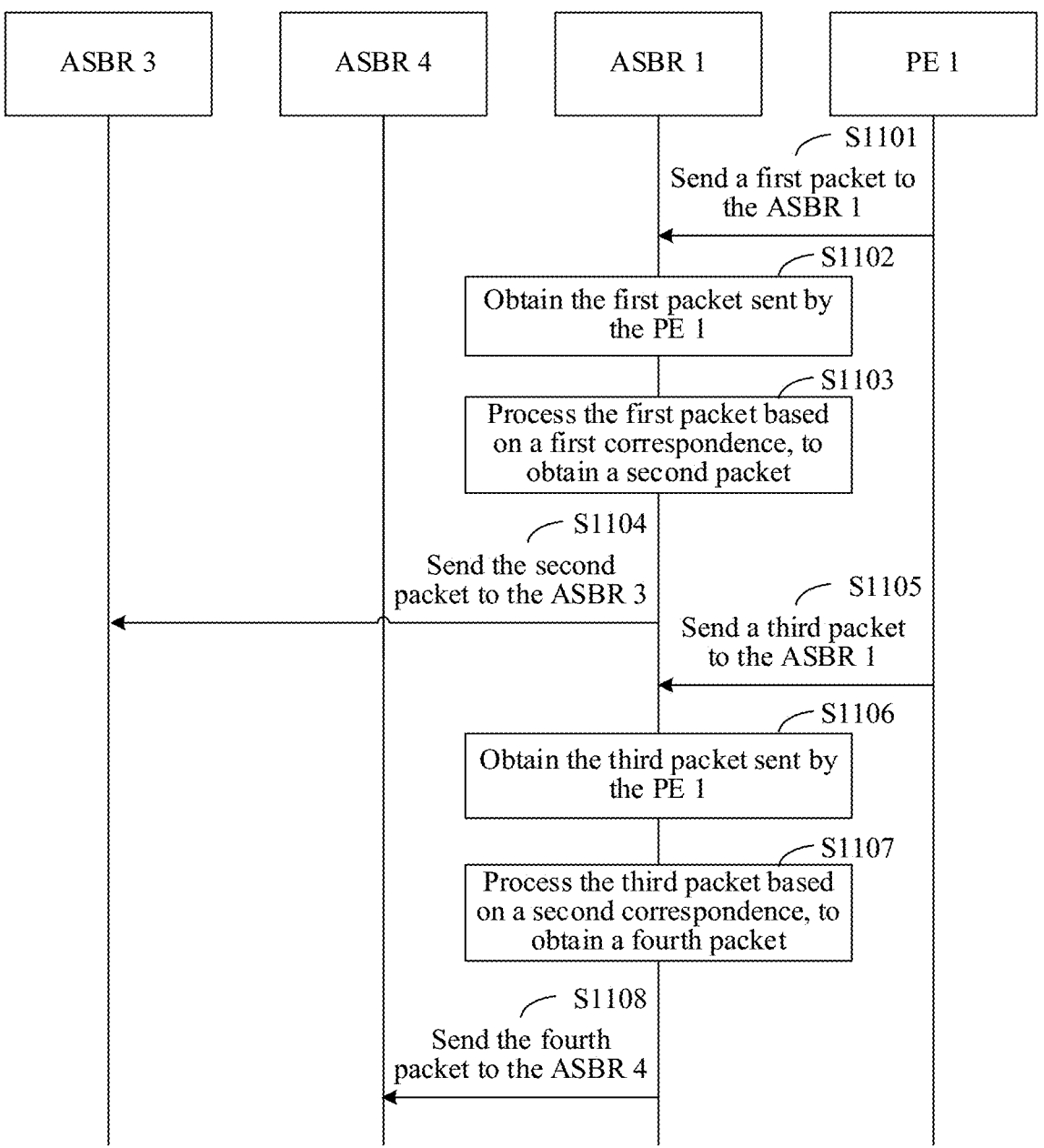
FIG. 11b is a schematic flowchart of another packet forwarding method according to an embodiment of this application.

Refer to FIG. 11b. In addition to S1101 to S1104, the packet forwarding method provided in this embodiment of this application may further include S1105 to S1108.

S1105: The PE 1 sends a third packet to the ASBR 1.

A manner in which the PE 1 generates the third packet is the same as the manner in which the PE 1 generates the first packet in S1101. Details are not described herein again.

S1106: The ASBR 1 obtains the third packet sent by the PE 1.

The ASBR 1 obtains, through the third tunnel, the third packet sent by the PE 1. The third packet includes the third VPN identifier, namely, L5. The ASBR 1 can perform packet forwarding based on the third VPN identifier included in the third packet.

S1107: The ASBR 1 processes the third packet based on the second correspondence, to obtain a fourth packet.

The ASBR 1 can process, based on the correspondence that is between the third VPN identifier and the second VPN identifier and that is included in the second correspondence, the third packet including the third VPN identifier, to generate the fourth packet. The fourth packet includes the second VPN identifier, namely, L4.

For different types of VPN identifiers, manners of generating the fourth packet are different. A manner in which the ASBR 1 generates the fourth packet is similar to the foregoing manner of generating the second packet. Refer to the foregoing descriptions.

S1108: The ASBR 1 sends the fourth packet to the ASBR 4.

The ASBR 1 sends the fourth packet to the ASBR 4 through a second tunnel.

The ASBR 4 can process the fourth packet based on a correspondence between L4 and L2, to obtain a packet including L2. The ASBR 4 sends, to a PE 4, the packet including L2. The PE 4 can send the packet to the CE 2 based on the IP address that is of the CE 2 and that is included in the packet, to complete packet transmission.

The foregoing scenario 1 to scenario 3 are all based on the network architecture shown in FIG. 1. In another possible implementation, the route advertisement method and the packet forwarding method provided in embodiments of this application are further applicable to the network architecture shown in FIG. 3.

Figure 12:
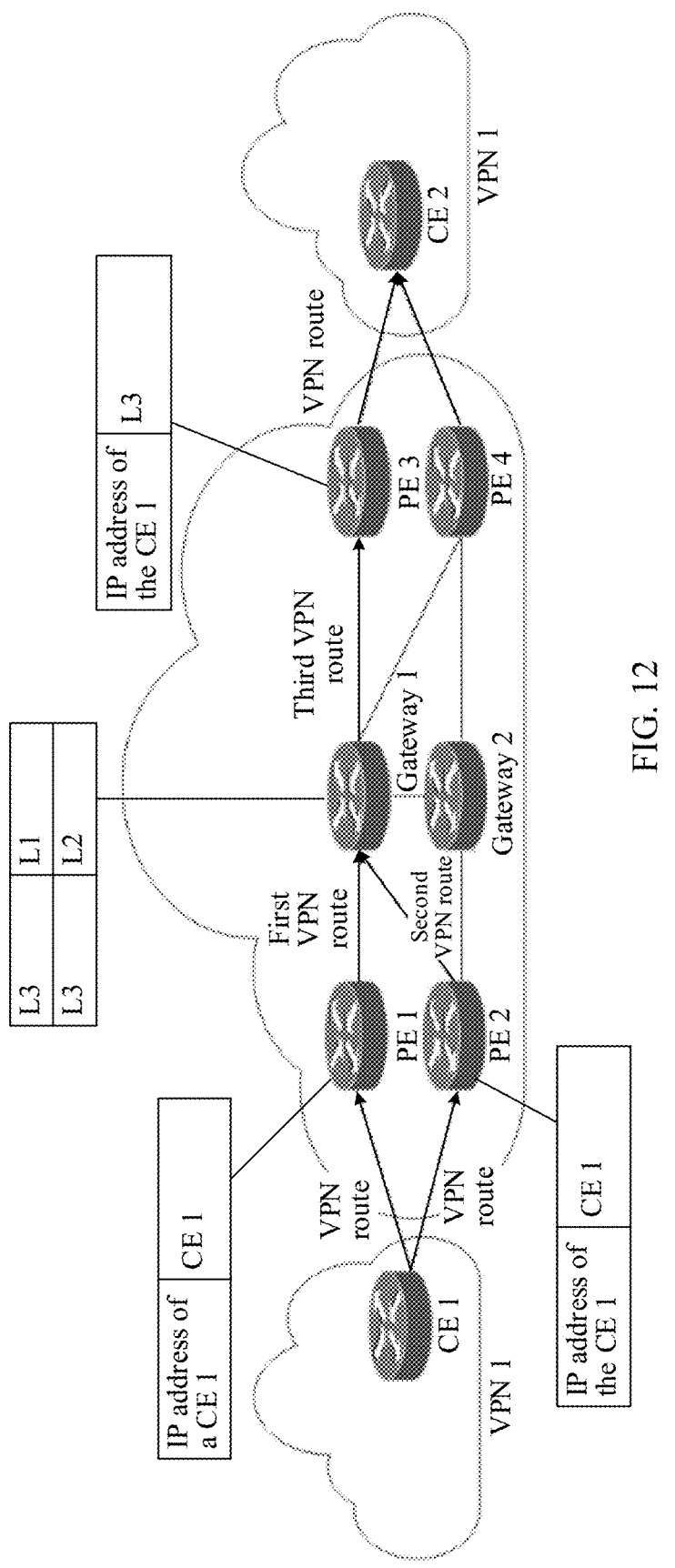
FIG. 12 is a schematic diagram of a network architecture in a scenario 4 according to an embodiment of this application.

Scenario 4: The network architecture shown in FIG. 3 is used as an example. FIG. 12 is a schematic diagram of a network architecture in a scenario 4 according to an embodiment of this application.

Figure 13:
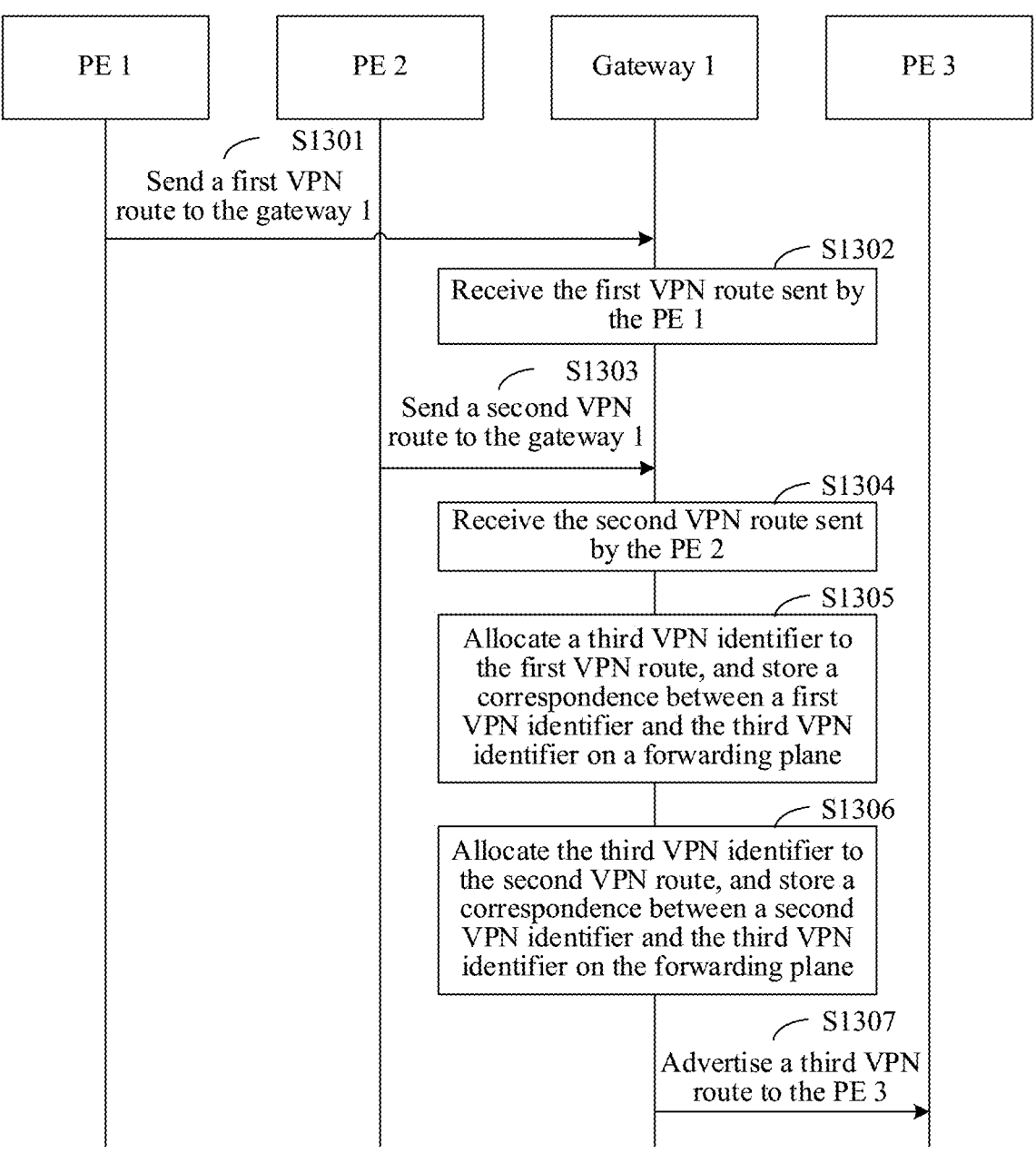
FIG. 13 is a schematic flowchart of a route advertisement method according to an embodiment of this application.

FIG. 13 is a schematic flowchart of a route advertisement method 1300 according to an embodiment of this application. The method 1300 may be applied to the network scenario shown in FIG. 3. The method 1300 includes S1301 to S1307.

S1301: The PE 1 sends a first VPN route to the gateway 1.

For descriptions of generating the first VPN route by the PE 1, refer to the descriptions of generating the first VPN route by the PE 1 in the foregoing method 500. Details are not described herein again.

The PE 1 sends the first VPN route to the gateway 1 through a first tunnel.

S1302: The gateway 1 receives the first VPN route sent by the PE 1.

The gateway 1 is an endpoint of the first tunnel. The gateway 1 receives, through the first tunnel, the first VPN route sent by the PE 1.

S1303: The PE 2 sends a second VPN route to the gateway 1.

For descriptions of generating the second VPN route by the PE 2, refer to the descriptions of generating the second VPN route by the PE 2 in the foregoing method 500. Details are not described herein again.

The PE 2 sends the second VPN route to the gateway 1 through a second tunnel.

S1304: The gateway 1 receives the second VPN route sent by the PE 2.

The gateway 1 is an endpoint of the second tunnel. The gateway 1 receives, through the second tunnel, the second VPN route sent by the PE 2.

S1305: The gateway 1 allocates a third VPN identifier to the first VPN route, and stores a correspondence between a first VPN identifier and the third VPN identifier on a forwarding plane.

S1306: The gateway 1 allocates the third VPN identifier to the second VPN route, and stores a correspondence between a second VPN identifier and the third VPN identifier on the forwarding plane.

In the method 1300, processes in which the gateway 1 performs S1305 and S1306 are respectively similar to the processes in which the ASBR 1 performs S505 and S506 in the foregoing method 500. For details, refer to the descriptions related to S505 and S506 in the method 500.

S1307: The gateway 1 advertises a third VPN route to the PE 3.

The third VPN route includes the third VPN identifier, a route prefix, an RD, and a third next hop.

The route prefix included in the third VPN route is a route prefix included in the first VPN route, and is also a route prefix included in the second VPN route. The RD included in the third VPN route is an RD included in the first VPN route, and is also an RD included in the second VPN route.

It should be noted that a route type of the third VPN route may be the same as or different from a route type of the first VPN route and a route type of the second VPN route. For details, refer to the related descriptions in S507. Details are not described herein again.

The third next hop included in the third VPN route is the gateway 1.

The gateway 1 is also an endpoint of a third tunnel. The gateway 1 is connected to the PE 3 through the third tunnel. The gateway 1 sends the third VPN route to the PE 3 through the third tunnel.

After obtaining the VPN route advertised by the gateway 1, the PE 3 can generate a correspondence between L3, the gateway 1, and an IP address of the CE 1. The VPN route advertised by the ASBE 1 includes the IP address of the CE 1.

The PE 3 then advertises the learned VPN route to the CE 2. The CE 2 can send a packet to the CE 1 based on the learned VPN route.

With reference to a network architecture shown in FIG. 12, the following describes the packet forwarding method provided in embodiments of this application.

Figure 14A:
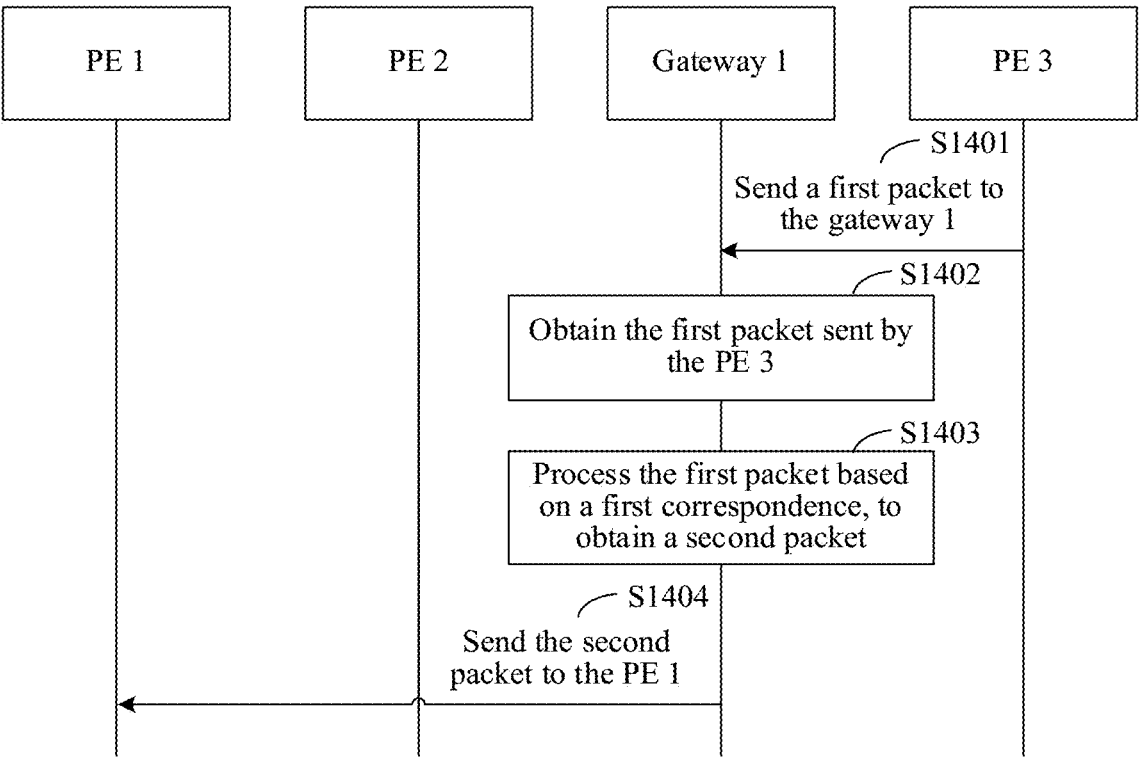
FIG. 14a is a schematic flowchart of a packet forwarding method according to an embodiment of this application.

FIG. 14a is a schematic flowchart of a packet forwarding method 1400 according to an embodiment of this application. The method 1400 may be applied to the network scenario shown in FIG. 12. The method 1400 includes S1401 to S1404.

A forwarding plane of a gateway 1 includes a first correspondence and a second correspondence. The first correspondence includes a correspondence between a first VPN identifier and a third VPN identifier. The second correspondence includes a correspondence between a second VPN identifier and the third VPN identifier.

S1401: A PE 3 sends a first packet to a gateway 1.

A CE 2 can obtain an IP address of a CE 1 based on a learned VPN route. The CE 2 can generate a packet whose destination address is the IP address of the CE 1, and send the packet to the PE 3. The PE 3 can process, based on a correspondence between L3 and the IP address of the CE 1, a packet sent by the CE 1, to obtain the first packet including L3.

The PE 3 sends the first packet to the gateway 1 through a third tunnel.

S1402: The gateway 1 obtains the first packet sent by PE 3.

The gateway 1 obtains, through the third tunnel, the first packet sent by the PE 3. The first packet includes the third VPN identifier, namely, L3. The gateway 1 can perform packet forwarding based on the third VPN identifier included in the first packet.

S1403: The gateway 1 obtains a second packet based on the first packet and the first correspondence.

The gateway 1 processes, based on the correspondence that is between the third VPN identifier and the first VPN identifier and that is included in the first correspondence, the first packet including the third VPN identifier, to obtain the second packet. The second packet includes the first VPN identifier, namely, L1.

For different types of VPN identifiers, manners of processing the first packet to generate the second packet are different. A manner in which the gateway 1 generates the second packet is similar to the manner in which the ASBR 1 generates the second packet in the foregoing method 500. For details, refer to the specific descriptions in S603. Details are not described herein again.

S1404: The gateway 1 sends the second packet to a PE 1.

The gateway 1 sends the second packet to the PE 1 through a first tunnel.

In an example, the gateway 1 can determine, based on a pre-stored correspondence, to send the second packet to the PE 1 through the first tunnel. The pre-stored correspondence that the gateway 1 can be based on may be specifically a correspondence between the first VPN identifier, the third VPN identifier, and a first interface ID or a correspondence between the first VPN identifier, the third VPN identifier, and a first tunnel ID.

The PE 1 can process the second packet, and forward a processed packet to the CE 1 based on the IP address that is of the CE 1 and that is included in the second packet, to implement packet transmission.

Based on a first VPN route and a second VPN route, fast reroute can be formed in a network. One of the first VPN route and the second VPN route is an active route, and the other VPN route is a standby route.

In a possible implementation, the first VPN route is an active route, and the PE 1 is an active next hop. Before S1403 is performed, the gateway 1 can determine that the PE 1 is reachable. The gateway 1 performs packet forwarding based on the first correspondence stored on the forwarding plane.

In another possible implementation, the second VPN route is an active route, and a PE 2 is an active next hop. The first VPN route is a standby route, and the PE 1 is a standby next hop. Before S1403 is performed, the gateway 1 can determine that the PE 2 is unreachable. The gateway 1 performs packet forwarding based on the first correspondence stored on the forwarding plane, to implement fast switching on the forwarding plane, and shorten time in which packet transmission cannot be normally performed in the network because the PE 2 is faulty.

Based on the first VPN route and the second VPN route, load balancing can be formed in the network.

Figure 14B:
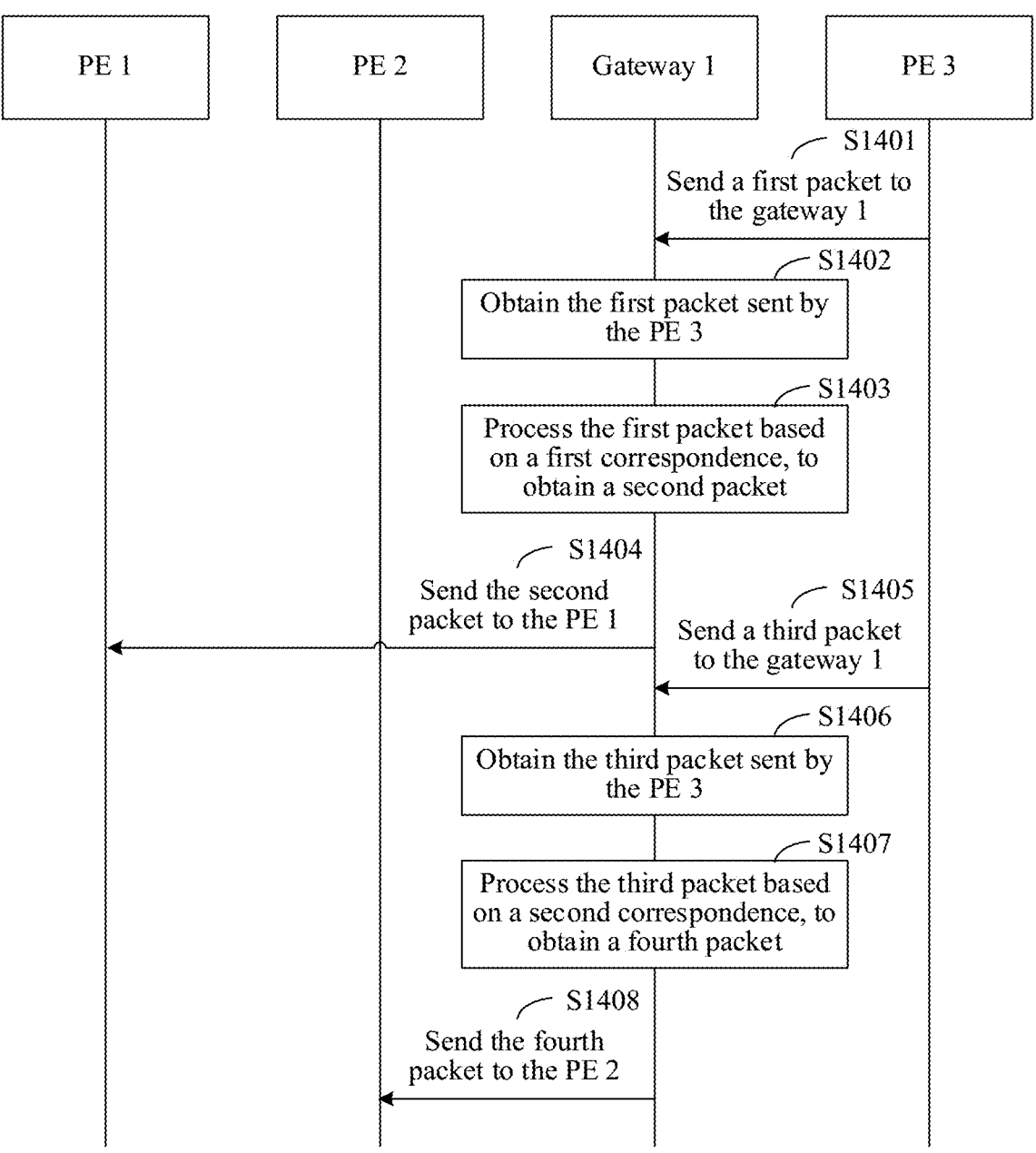
FIG. 14b is a schematic flowchart of another packet forwarding method according to an embodiment of this application.

Refer to FIG. 14*b*. In addition to S1401 to S1404, the packet forwarding method provided in this embodiment of this application may further include S1405 to S1408.

S1405: The PE 3 sends a third packet to the gateway 1.

A manner in which the PE 3 generates the third packet is the same as the manner in which the PE 3 generates the first packet in S1401. Details are not described herein again.

S1406: The gateway 1 obtains the third packet sent by the PE 3.

The gateway 1 obtains, through the third tunnel, the third packet sent by the PE 3. The third packet includes the third VPN identifier, namely, L3. The gateway 1 can perform packet forwarding based on the third VPN identifier included in the third packet.

S1407: The gateway 1 processes the third packet based on the second correspondence, to obtain a fourth packet.

The gateway 1 can process the third packet based on the correspondence that is between the third VPN identifier and the second VPN identifier and that is included in the second correspondence, to generate the fourth packet. The fourth packet includes the second VPN identifier, namely, L2.

For different types of VPN identifiers, manners of generating the fourth packet are different. A manner in which gateway 1 generates the fourth packet is similar to the foregoing manner of generating the second packet. Refer to the foregoing descriptions.

S1408: The gateway 1 sends the fourth packet to the PE 2.

The gateway 1 sends the fourth packet to the PE 2 through a second tunnel.

The PE 2 can process the fourth packet, and forward a processed packet to the CE 1 based on the IP address that is of the CE 1 and that is included in the fourth packet, to implement packet transmission.

FIG. 15 is a schematic flowchart of a route advertisement method 1500 according to an embodiment of this application.

The method 1500 may be applied to the network scenario shown in FIG. 4. For example, when the method 1500 is applied to the scenario shown in FIG. 4, in the method 1500, a first network device may be an ASBR 1 shown in FIG. 4, a second network device may be a PE 1 shown in FIG. 4, a third network device may be a PE 2 shown in FIG. 4, and a fourth network device may be an ASBR 3 shown in FIG. 4.

The method 1500 may alternatively be applied to the network scenario shown in FIG. 8. For example, when the method 1500 is applied to the scenario shown in FIG. 8, in the method 1500, a first network device may be an ASBR 1 shown in FIG. 8, a second network device may be a PE 1 shown in FIG. 8, a third network device may be an ASBR 2 shown in FIG. 8, and a fourth network device may be an ASBR 3 shown in FIG. 8.

The method 1500 may alternatively be applied to the network scenario shown in FIG. 9. For example, when the method 1500 is applied to the scenario shown in FIG. 9, in the method 1500, a first network device may be an ASBR 1 shown in FIG. 9, a second network device may be an ASBR 3 shown in FIG. 9, a third network device may be an ASBR 4 shown in FIG. 9, and a fourth network device may be a PE 1 shown in FIG. 9.

The method 1500 may alternatively be applied to the network scenario shown in FIG. 12. For example, when the method 1500 is applied to the scenario shown in FIG. 12, in the method 1500, a first network device may be a gateway 1 shown in FIG. 12, a second network device may be a PE 1 shown in FIG. 12, a third network device may be a PE 2 shown in FIG. 12, and a fourth network device may be a PE 3 shown in FIG. 12.

The method 1500 includes S1501 to S1505.

S1501: The first network device receives a first VPN route sent by the second network device.

The first network device is a network device that can allocate a VPN identifier, advertise a route, and forward a packet in a network. For example, the first network device may be a network device, for example, a router, a switch, or a gateway, having a VPN identifier allocation function, a route advertisement function, and a packet forwarding function.

The first network device can connect a first tunnel and a third tunnel, and connect a second tunnel and the third tunnel, to implement stitching of the first tunnel and the third tunnel and stitching of the second tunnel and the third tunnel. The first network device can obtain VPN routes through the first tunnel and the second tunnel, and then advertise a VPN route through the third tunnel.

In an example, the first network device may be an autonomous system border device, and is configured to connect two autonomous systems. The first network device may be an ASBR. For example, in the scenarios shown in FIG. 4, FIG. 8, and FIG. 9, the first network device is the ASBR 1.

In another example, the first network device may be a device in the network. For example, in the scenario shown in FIG. 12, the first network device is the gateway 1.

The first network device and the second network device are connected through the first tunnel. In an example, the second network device may be an IBGP peer of the first network device. For example, refer to the scenarios shown in FIG. 4, FIG. 8, and FIG. 12. In another example, the second network device may be an EBGP peer of the first network device. For example, refer to the scenario shown in FIG. 9. When the second network device is the EBGP peer of the first network device, the first tunnel is an inter-AS tunnel. An inter-AS stitching tunnel includes the first tunnel and the third tunnel.

The first VPN route includes a first VPN identifier, a route prefix, an RD, and a first next hop. The first next hop is the second network device. The first VPN identifier is associated with a first VPN instance. The first VPN instance is a network border device, for example, a VPN instance that is created by a PE device and associated with a VPN. When the second network device is a network border device, the first VPN instance may be created by the second network device. When the second network device is not a network border device, the first VPN instance may be created by a network border device connected to the second network device.

A type of the first VPN route is not limited in this embodiment of this application. The first VPN route may be an EVPN route, a VPNv4 route, or a VPNv6 route.

A type of the first VPN identifier is determined based on a type of the first tunnel.

In a possible implementation, the first tunnel may be an MPLS tunnel, and the first VPN identifier may be an MPLS label. It should be noted that the MPLS label in this embodiment of this application may be an MPLS label defined in an MPLS technology, or may be an SID defined in an SR-MPLS technology. The SID defined in the SR-MPLS technology is in a format of the MPLS label.

In another possible implementation, the first tunnel may be an SRv6 tunnel, and the first VPN identifier may be an SRv6 SID.

S1502: The first network device receives a second VPN route sent by the third network device.

The first network device and the third network device are connected through the second tunnel. The third network device may be an IBGP peer of the first network device. For example, refer to the scenarios shown in FIG. 4, FIG. 8, and FIG. 12. The third network device may be an EBGP peer of the first network device. For example, refer to the scenario shown in FIG. 9. When the third network device is the EBGP peer of the first network device, the second tunnel is an inter-AS tunnel.

The second VPN route includes a second VPN identifier, the route prefix, the RD, and a second next hop. The second next hop is the third network device. The second VPN identifier is associated with a second VPN instance. The second VPN instance is a network border device, for example, a VPN instance created by a PE device. When the third network device is a network border device, the second VPN instance may be created by the third network device. When the third network device is not a network border device, the second VPN instance may be created by a network border device connected to the third network device.

The second VPN instance and the first VPN instance are created by different network devices, and are associated with a same VPN.

A type of the second VPN route is not limited in this embodiment of this application. The second VPN route may be an Ethernet virtual private network EVPN route, a virtual private network version 4 VPNv4 route, or a virtual private network version 6 VPNv6 route. The type of the second VPN route is the same as the type of the first VPN route. The type of the second VPN route may be the same as the type of the first VPN route.

A type of the second VPN identifier is determined based on a type of the second tunnel.

In a possible implementation, the second tunnel may be an MPLS tunnel, and the second VPN identifier may be an MPLS label.

In another possible implementation, the second tunnel may be an SRv6 tunnel, and the second VPN identifier may be an SRv6 SID.

It should be noted that the type of the first tunnel is the same as the type of the second tunnel. Correspondingly, the type of the first VPN identifier is the same as the type of the second VPN identifier.

S1503: The first network device allocates a third VPN identifier to the first VPN route, and stores a first correspondence between the third VPN identifier and the first VPN identifier on a forwarding plane.

The first network device allocates, based on a one-VPN-identifier-per-next-hop manner, a same VPN identifier to received VPN routes that have a same next hop and a same RD.

The first network device allocates the third VPN identifier to the first VPN route.

A type of the third VPN identifier is determined based on a type of the third tunnel. The third tunnel is a tunnel between the first network device and the fourth network device.

In a possible implementation, the third tunnel may be an MPLS tunnel, and the third VPN identifier may be an MPLS label.

In another possible implementation, the third tunnel may be an SRv6 tunnel, and the third VPN identifier may be an SRv6 SID.

It should be noted that the type of the third tunnel may be the same as or different from the type of the first tunnel. Correspondingly, the type of the third VPN identifier may be the same as or different from the type of the first VPN identifier. This embodiment of this application provides four possible cases of the type of the first VPN identifier, the type of the second VPN identifier, and the type of the third VPN identifier below.

In a first case, the first VPN identifier, the second VPN identifier, and the third VPN identifier are all MPLS labels.

In a second case, the first VPN identifier, the second VPN identifier, and the third VPN identifier are all SRv6 SIDs.

In a third case, the first VPN identifier and the second VPN identifier are SRv6 SIDs, and the third VPN identifier is an MPLS label.

In a fourth case, the first VPN identifier and the second VPN identifier are MPLS labels, and the third VPN identifier is an SRv6 SID.

It should be noted that, in the fourth case, in an example, the third VPN identifier may be specifically END.BM. END.BM indicates that a tunnel endpoint is bound to an SR-MPLS policy. The first network device can decapsulate an obtained SRv6 packet based on END.BM, to obtain a packet payload, and then perform encapsulation based on the packet payload and the SR-MPLS policy, to obtain an MPLS packet.

The first network device stores the first correspondence between the first VPN identifier and the third VPN identifier on the forwarding plane. The first network device can process, based on the first correspondence, a packet including the third VPN identifier, to obtain a packet including the first VPN identifier.

In a possible implementation, the first correspondence includes a correspondence between the third VPN identifier, the first VPN identifier, and a first tunnel ID. The first tunnel ID identifies the first tunnel. The first network device can forward, through the first tunnel based on the first correspondence, the packet including the first VPN identifier.

In another possible implementation, the first correspondence includes a correspondence between the third VPN identifier, the first VPN identifier, and a first interface ID. The first interface ID identifies an outbound interface that is of the first network device and that is connected to the first tunnel. The first network device can determine, based on the first correspondence, to perform packet forwarding through the first tunnel connected to the outbound interface.

S1504: The first network device allocates the third VPN identifier to the second VPN route, and stores a second correspondence between the third VPN identifier and the second VPN identifier on the forwarding plane.

The first network device allocates the third VPN identifier to the second VPN route.

The first network device stores the second correspondence between the second VPN identifier and the third VPN identifier on the forwarding plane. The first network device can obtain, through encapsulation based on the second correspondence, a packet including the second VPN identifier.

In a possible implementation, the second correspondence includes a correspondence between the third VPN identifier, the second VPN identifier, and a second tunnel ID. The second tunnel ID identifies the second tunnel. The first network device can obtain, through encapsulation based on the second correspondence, the packet including the second VPN identifier, and forward, through the second tunnel, the packet including the second VPN identifier.

In another possible implementation, the second correspondence includes a correspondence between the third VPN identifier, the second VPN identifier, and a second interface ID. The second interface ID identifies an outbound interface that is of the first network device and that is connected to the second tunnel. The first network device can determine, based on the second correspondence, to perform packet forwarding through the second tunnel connected to the outbound interface.

The first VPN route and the second VPN route that are obtained by the first network device can form fast reroute or load balancing. In a conventional option B, a label allocated by an ASBR can correspond to only one next hop. In comparison, in the route advertisement method provided in this embodiment of this application, the third VPN identifier can separately correspond to the first VPN identifier and the second VPN identifier. The first network device can support the fast reroute or the load balancing based on the first correspondence and the second correspondence that are stored on the forwarding plane, to improve network performance.

S1505: The first network device advertises a third VPN route to the fourth network device.

The fourth network device may be an IBGP peer of the first network device. For example, refer to the scenario shown in FIG. 9 or FIG. 12. The fourth network device may be an EBGP peer of the first network device. For example, refer to the scenario shown in FIG. 4 or FIG. 8. When the fourth network device is an EBGP peer of the first network device, the third tunnel is an inter-AS tunnel.

The third VPN route includes the third VPN identifier, the route prefix, the RD, and a third next hop. The third next hop is the first network device. The route prefix included in the third VPN route is the same as the route prefix included in the first VPN route, and is also the same as the route prefix included in the second VPN route. The RD included in the third VPN route is the same as the RD included in the first VPN route, and is also the same as the RD included in the second VPN route.

The third VPN route is an EVPN route, a VPNv4 route, or a VPNv6 route. The route type of the third VPN route may be the same as or different from a route type of the first VPN route and a route type of the second VPN route.

For example, in a possible implementation, the route type of the first VPN route and the route type of the second VPN route may be EVPN routes, and the route type of the third VPN route may be a VPNv4 route or a VPNv6 route. For another example, in another possible implementation, the route type of the first VPN route and the route type of the second VPN route may be VPNv4 routes or VPNv6 routes, and the route type of the third VPN route may be an EVPN route.

Embodiments of this application further provide a packet forwarding method. The packet forwarding method is applicable to a first network device. The first network device stores a first correspondence and a second correspondence. The first correspondence includes a correspondence between a first VPN identifier and a third VPN identifier. The second correspondence includes a correspondence between a second VPN identifier and the third VPN identifier. In a scenario in which fast reroute is implemented based on a first VPN route and a second VPN route, the first network device can switch, in the first correspondence and the second correspondence, a correspondence for guiding packet forwarding. In a scenario in which load balancing is implemented based on the first VPN route and the second VPN route, the first network device can use the first correspondence and the second correspondence to guide the packet forwarding. In this way, the fast reroute or the load balancing formed by the routes can be supported, and network performance can be improved.

Figure 16A:
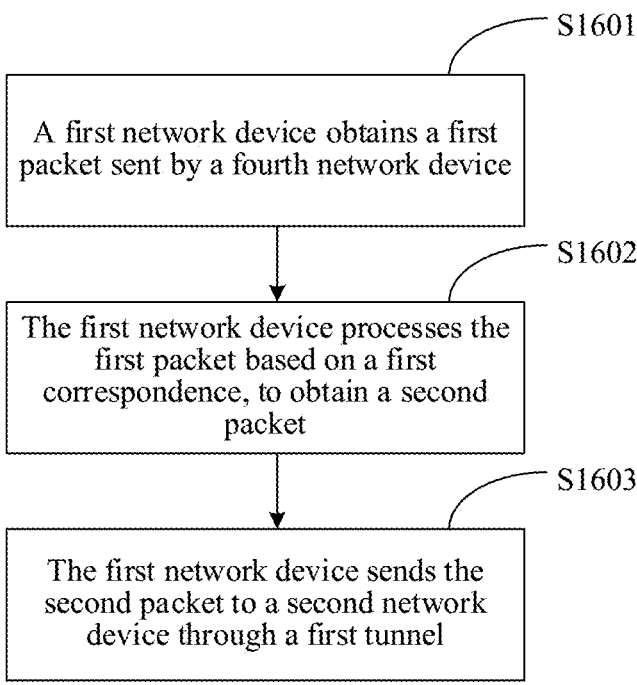
FIG. 16a is a schematic flowchart of a packet forwarding method according to an embodiment of this application.

FIG. 16*a* is a schematic flowchart of a packet forwarding method 1600 according to an embodiment of this application.

The method 1600 may be applied to the network scenario shown in FIG. 4. For example, when the method 1600 is applied to the scenario shown in FIG. 4, in the method 1600, a first network device may be an ASBR 1 shown in FIG. 4, a second network device may be a PE 1 shown in FIG. 4, a third network device may be a PE 2 shown in FIG. 4, and a fourth network device may be an ASBR 3 shown in FIG. 4.

The method 1600 may alternatively be applied to the network scenario shown in FIG. 8. For example, when the method 1600 is applied to the scenario shown in FIG. 8, in the method 1600, a first network device may be an ASBR 1 shown in FIG. 8, a second network device may be a PE 1 shown in FIG. 8, a third network device may be an ASBR 2 shown in FIG. 8, and a fourth network device may be an ASBR 3 shown in FIG. 8.

The method 1600 may alternatively be applied to the network scenario shown in FIG. 9. For example, when the method 1600 is applied to the scenario shown in FIG. 9, in the method 1600, a first network device may be an ASBR 1 shown in FIG. 9, a second network device may be an ASBR 3 shown in FIG. 9, a third network device may be an ASBR 4 shown in FIG. 9, and a fourth network device may be a PE 1 shown in FIG. 9.

The method 1600 may alternatively be applied to the network scenario shown in FIG. 12. For example, when the method 1600 is applied to the scenario shown in FIG. 12, in the method 1600, a first network device may be a gateway 1 shown in FIG. 12, a second network device may be a PE 1 shown in FIG. 12, a third network device may be a PE 2 shown in FIG. 12, and a fourth network device may be a PE 3 shown in FIG. 12.

The method 1600 includes S1601 to S1603.

S1601: A first network device obtains a first packet sent by the fourth network device.

The first network device is a network device that can forward a packet in a network. For example, the first network device may be a network device, for example, a router, a switch, or a gateway, having a packet forwarding function.

The first network device can connect a first tunnel and a third tunnel, and connect a second tunnel and the third tunnel. The first network device can implement stitching of the first tunnel and the third tunnel and stitching of the second tunnel and the third tunnel.

The first network device can obtain a packet through the third tunnel, and then send, through one or more of the first tunnel and the second tunnel, a packet obtained through processing.

In an example, the first network device may be an autonomous system border device, and is configured to connect two autonomous systems. The first network device may be an ASBR. For example, in the scenarios shown in FIG. 4, FIG. 8, and FIG. 9, the first network device is the ASBR 1.

In another example, the first network device may be a device in the network. For example, in the scenario shown in FIG. 12, the first network device is the gateway 1.

The first network device and the fourth network device are connected through the third tunnel. The fourth network device may be an IBGP peer of the first network device. For example, refer to the scenarios shown in FIG. 4, FIG. 8, and FIG. 12. Alternatively, the fourth network device may be an EBGP peer of the first network device. For example, refer to the scenario shown in FIG. 9. When the fourth network device is the EBGP peer of the first network device, the third tunnel is an inter-AS tunnel.

The first network device obtains, through the third tunnel, the first packet sent by the fourth network device. The first packet includes a third VPN identifier.

S1602: The first network device processes the first packet based on a first correspondence, to obtain a second packet.

After obtaining the first packet, the first network device can determine, based on the third VPN identifier included in the first packet and the first correspondence, a first VPN identifier corresponding to the third VPN identifier.

The first network device processes the first packet based on the first correspondence, to obtain the second packet including the first VPN identifier.

In some possible implementations, this embodiment of this application provides four specific implementations in which the first packet is processed based on the first correspondence, to obtain the second packet.

In a first implementation, both the first packet and the second packet are MPLS packets.

In this case, both the third VPN identifier and the first VPN identifier are MPLS labels.

The first network device replaces the third VPN identifier included in the first packet with the first VPN identifier based on the first correspondence.

Specifically, an MPLS packet header of the first packet includes the third VPN identifier. The first network device deletes the third VPN identifier included in the first packet, and encapsulates the first VPN identifier into a packet obtained by deleting the third VPN identifier, to obtain the second packet. The second packet includes the first VPN identifier.

In a second implementation, both the first packet and the second packet are SRv6 packets.

In this case, both the third VPN identifier and the first VPN identifier are SRv6 SIDs.

The first network device replaces the third VPN identifier included in the first packet with the first VPN identifier.

Specifically, a destination address of the first packet is the third VPN identifier. The ASBR 1 replaces a destination address of the first packet with the first VPN identifier to obtain the second packet. A destination address of the second packet is the first VPN identifier.

In a third implementation, the first packet is an MPLS packet, and the second packet is an SRv6 packet.

In this case, the third VPN identifier is an MPLS label, and the first VPN identifier is an SRv6 SID.

Specifically, the first network device decapsulates the first packet, and removes an MPLS packet header to obtain a packet payload. The first network device performs SRv6 encapsulation on the obtained packet payload to obtain the second packet. A destination address of the second packet is the first VPN identifier.

In a fourth implementation, the first packet is an SRv6 packet, and the second packet is an MPLS packet.

In this case, the third VPN identifier is an SRv6 SID, and the first VPN identifier is an MPLS label.

Specifically, the first network device decapsulates the first packet, and removes an IPv6 packet header to obtain a packet payload. The first network device performs MPLS encapsulation on the obtained packet payload to obtain the second packet. An MPLS packet header of the second packet includes the first VPN identifier.

In a possible implementation, in an example, the third VPN identifier may be specifically END.BM. END.BM indicates that a tunnel endpoint is bound to an SR-MPLS policy. In this embodiment of this application, the first network device is used as an endpoint of the third tunnel, and decapsulates the first packet based on END.BM included in the first packet. The first network device re-encapsulates the packet payload based on the SR-MPLS policy that indicates the first tunnel, to obtain the second packet.

S1603: The first network device sends the second packet to the second network device through the first tunnel.

A method for determining, by the first network device, to send the second packet to the second network device through the first tunnel is not limited in this embodiment of this application. The following provides three possible implementations.

In an example, the first correspondence includes a correspondence between the first VPN identifier, the third VPN identifier, and a first tunnel ID. The first tunnel ID identifies the first tunnel. The first network device can determine, based on the first correspondence, to forward the second packet through the first tunnel identified by the first tunnel ID.

In another example, the first correspondence includes a correspondence between the first VPN identifier, the third VPN identifier, and a first interface ID. The first interface ID identifies an outbound interface that is of the first network device and that is connected to the first tunnel. The first network device can determine, based on the first correspondence, to forward the second packet through the first tunnel connected to the outbound interface.

In still another example, the first network device can pre-store a correspondence between the first VPN identifier and a first tunnel ID. The first tunnel ID identifies the first tunnel. The first network device can determine, based on the correspondence between the first VPN identifier and the first tunnel ID, to forward, through the first tunnel identified by the first tunnel ID, the second packet including the first VPN identifier.

In a possible implementation, based on the first correspondence and a second correspondence, the network can support fast reroute.

The second network device may be an active next hop, and the third network device may be a standby next hop. Before S1603 is performed, the first network device can determine that the second network device is reachable. The first network device performs packet forwarding based on the first correspondence stored on a forwarding plane.

In another possible implementation, a second VPN route is an active route, and the third network device is an active next hop. The first VPN route is a standby route, and the second network device is a standby next hop. Before S1603 is performed, the first network device can determine that the third network device is unreachable. The first network device performs packet forwarding based on the first correspondence stored on the forwarding plane, to implement fast switching on the forwarding plane, perform packet transmission by using the standby route, and shorten time in which packet transmission cannot be normally performed in the network because the third network device is faulty.

In another possible implementation, based on the first correspondence and the second correspondence, the network can support load balancing.

Refer to FIG. 16*b*. In addition to S1601 to S1603, the packet forwarding method provided in this embodiment of this application may further include S1604 to S1606.

S1604: The first network device obtains a third packet sent by the fourth network device.

A manner in which the fourth network device generates the third packet is the same as the manner in which the fourth network device generates the first packet in S1601. Details are not described herein again.

The first network device obtains, through the third tunnel, the third packet sent by the fourth network device. The third packet includes the third VPN identifier. The first network device can perform packet forwarding based on the third VPN identifier included in the third packet.

S1605: The first network device obtains a fourth packet based on the third packet and the second correspondence.

The first network device can process the third packet based on a correspondence that is between the third VPN identifier and a second VPN identifier and that is included in the second correspondence, to generate the fourth packet. The fourth packet includes the second VPN identifier.

For different types of VPN identifiers, manners of generating the fourth packet are different. A manner in which the first network device generates the fourth packet is similar to the foregoing manner of generating the second packet. Refer to the foregoing descriptions.

S1606: The first network device sends the fourth packet to the third network device.

The first network device sends the fourth packet to the third network device through the second tunnel.

A manner in which the first network device determines to send the fourth packet through the second tunnel is similar to the foregoing manner in which the first network device determines to send the second packet through the first tunnel. The following provides three possible implementations.

In an example, the second correspondence includes a correspondence between the second VPN identifier, the third VPN identifier, and a second tunnel ID. The second tunnel ID identifies the second tunnel. The first network device can determine, based on the second correspondence, to forward the fourth packet through the second tunnel identified by the second tunnel ID.

In another example, the second correspondence includes a correspondence between the second VPN identifier, the third VPN identifier, and a second interface ID. The second interface ID identifies an outbound interface that is of the first network device and that is connected to the second tunnel. The first network device can determine, based on the second correspondence, to forward the fourth packet through the second tunnel connected to the outbound interface.

In still another example, the first network device can store a correspondence between the second VPN identifier and a second tunnel ID. The second tunnel ID identifies the second tunnel. The first network device can determine, based on the correspondence between the second VPN identifier and the second tunnel ID, to forward the fourth packet through the second tunnel identified by the second tunnel ID.

Figure 17:
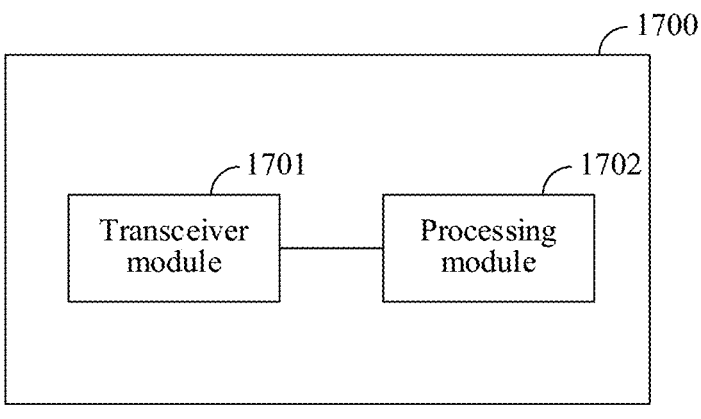
FIG. 17 is a schematic diagram of a structure of a network device according to an embodiment of this application.

FIG. 17 is a possible schematic diagram of a structure of a network device in the foregoing embodiments. The network device may implement functions of the first network device in the method 500, the method 800, the method 1000, the method 1300, and the method 1500. Refer to FIG. 17. The apparatus includes a transceiver module 1701 and a processing module 1702. These modules may perform the corresponding functions of the first network device in the examples in the method 500, the method 800, the method 1000, the method 1300, and the method 1500.

In an example, with reference to FIG. 5, the transceiver module 1701 is configured to support the network device in performing S502, S503, and S507 in FIG. 5, and the processing module 1702 is configured to support the network device in performing S502 and S504 to S506 in FIG. 5, and/or another process performed by the first network device in the technology in this specification. For example, the transceiver module 1701 is configured to perform various operations related to receiving and/or sending and performed by the first network device in the foregoing method embodiments; and the processing module 1702 is configured to perform various processing operations of the first network device in the foregoing method embodiments. For example, the transceiver module 1701 is configured to receive the first VPN route sent by the PE 1, receive the second VPN route sent by the PE 2, and advertise the third VPN route to the ASBR 3. The processing module 1702 is configured to: allocate the third VPN identifier to the first VPN route, store the correspondence between the first VPN identifier and the third VPN identifier on the forwarding plane, allocate the third VPN identifier to the second VPN route, and store the correspondence between the second VPN identifier and the third VPN identifier on the forwarding plane. For a specific execution process, refer to the detailed descriptions of the corresponding steps in the embodiment shown in FIG. 5. Details are not described herein again.

Similarly, the transceiver module 1701 may perform various operations related to receiving and/or sending and performed by the first network device in the method 800, the method 1000, the method 1300, and the method 1500; and the processing module 1702 is configured to perform various processing operations of the first network device in the examples in the method 600 to the method 1600. For a specific execution process, refer to the detailed descriptions of the corresponding steps in the embodiments shown in the method 800, the method 1000, the method 1300, and the method 1500. Details are not described herein again.

Figure 18:
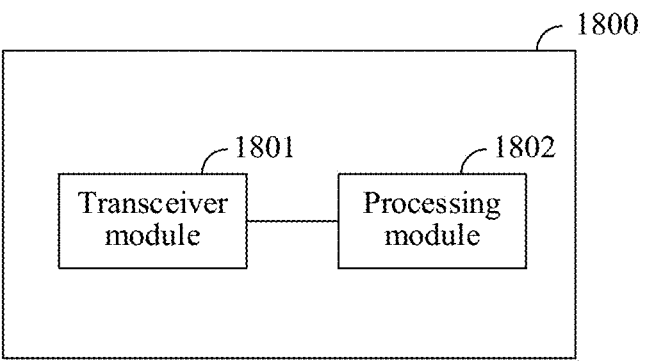
FIG. 18 is a schematic diagram of a structure of a network device according to an embodiment of this application.

FIG. 18 is a possible schematic diagram of a structure of a network device in the foregoing embodiments. The network device may implement functions of the first network device in the method 600, the method 900, the method 1100, the method 1400, and the method 1600. Refer to FIG. 18. The network device includes a transceiver module 1801 and a processing module 1802. These modules may perform the corresponding functions of the first network device in the examples in the method 600, the method 900, the method 1100, the method 1400, and the method 1600.

In an example, with reference to FIG. 6a, the transceiver module 1801 is configured to support the network device in performing S602 in FIG. 6a, and the processing module 1802 is configured to support the network device in performing S603 in FIG. 6a, and/or another process performed by the first network device in the technology in this specification. For example, the transceiver module 1801 is configured to perform various operations related to receiving and/or sending and performed by the first network device in the foregoing method embodiments; and the processing module 1802 is configured to perform various processing operations of the first network device in the foregoing method embodiments. For example, the transceiver module 1801 is configured to receive the first packet sent by the ASBR 3, and send the second packet to the PE 1. The processing module 1802 is configured to process the first packet based on the first correspondence, to obtain the second packet. For a specific execution process, refer to the detailed descriptions of the corresponding steps in the embodiment shown in FIG. 6*a*. Details are not described herein again.

Similarly, the transceiver module 1801 may perform various operations related to receiving and/or sending and performed by the first network device in the examples in the method 900, the method 1100, the method 1400, and the method 1600; and the processing module 1802 is configured to perform various processing operations of the first network device in the method 900, the method 1100, the method 1400, and the method 1600. For a specific execution process, refer to the detailed descriptions of the corresponding steps in the embodiments shown in the method 900, the method 1100, the method 1400, and the method 1600. Details are not described herein again.

It should be noted that, in embodiments of this application, division into the modules is an example, and is merely logical function division. Another division manner may be used during actual implementation. Function modules in embodiments of this application may be integrated into one processing module, each of the modules may exist alone physically, or two or more modules are integrated into one unit. For example, in the foregoing embodiment, an obtaining unit and a processing unit may be a same module or different modules. The integrated module may be implemented in a form of hardware, or may be implemented in a form of a software function module.

Figure 19:
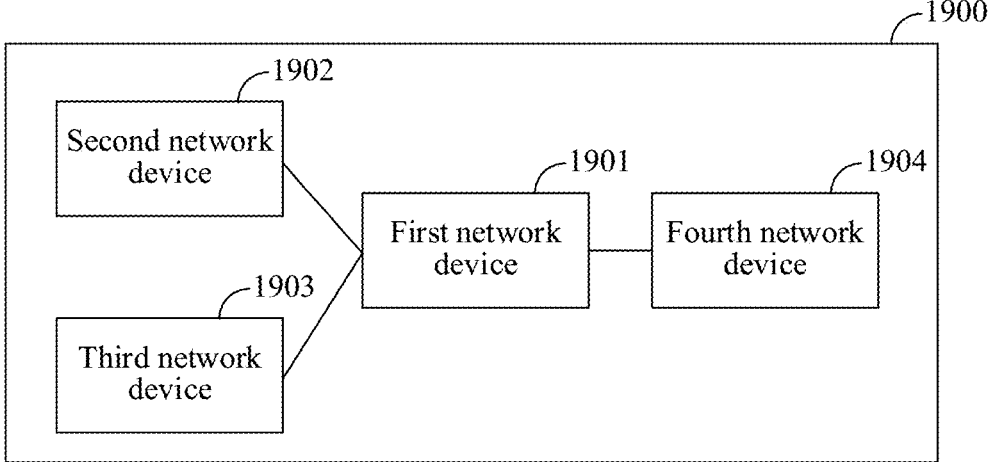
FIG. 19 is a schematic diagram of a structure of a network system according to an embodiment of this application.

Refer to FIG. 19. An embodiment of the present invention provides a network system 1900. The system 1900 is configured to implement the route advertisement method and the packet forwarding method in the foregoing method embodiments. The system 1900 includes a network device 1901, a network device 1902, a network device 1903, and a network device 1904. The network device 1901 may implement functions of the first network device in the foregoing method embodiments, the network device 1902 may implement functions of the second network device in the foregoing method embodiments, the network device 1903 may implement functions of the third network device in the foregoing method embodiments, and the network device 1904 may implement functions of the fourth network device in the foregoing method embodiments. For a specific execution process, refer to the detailed descriptions of the corresponding steps in the foregoing method embodiments. Details are not described one by one herein again.

Figure 20:
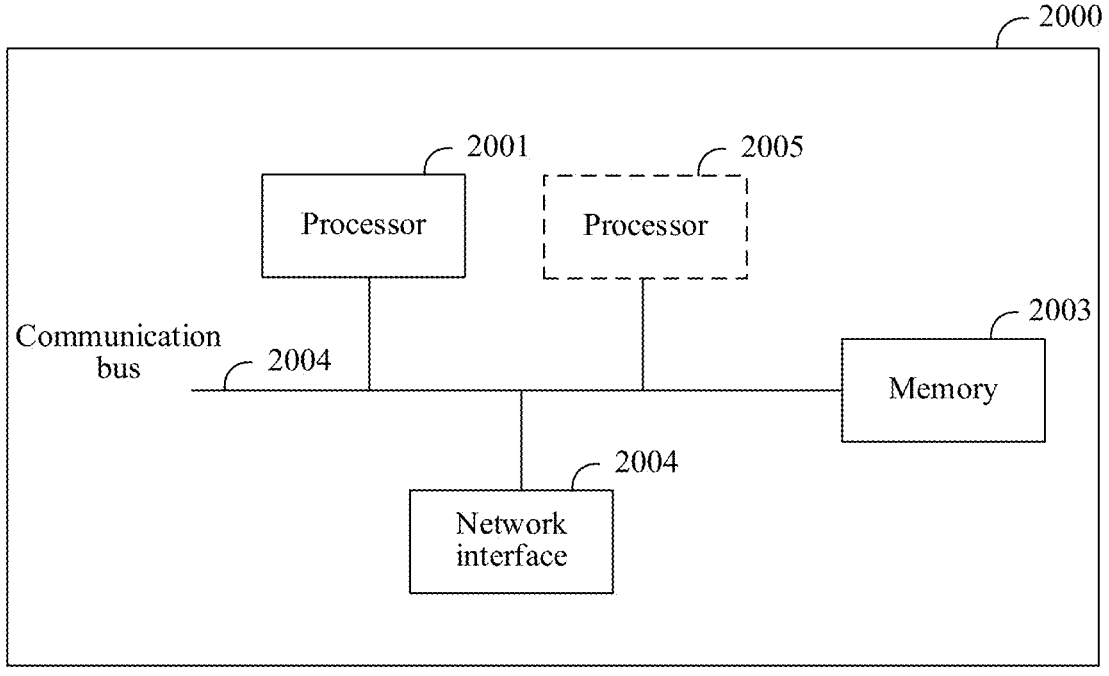
FIG. 20 is a schematic diagram of a structure of a device according to an embodiment of this application.

FIG. 20 is a schematic diagram of a structure of a device 2000 according to an embodiment of this application. The network device 1700 in FIG. 17 and the network device 2000 in FIG. 18 may be implemented by using the device shown in FIG. 20. Refer to FIG. 20, the device 2000 includes at least one processor 2001, a communication bus 2002, and at least one network interface 2004. Optionally, the device 2000 may further include a memory 2003.

The processor 2001 may be a general purpose central processing unit (central processing unit, CPU), an application-specific integrated circuit (application-specific integrated circuit, ASIC), or one or more integrated circuits (integrated circuits, ICs) configured to control program execution of the solutions in this application. The processor may be configured to process a packet, to implement the packet sending method provided in embodiments of this application.

For example, when the first network device in FIG. 15 is implemented by using the device shown in FIG. 20, the processor may be configured to: allocate the third VPN identifier to the first VPN route, store the first correspondence between the third VPN identifier and the first VPN identifier on the forwarding plane, allocate the third VPN identifier to the second VPN route, and store the second correspondence between the third VPN identifier and the second VPN identifier on the forwarding plane. For specific function implementation, refer to the processing part corresponding to the first network device in the method embodiments. For another example, when the first network device in FIG. 16 is implemented by using the device shown in FIG. 20, the processor may be configured to process the first packet based on the first correspondence, to obtain the second packet. For specific function implementation, refer to the processing part of the first network device in the method embodiments.

The communication bus 2002 is configured to transfer information between the processor 2001, the network interface 2004, and the memory 2003.

The memory 2003 may be a read-only memory (read-only memory, ROM) or another type of static storage device that may store static information and instructions. The memory 2003 may alternatively be a random access memory (random access memory, RAM) or another type of dynamic storage device that may store information and instructions, or may be a compact disc read-only memory (compact disc read-only Memory, CD-ROM) or another optical disc storage, an optical disc storage (including a compact disc, a laser disc, an optical disc, a digital versatile disc, a Blu-ray disc, and the like), a disk storage medium or another magnetic storage device, or any other medium that can be configured to carry or store expected program code in a form of instructions or a data structure and that can be accessed by a computer, but is not limited thereto. The memory 2003 may exist independently, and is connected to the processor 2001 through the communication bus 2002. Alternatively, the memory 2003 and the processor 2001 may be integrated together.

Optionally, the memory 2003 is configured to store program code or instructions for executing the solutions in this application, and the processor 2001 controls the execution. The processor 2001 is configured to execute the program code or the instructions stored in the memory 2003. The program code may include one or more software modules. Optionally, the processor 2001 may alternatively store the program code or the instructions for executing the solutions in this application. In this case, the processor 2001 does not need to read the program code or the instructions from the memory 2003.

The network interface 2004 may be an apparatus such as a transceiver, and is configured to communicate with another device or a communication network. The communication network may be the Ethernet, a radio access network (RAN), a wireless local area network (wireless local area network, WLAN), or the like. In this embodiment of this application, the network interface 2004 may be configured to receive a packet sent by another node in a segment routing network, or may send a packet to another node in a segment routing network. The network interface 2004 may be an Ethernet (Ethernet) interface, a fast Ethernet (fast Ethernet, FE) interface, a gigabit Ethernet (gigabit Ethernet, GE) interface, or the like.

During specific implementation, in an embodiment, the device 2000 may include a plurality of processors, for example, the processor 2001 and a processor 2005 in FIG. 20. Each of the processors may be a single-core (single-CPU) processor, or may be a multi-core (multi-CPU) processor. The processor herein may be one or more devices, circuits, and/or processing cores configured to process data (for example, computer program instructions).

Figure 21:
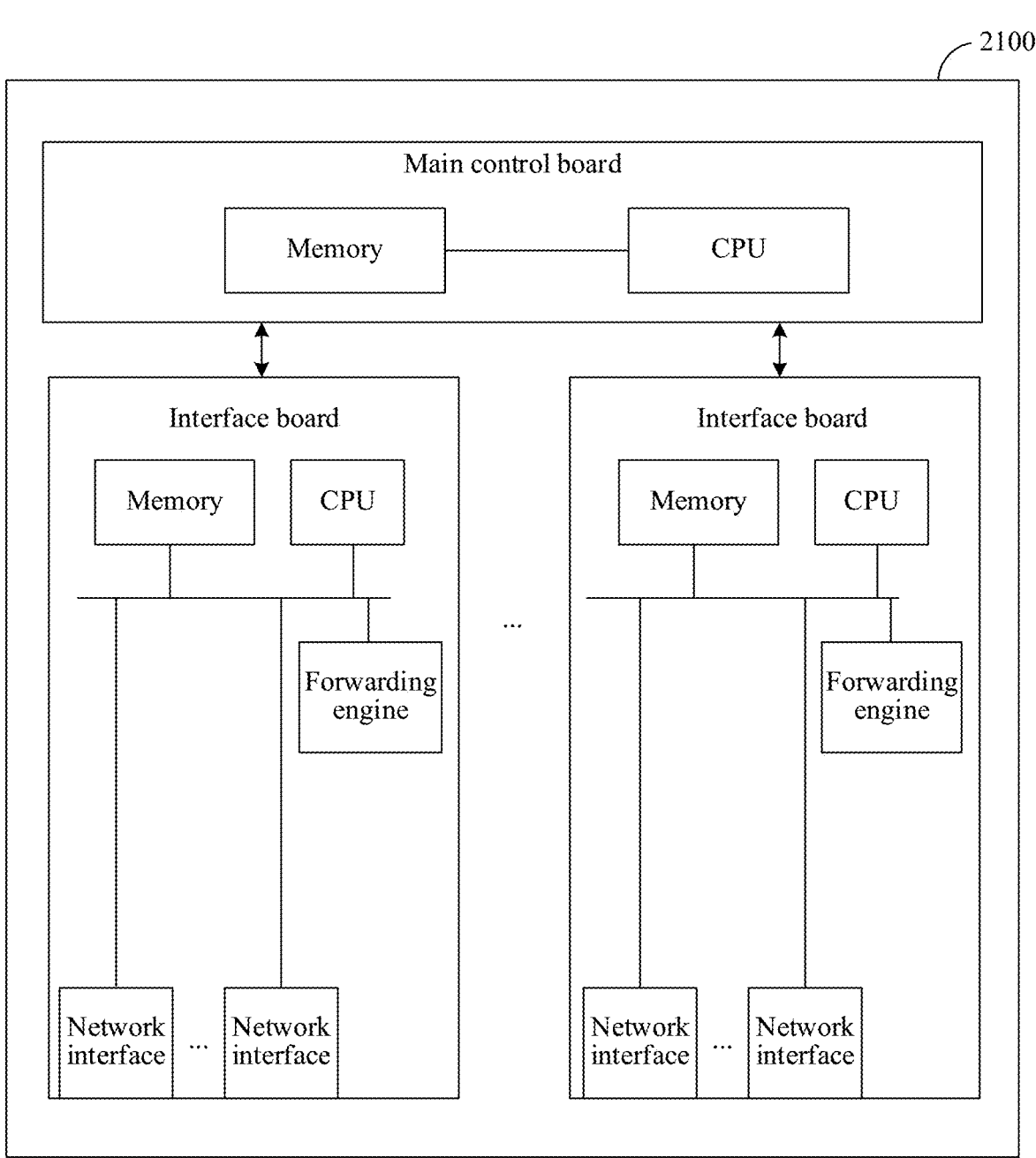
FIG. 21 is a schematic diagram of a structure of a device according to an embodiment of this application.

FIG. 21 is a schematic diagram of a structure of a device 2100 according to an embodiment of this application. The first network device in the foregoing method embodiments can be implemented based on the device 2100. Refer to the schematic diagram of the structure of the device shown in FIG. 21. The device 2100 includes a main control board and one or more interface boards. The main control board is communicatively connected to the interface board. The main control board is also referred to as a main processing unit (main processing unit, MPU) or a route processor card (route processor card). The main control board includes a CPU and a memory, and is responsible for controlling and managing each component in the device 2100, including route computation, and device management and maintenance functions. The interface board is also referred to as a line processing unit (line processing unit, LPU) or a line card (line card), and is configured to receive and send a packet. In some embodiments, the main control board communicates with the interface board through a bus, or the interface boards communicate with each other through a bus. In some embodiments, the interface boards communicate with each other through a switching board. In this case, the device 2100 also includes the switching board. The switching board is communicatively connected to the main control board and the interface boards, and is configured to forward data between the interface boards. The switching board may also be referred to as a switch fabric unit (switch fabric unit, SFU). The interface board includes a CPU, a memory, a forwarding engine, and an interface card (interface card, IC). The interface card may include one or more network interfaces. The network interface may be an Ethernet interface, an FE interface, a GE interface, or the like. The CPU is communicatively connected to the memory, the forwarding engine, and the interface card. The memory is configured to store a correspondence. The forwarding engine is configured to forward a received packet based on the correspondence stored in the memory. The forwarding engine may be a network processor (network processor, NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also perform functions of the forwarding engine, such as implementing software forwarding based on a general-purpose CPU, so that no forwarding engine is needed in the interface board. In some embodiments, the forwarding engine may be implemented by using an ASIC or a field programmable gate array (field programmable gate array, FPGA). In some embodiments, the memory that stores a forwarding table may alternatively be integrated into the forwarding engine, and is used as a part of the forwarding engine.

An embodiment of this application further provides a chip system, including a processor. The processor is coupled to a memory. The memory is configured to store a program or instructions. When the program or the instructions are executed by the processor, the chip system is enabled to implement the method performed by the first network device in the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated on a same chip, or may be separately disposed on different chips. A type of the memory and a manner of disposing the memory and the processor are not specifically limited in this application.

For example, the chip system may be an FPGA, an ASIC, a system on chip (system on chip, SoC), a CPU, an NP, a digital signal processing circuit (digital signal processor, DSP), a micro controller unit (micro controller unit, MCU), a programmable controller (programmable logic device, PLD), or another integrated chip.

It should be understood that steps in the foregoing method embodiments may be completed by using a hardware integrated logical circuit in the processor or instructions in a form of software. The steps of the methods disclosed with reference to embodiments of this application may be directly performed and completed by a hardware processor, or may be performed and completed by using a combination of hardware in the processor and a software module.

An embodiment of this application further provides a computer-readable storage medium, including instructions. When the instructions are run on a computer, the computer is enabled to perform the methods in the foregoing embodiments.

In the specification, claims, and accompanying drawings of this application, the terms "first", "second", "third", "fourth", and so on are intended to distinguish between similar objects but do not necessarily indicate a specific sequence or order. It should be understood that the data termed in such a way is interchangeable in appropriate circumstances, so that embodiments described herein can be implemented in orders other than the order illustrated or described herein. In addition, the terms "include", "have" and any variant thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

In this application, "at least one" means one or more, and "a plurality of" means two or more. "At least one of the following" or a similar expression thereof means any combination of these items, and includes a singular item or any combination of plural items. For example, at least one of a, b, or c may indicate: a, b, c, a and b, a and c, b and c, or a, b, and c, where a, b, and c may be singular or plural. In this application, it is considered that "A and/or B" includes only A, only B, and A and B.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical module division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be obtained based on actual requirements to achieve the objectives of the solutions of embodiments.

In addition, module units in embodiments of this application may be integrated into one processing unit, each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions in this application essentially, the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Persons skilled in the art should be aware that in the foregoing one or more examples, functions described in the present invention may be implemented by hardware, software, firmware, or any combination thereof. When the functions are implemented by using the software, the functions may be stored in a computer-readable medium or transmitted as one or more instructions or code in the computer-readable medium. Computer-readable media include a computer storage medium and a communication medium. The communication medium includes any medium that enables a computer program to be transmitted from one place to another. The storage medium may be any reachable medium accessible to a general-purpose or special-purpose computer.

The objectives, technical solutions, and beneficial effects of the present invention are further described in detail in the foregoing specific implementations. It should be understood that the foregoing descriptions are merely specific implementations of the present invention.

In conclusion, the foregoing embodiments are merely intended for describing the technical solutions in this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof. However, these modifications or replacements do not make the essence of the corresponding technical solutions depart from the scope of the technical solutions in embodiments of this application.

What is claimed is:

1. A method, comprising:

receiving, by a first network device, a first virtual private network (VPN) route sent by a second network device, wherein the first VPN route comprises a first VPN identifier, a route prefix, a route distinguisher (RD), and a first next hop, wherein the first next hop comprises the second network device, the first network device communicates with the second network device through a first tunnel, the first network device comprises a tunnel endpoint of the first tunnel, and the first VPN identifier is associated with a first VPN instance;

receiving, by the first network device, a second VPN route sent by a third network device, wherein the second VPN route comprises a second VPN identifier, the route prefix, the RD, and a second next hop, wherein the second next hop comprises the third network device, the first network device communicates with the third network device through a second tunnel, the first network device comprises a tunnel endpoint of the second tunnel, the second VPN identifier is associated with a second VPN instance, and the first VPN instance and the second VPN instance are associated with a same VPN;

allocating, by the first network device, a third VPN identifier to the first VPN route;

storing, by the first network device, a first correspondence between the third VPN identifier and the first VPN identifier on a forwarding plane, wherein the first network device allocates, based on a one-VPN-identifier-per-next-hop manner, a same VPN identifier to received VPN routes that comprise a same next hop and a same RD;

allocating, by the first network device, the third VPN identifier to the second VPN route, and storing a second correspondence between the third VPN identifier and the second VPN identifier on the forwarding plane; and advertising, by the first network device, a third VPN route to a fourth network device, wherein the third VPN route comprises the third VPN identifier, the route prefix, the RD, and a third next hop, the third next hop is the first network device, the first network device communicates with the fourth network device through a third tunnel, and the first network device is a tunnel endpoint of the third tunnel.

2. The method according to claim 1, wherein the first correspondence comprises a correspondence between the third VPN identifier, the first VPN identifier, and a first tunnel identifier (ID), wherein the first tunnel ID identifies the first tunnel, wherein the second correspondence comprises a correspondence between the third VPN identifier, the second VPN identifier, and a second tunnel identifier, and wherein the second tunnel ID identifies the second tunnel.

3. The method according to claim 1, wherein the first VPN route, the second VPN route, and the third VPN route comprise one or more Ethernet virtual private network (EVPN) routes, one or more virtual private network version 4 (VPNv4) routes, or one or more virtual private network version 6 (VPNv6) routes.

4. The method according to claim 1, wherein the first VPN identifier comprises a first multiprotocol label switching (MPLS) label, the second VPN identifier comprises a second MPLS label, and the third VPN identifier comprises a third MPLS label; or the first VPN identifier comprises a first MPLS label, the second VPN identifier comprises a second MPLS label, and the third VPN identifier comprises a segment routing over internet protocol version 6 segment identifier (SID) SRv6; or the first VPN identifier comprises a first SRv6 SID, the second VPN identifier comprises a second SRv6 SID, and the third VPN identifier comprises an MPLS label; or the first VPN identifier comprises a first SRv6 SID, the second VPN identifier comprises a second SRv6 SID, and the third VPN identifier comprises a third SRv6 SID.

5. The method according to claim 1, wherein the method further comprises:

receiving, by the first network device through the third tunnel, a first packet sent by the fourth network device, wherein the first packet comprises the third VPN identifier;

processing, by the first network device, the first packet based on the first correspondence, to obtain a second packet, wherein the second packet comprises the first VPN identifier; and sending, by the first network device, the second packet to the second network device through the first tunnel.

6. The method according to claim 1, further comprising:

performing a fast reroute based on the first VPN route and the second VPN route.

7. The method according to claim 1, further comprising:

performing load balancing based on the first VPN route and the second VPN route.

8. The method according to claim 1, wherein the first tunnel and the third tunnel form a stitching tunnel.

9. The method according to claim 8, wherein the first tunnel and the third tunnel form an inter-autonomous system (AS) stitching tunnel.

10. The method according to claim 1, wherein the first network device comprises a first autonomous system border router (ASBR), the fourth network device comprises a second ASBR, and an external border gateway protocol (EBGP) peer is established between the first ASBR and the second ASBR.

11. The method according to claim 1, wherein the first network device comprises a third ASBR, the fourth network device comprises a first provider edge (PE) device, and an interior border gateway protocol (IBGP) peer is established between the third ASBR and the first PE device.

12. The method according to claim 1, wherein the first network device comprises an extensible gateway (xGW), the fourth network device comprises a second provider edge (PE) device, and an interior border gateway protocol (IBGP) peer is established between the xGW and the second PE device.

13. A method, comprising:

obtaining, by a first network device, a first packet sent by a fourth network device, wherein the first packet comprises a third virtual private network (VPN) identifier, the first network device communicates with the fourth network device through a third tunnel, the first network device comprises a tunnel endpoint of the third tunnel, the first network device communicates with a second network device through a first tunnel, the first network device comprises a tunnel endpoint of the first tunnel, the first network device communicates with a third network device through a second tunnel, the first network device comprises a tunnel endpoint of the second tunnel, a first correspondence between a first VPN identifier and the third VPN identifier, and a second correspondence between a second VPN identifier and the third VPN identifier are stored on a forwarding plane of the first network device;

processing, by the first network device, the first packet based on the first correspondence, to obtain a second packet, wherein the second packet comprises the first VPN identifier; and sending, by the first network device, the second packet to the second network device through the first tunnel.

14. The method according to claim 13, further comprising:

performing a fast reroute based on the first tunnel and the second tunnel.

15. The method according to claim 13, further comprising:

performing load balancing based on the first tunnel and the second tunnel:

obtaining, by the first network device, a third packet, wherein the third packet comprises the third VPN identifier;

processing, by the first network device, the third packet based on the second correspondence, to obtain a fourth packet, wherein the fourth packet comprises the second VPN identifier; and sending, by the first network device, the fourth packet to the third network device through the second tunnel.

16. The method according to claim 13, wherein the first correspondence comprises a correspondence between the third VPN identifier, the first VPN identifier, and a first tunnel identifier (ID), wherein the first tunnel ID identifies the first tunnel, and wherein the second correspondence comprises a correspondence between the third VPN identifier, the second VPN identifier, and a second tunnel identifier, and wherein the second tunnel ID identifies the second tunnel.

17. A first network device, comprising:

at least one memory storing instructions, and at least one processor coupled to the at least one memory, when the instructions executed by the at least one processor, cause the first network device to:

receive a first virtual private network (VPN) route sent by a second network device, wherein the first VPN route comprises a first VPN identifier, a route prefix, a route distinguisher (RD), and a first next hop, wherein the first next hop comprises the second network device, the first network device communicates with the second network device through a first tunnel, the first network device comprises a tunnel endpoint of the first tunnel, and the first VPN identifier is associated with a first VPN instance;

receive a second VPN route sent by a third network device, wherein the second VPN route comprises a second VPN identifier, the route prefix, the RD, and a second next hop, wherein the second next hop comprises the third network device, the first network device communicates with the third network device through a second tunnel, the first network device comprises a tunnel endpoint of the second tunnel, the second VPN identifier is associated with a second VPN instance, and the first VPN instance and the second VPN instance are associated with a same VPN;

allocate a third VPN identifier to the first VPN route;

store a first correspondence between the third VPN identifier and the first VPN identifier on a forwarding plane, wherein the first network device allocates, based on a one-VPN-identifier-per-next-hop manner, a same VPN identifier to received VPN routes that comprise a same next hop and a same RD;

allocate the third VPN identifier to the second VPN route, and store a second correspondence between the third VPN identifier and the second VPN identifier on the forwarding plane; and advertise a third VPN route to a fourth network device, wherein the third VPN route comprises the third VPN identifier, the route prefix, the RD, and a third next hop, the third next hop is the first network device, the first network device communicates with the fourth network device through a third tunnel, and the first network device is a tunnel endpoint of the third tunnel.

18. The first network device according to claim 17, wherein the first correspondence comprises a correspondence between the third VPN identifier, the first VPN identifier, and a first tunnel identifier (ID), wherein the first tunnel ID identifies the first tunnel, wherein the second correspondence comprises a correspondence between the third VPN identifier, the second VPN identifier, and a second tunnel identifier, and wherein the second tunnel ID identifies the second tunnel.

19. The first network device according to claim 17, further caused to:

perform a fast reroute based on the first VPN route and the second VPN route.

20. The first network device according to claim 17, further caused to:

perform load balancing based on the first VPN route and the second VPN route.

* * * * *